United States Patent
Moon et al.

(10) Patent No.: US 11,765,632 B2
(45) Date of Patent: Sep. 19, 2023

(54) METHOD AND APPARATUS FOR TRANSMITTING AND RECEIVING DATA IN MOBILE COMMUNICATION SYSTEM

(71) Applicant: Samsung Electronics Co., Ltd., Suwon-si (KR)

(72) Inventors: Jungmin Moon, Suwon-si (KR); Himke Van Der Velde, Zwolle (NL); Seunghoon Park, Seoul (KR); Byounghoon Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/328,635

(22) Filed: May 24, 2021

(65) Prior Publication Data

US 2021/0289409 A1    Sep. 16, 2021

Related U.S. Application Data

(63) Continuation of application No. 15/886,273, filed on Feb. 1, 2018, now Pat. No. 11,019,544.

(30) Foreign Application Priority Data

Feb. 2, 2017 (KR) .................. 10-2017-0015211
Mar. 23, 2017 (KR) .................. 10-2017-0037174
(Continued)

(51) Int. Cl.
*H04W 36/04* (2009.01)
*H04W 36/24* (2009.01)
(Continued)

(52) U.S. Cl.
CPC .......... *H04W 36/04* (2013.01); *H04B 7/0695* (2013.01); *H04B 7/088* (2013.01);
(Continued)

(58) Field of Classification Search
CPC ..... H04W 36/04; H04W 36/24; H04W 36/34; H04W 36/00; H04W 24/10; H04W 72/02;
(Continued)

(56) References Cited

U.S. PATENT DOCUMENTS

2008/0188228 A1    8/2008  Pecen et al.
2010/0240367 A1    9/2010  Lee et al.
(Continued)

FOREIGN PATENT DOCUMENTS

CA          3049166      *  7/2017  ............ H04L 27/26
CN        102047637 A       5/2011
(Continued)

OTHER PUBLICATIONS

Korean Notification of a Decision to Grant a Patent dated Jun. 8, 2022, issued in Korean Patent Application No. 10-2019-7022882.
(Continued)

*Primary Examiner* — Warner Wong
(74) *Attorney, Agent, or Firm* — Jefferson IP Law, LLP

(57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. This disclosure also relates to a cell reselection operation. A method of a terminal in a wireless communication system may include receiving a first scheduling information for a first frequency band from a base station, switching a bandwidth to the first frequency band according to the first scheduling information, starting a timer for the
(Continued)

first frequency band, and switching the bandwidth to a second frequency band when the timer expires.

16 Claims, 73 Drawing Sheets

(30) Foreign Application Priority Data

Aug. 10, 2017 (KR) .................. 10-2017-0101921
Sep. 27, 2017 (KR) .................. 10-2017-0125589

(51) Int. Cl.
*H04W 76/27* (2018.01)
*H04W 76/38* (2018.01)
*H04W 24/10* (2009.01)
*H04B 7/08* (2006.01)
*H04W 36/00* (2009.01)
*H04B 7/06* (2006.01)
*H04W 72/12* (2023.01)

(52) U.S. Cl.
CPC ....... *H04W 24/10* (2013.01); *H04W 36/0072* (2013.01); *H04W 36/24* (2013.01); *H04W 72/12* (2013.01); *H04W 76/27* (2018.02); *H04W 76/38* (2018.02); *H04B 7/0617* (2013.01); *H04B 7/0626* (2013.01); *H04W 36/0077* (2013.01)

(58) Field of Classification Search
CPC ..... H04W 72/12; H04W 76/38; H04W 76/00; H04W 76/27; H04W 74/00–0891; H04L 69/287; H04L 1/1848; H04L 1/188; H04L 29/06993; H04B 7/0617; H04B 1/006
See application file for complete search history.

(56) References Cited

U.S. PATENT DOCUMENTS

| | | | |
|---|---|---|---|
| 2011/0099595 A1 | 4/2011 | Lindquist et al. | |
| 2011/0207495 A1 | 8/2011 | Gerstenberger et al. | |
| 2011/0237202 A1* | 9/2011 | Uemura | H04W 36/0088 455/67.14 |
| 2011/0292915 A1 | 12/2011 | Prakash et al. | |
| 2012/0252388 A1 | 10/2012 | Kim | |
| 2014/0071939 A1 | 3/2014 | Yang et al. | |
| 2014/0334294 A1 | 11/2014 | Ericson et al. | |
| 2015/0011215 A1 | 1/2015 | Uemura et al. | |
| 2015/0016378 A1 | 1/2015 | Urabe et al. | |
| 2015/0189610 A1 | 7/2015 | Siomina et al. | |
| 2015/0222410 A1 | 8/2015 | Belghoul et al. | |
| 2016/0112921 A1* | 4/2016 | Nagasaka | H04W 48/08 370/331 |
| 2016/0143035 A1* | 5/2016 | Xue | H04L 5/001 370/329 |
| 2017/0302419 A1* | 10/2017 | Liu | H04L 5/0098 |
| 2017/0367073 A1* | 12/2017 | Murugan | H04L 5/0051 |
| 2018/0020452 A1 | 1/2018 | Yerramalli et al. | |
| 2018/0054753 A1 | 2/2018 | Fujishiro et al. | |
| 2018/0146439 A1* | 5/2018 | Kim | H04W 52/325 |
| 2018/0175975 A1 | 6/2018 | Um et al. | |
| 2018/0199251 A1 | 7/2018 | Kim et al. | |
| 2019/0103954 A1* | 4/2019 | Lee | H04L 5/0098 |
| 2019/0149421 A1 | 5/2019 | Jin et al. | |
| 2019/0182870 A1 | 6/2019 | Shih et al. | |
| 2019/0200396 A1 | 6/2019 | Agiwal | |
| 2020/0068553 A1* | 2/2020 | Zhou | H04W 72/048 |
| 2020/0221393 A1* | 7/2020 | Kim | H04W 52/322 |
| 2021/0136768 A1* | 5/2021 | Kang | H04L 1/00 |

FOREIGN PATENT DOCUMENTS

| | | | | |
|---|---|---|---|---|
| CN | 104067678 A | | 9/2014 | |
| CN | 108365878 | * | 1/2017 | ............... H04B 7/06 |
| JP | 2014-127994 A | | 7/2014 | |
| KR | 10-2010-0046187 A | | 5/2010 | |
| KR | 10-2012-0109822 A | | 10/2012 | |
| WO | 2014/098386 A1 | | 6/2014 | |

OTHER PUBLICATIONS

Huawei et al., "Mechanisms of bandwidth adaptation", 3GPP Draft, R1-1700011, 3rd Generation Partnership Project (3GPP), Mobile Competence Centre, 650, Route Des Lucioles, F-06921 Sophia-Antipolis Cedex, France, vol. RAN WG1, Spokane, USA, Jan. 16, 2017-Jan. 20, 2017, Jan. 16, 2017, XP051207553, Retrieved from the Internet: URL:http://www.3gpp.org/ftp/Meetings_3GPP_SYNC/RAN1/Docs/ [retrieved on Jan. 16, 2017].
Huawei Hisilicon, "Mechanisms of bandwidth adaptation for control and data reception in single-carrier and multi-carrier cases", 3GPP Draft, R1-1611655, 3rd Generation Partnership Project (3GPP), Mobile Competence Centre, 650, Route Des Lucioles, F-06921 Sophia-Antipolis Cedex, France, vol. RAN WG1, Reno, USA, Nov. 14, 2016-Nov. 18, 2016, Nov. 13, 2016, XP051175628, Retrieved from the Internet URL:http://www.3gpp.org./ftp/Meetings_3GPP_SYNC/RAN1/Docs/ [retrieved on Nov. 13, 2016].
Extended European Search Report dated Oct. 23, 2019, issued in European Patent Application No. 18747277.4.
Chinese Office Action dated Mar. 29, 2021, issued in Chinese Patent Application No. 201880009675.9.
Chinese Decision of Reexamination dated Apr. 26, 2023, issued in Chinese Patent Application No. 201880009675.9.

* cited by examiner

FIG. 19

| Preferred RS Index 1 | Cell representative value determination method using RS type 1 [Index, # of beams, ...] | Preferred RS Index 2 | Cell representative value determination method using RS type 2 [Index, # of beams, ...] | ... | Preferred RS Index N | Cell representative value determination method using RS type N [Index, # of beams, ...] |
|---|---|---|---|---|---|---|
| 1910 | 1940 | 1920 | 1950 | | 1930 | 1960 |

FIG. 20

| Preferred RS index Index | K (beams) | 2 [Weighted Summation] | Weight 1 | Weight 2 | ... | Weight K |
|---|---|---|---|---|---|---|

2010, 2020, 2030, 2040

METHOD AND APPARATUS FOR TRANSMITTING AND RECEIVING DATA IN MOBILE COMMUNICATION SYSTEM

CROSS-REFERENCE TO RELATED APPLICATION(S)

This application a continuation application of prior application Ser. No. 15/886,273, filed on Feb. 1, 2018, which was based on and claimed priority under 35 U.S.C. § 119(a) of a Korean patent application Serial number 10-2017-0015211, filed on Feb. 2, 2017, in the Korean Intellectual Property Office, and of a Korean patent application Serial number 10-2017-0037174, filed on Mar. 23, 2017, in the Korean Intellectual Property Office, and of a Korean patent application Serial number 10-2017-0101921, filed on Aug. 10, 2017, in the Korean Intellectual Property Office, and of a Korean patent application Serial number 10-2017-0125589, filed on Sep. 27, 2017, in the Korean Intellectual Property Office, the disclosure of each of which is incorporated by reference herein in its entirety.

TECHNICAL FIELD

The disclosure relates to a mobile communication system. More particularly, the disclosure relates to a cell reselection method of a terminal.

In addition, the disclosure relates to cell measurement and mobility management operations using signals transmitted by means of beamforming in a beamforming based system.

In addition, the disclosure relates to a method for transmitting a reference signal for a terminal in a radio resource control (RRC) connected state.

In addition, the disclosure relates to a method for switching a bandwidth of a terminal in a mobile communication system.

BACKGROUND

To meet the demand for wireless data traffic having increased since deployment of fourth generation (4G) communication systems, efforts have been made to develop an improved fifth generation (5G) or pre-5G communication system. Therefore, the 5G or pre-5G communication system is also called a 'Beyond 4G Network' or a 'Post long term evolution (LTE) System'. The 5G communication system is considered to be implemented in higher frequency millimeter wave (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid frequency shift key (FSK) and quadrature amplitude modulation (QAM) (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, MTC, and M2M communication may be implemented by beamforming, MIMO, and array antennas. Application of a cloud RAN as the above-described Big Data processing technology may also be considered to be as an example of convergence between the 5G technology and the IoT technology.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method for preferentially reselecting a specific cell by a terminal, thereby enabling quick data transmission and reception of a terminal and preventing an increase in signaling overhead occurring in a data transmission/reception preparation procedure.

Another aspect of the disclosure is to provide a system, method and apparatus for performing cell measurement and mobility management operations using signals transmitted by means of beamforming in a beamforming based system including one or more base stations (BS) and one or more terminals.

Another aspect of the disclosure to provide a method and apparatus for transmitting a reference signal for a terminal in a radio resource control (RRC) connected state.

Another aspect of the disclosure is to provide a procedure of receiving a base station signal in a limited band by considering power consumption of a terminal in a single carrier and also provide a method for a base station and a terminal to utilize the entire system band flexibly and dynamically. Also, the disclosure provides a method and a procedure for a terminal to save power in such a flexible bandwidth system.

In accordance with an aspect of the disclosure, a method of a terminal in a wireless communication system is provided. The method includes receiving a first scheduling information for a first frequency band from a base station, switching a bandwidth to the first frequency band according to the first scheduling information, starting a timer for the first frequency band, and switching the bandwidth to a second frequency band when the timer expires.

In accordance with another aspect of the disclosure, a method of a base station in a wireless communication system is provided. The method includes transmitting a first scheduling information for a first frequency band to a terminal, switching a bandwidth to the first frequency band according to the first scheduling information, starting a timer for the first frequency band, and switching the bandwidth to a second frequency band when the timer expires.

In accordance with another aspect of the disclosure, a terminal in a wireless communication system is provided. The terminal includes a transceiver and a controller configured to receive a first scheduling information for a first frequency band from a base station, switch a bandwidth to the first frequency band according to the first scheduling information, start a timer for the first frequency band, and switch the bandwidth to a second frequency band when the timer expires.

In accordance with another aspect of the disclosure, a base station in a wireless communication system is provided. The base station includes a transceiver and a controller configured to transmit a first scheduling information for a first frequency band to a terminal, switch a bandwidth to the first frequency band according to the first scheduling information, start a timer for the first frequency band, and switch the bandwidth to a second frequency band when the timer expires.

In accordance with another aspect of the disclosure, a terminal may reselect a specific cell capable of fast data transmission/reception, thereby preventing an increase in signaling overhead that may occur in a data transmission/reception preparation procedure.

In accordance with another aspect of the disclosure, each base station may transmit two or more reference signals, generated by different signal generation rules, by using two or more beams having different beam areas, coverages, transmission periods, and the like.

In accordance with another aspect of the disclosure, a base station may determine a beam to be used for data transmission by transmitting a reference signal for a terminal in an RRC connection state, and use the determined beam for data transmission/reception.

In accordance with another aspect of the disclosure, a base station may control a plurality of terminals using various sizes of bands to use resources evenly in the operating band of the system. In addition, the base station allows the terminal to perform scheduling, modulation and coding scheme (MCS), channel state indication (CSI) reporting, measurement, and the like within a configured partial band, thereby minimizing a reduction of scheduling and handover performance in the entire band. Also, if a connection problem occurs in such a partial band, the terminal may recover it within a short delay.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIGS. 18 and 19 show examples of a signal transmitted to a terminal by a base station and utilized to calculate a cell measured value according to an embodiment of the disclosure;

FIG. 20 is a diagram illustrating an example of a signal including weights transmitted to a terminal by a base station according to an embodiment of the disclosure;

Throughout the drawings, it should be noted that like reference numbers are used to depict the same or similar elements, features, and structures.

DETAILED DESCRIPTION

Figure 1:
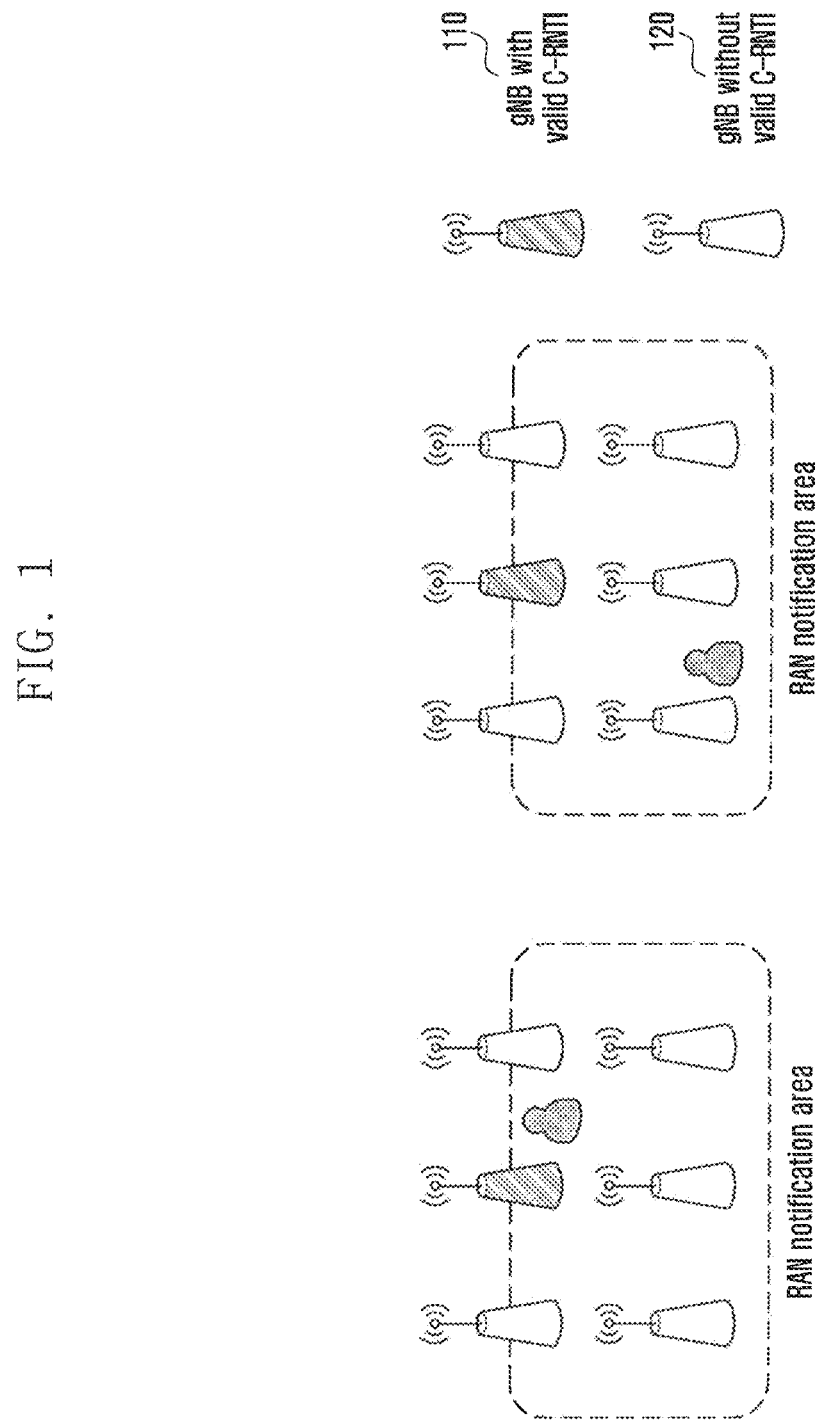
FIG. 1 is a diagram illustrating a situation in which a user equipment (UE) moves in a radio access network (RAN) area after transitioning from a connected mode to an inactive mode according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The advantages and features of the disclosure and the manner of achieving them will become apparent through embodiments described in detail below with reference to the accompanying drawings. The disclosure may, however, be embodied in many different forms and should not be construed as limited to embodiments set forth herein. Rather, these embodiments are provided so that this disclosure will be thorough and complete, and will fully convey the scope of the disclosure to those skilled in the art. The disclosure is only defined by the scope of claims. Like reference numerals refer to like elements throughout this disclosure.

First Embodiment

In a new radio (NR), which is currently being discussed in third generation partnership project (3GPP), the introduction of an inactive mode in addition to a connected mode and an idle mode defined in long term evolution (LTE) has been decided. The features and requirements of the inactive mode are as follows.

Signaling and resource usage in the radio access network (RAN) and the core network (CN) should be minimized.

Time required up to data transmission in the inactive mode should be minimized. Here, the data transmission may be performed while the user equipment (UE) maintains the inactive mode or is in the connected mode.

Paging by the RAN as well as the existing paging by the CN of LTE should be supported.

A RAN-based notification area (hereinafter, a RAN area) is defined. In the RAN area, the UE moves without location update. The g Node Bs (gNBs) in the RAN area maintain the access stratum (AS) context of the UE.

According to the above requirements, the inactive mode UE should be able to perform operations for fast data transmission/reception. One of them is a cell reselection. Basically, as in the above requirements, the inactive mode UE moves within the RAN area without location update. However, if the inactive mode UE performs a cell reselection through the same operation as the idle mode UE in the existing LTE, it may be unsuitable in view of fast data transmission/reception.

FIG. 1 is a diagram illustrating a situation in which a UE moves in a RAN area after transitioning to an inactive mode according to an embodiment of the disclosure.

Referring to FIG. 1, an environment of the disclosure is illustrated. In this environment or situation shown in FIG. 1, a RAN notification area is formed of a plurality of gNBs which are classified into a gNB 110 having a cell radio network temporary identifier (C-RNTI) valid for the inactive mode UE and a gNB 120 having no valid C-RNTI. The inactive mode UE is moving freely within the RAN notification area.

In a situation of FIG. 1, the UE which has been connected to the gNB 110 having the C-RNTI transitions from the connected mode to the inactive mode and then moves freely in the RAN area.

In FIG. 1, the gNB 110 which has provided lastly a service to the UE maintains the C-RNTI used by the UE according to the definition of the inactive mode in which the AS context of the UE is maintained. Therefore, if the inactive mode UE transmits and receives data to and from the gNB 110, it is not necessary to reconfigure the C-RNTI.

On the other hand, the gNB 120 has no C-RNTI of the inactive mode UE even though the gNB 120 belongs to the RAN area of the UE. Therefore, when the inactive mode UE communicates with the gNB 120, not the gNB 110 having the C-RNTI of the UE, while moving in the RAN area, the gNB 120 needs a procedure of allocating the C-RNTI to the UE. This may increase a delay in data transmission and reception of the inactive mode UE.

In 3GPP, the introduction of a separate radio network temporary identifier (RNTI) for data transmission/reception of the inactive mode UE is being discussed. In the disclosure, this is referred to as an area RNTI (A-RNTI). The A-RNTI is an identifier designed to allow all UEs in the RAN area to be uniquely assigned. Since the RAN area includes a plurality of cells, the A-RNTI has a greater overhead than the C-RNTI designed to allow the UEs in the cell to be uniquely assigned.

FIGS. 2 to 5 below illustrate the operation of the inactive mode UE that receives DL data from the gNB in the RAN area according to an embodiment of the disclosure.

Figure 2:
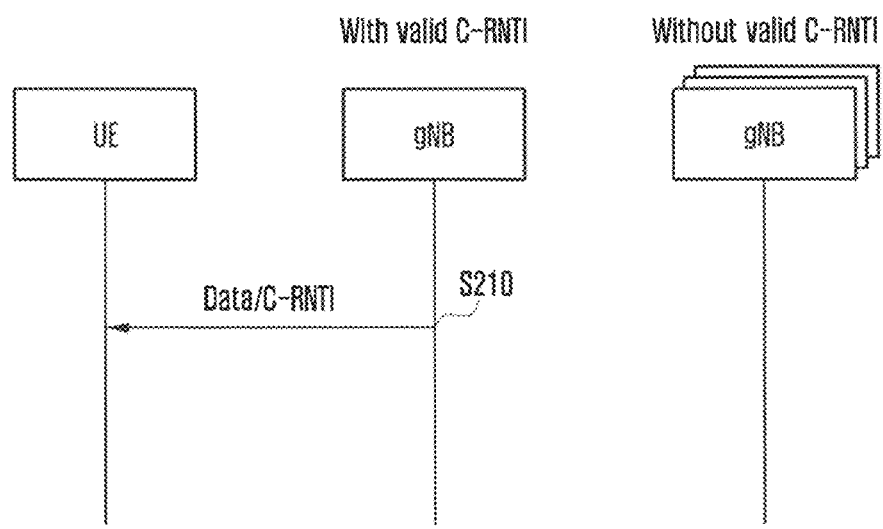
FIG. 2 is a diagram illustrating the operation of an inactive mode UE that receives downlink (DL) data from a g node B (gNB) having a valid cell radio network temporary identifier (C-RNTI) according to an embodiment of the disclosure.

FIG. 2 is a diagram illustrating the operation of the inactive mode UE that receives downlink (DL) data from the gNB having a valid C-RNTI according to an embodiment of the disclosure.

Referring to FIG. 2, since the gNB has the C-RNTI, the gNB may transmit data by using the C-RNTI at operation S210.

Figure 3:
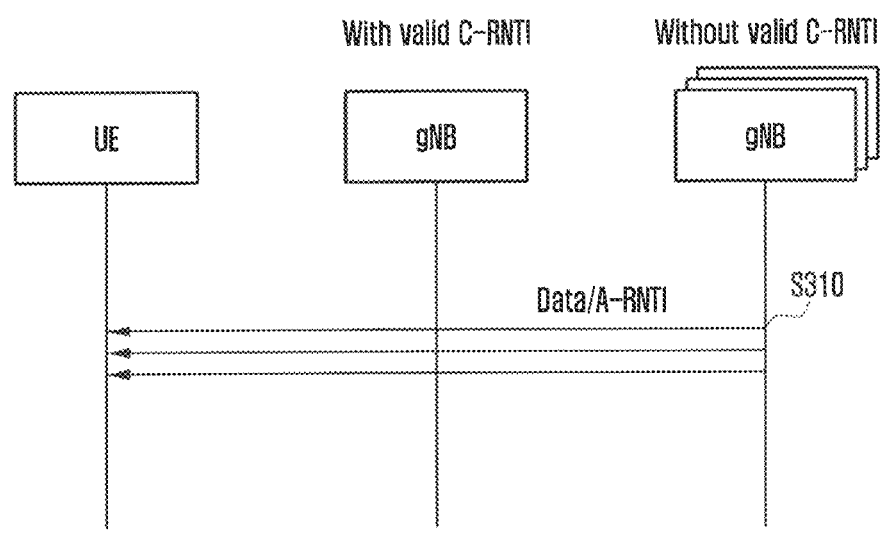
FIG. 3 is a diagram illustrating the operation of an inactive mode UE that receives DL data from all gNBs in a RAN area through an area cell radio network temporary identifier (A-RNTI) according to an embodiment of the disclosure.
Figure 4:
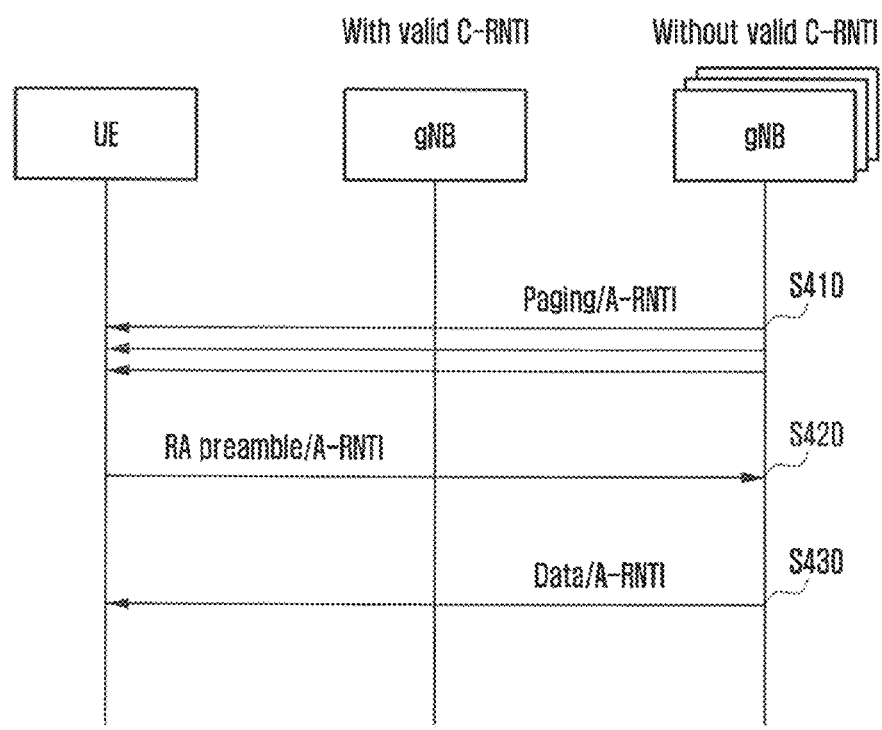
FIG. 4 is a diagram illustrating the operation of an inactive mode UE that receives a paging signal from all gNBs in a RAN area through an A-RNTI, performs a 2-step random access channel (RACH), and receives DL data from a gNB receiving an RACH preamble through an A-RNTI according to an embodiment of the disclosure.
Figure 5:
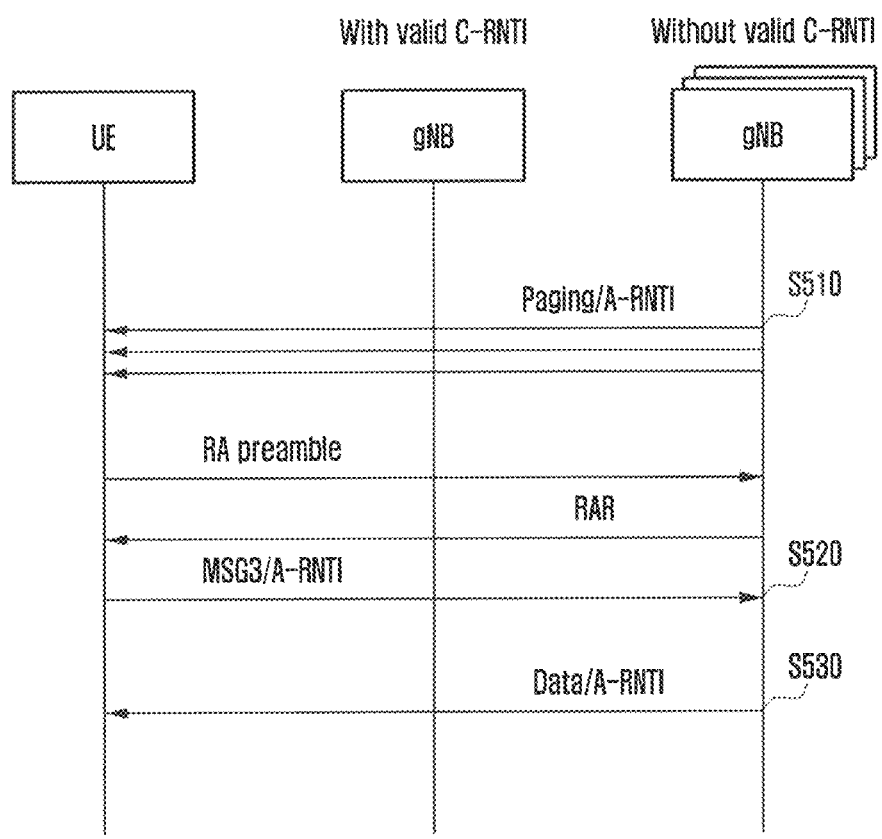
FIG. 5 is a diagram illustrating the operation of an inactive mode UE that receives a paging signal from all gNBs in a RAN area through an A-RNTI, performs a 4-step RACH, and receives DL data from a gNB receiving an RACH preamble through an A-RNTI according to an embodiment of the disclosure.

FIGS. 3 to 5 are diagrams illustrating the operation of the inactive mode UE that receives DL data from the gNB that does not maintain the C-RNTI in the RAN area according to an embodiment of the disclosure.

Referring to FIG. 3, FIG. 3 shows that all gNBs belonging to the RAN area transmit DL data to the inactive mode UE by using the A-RNTI at operation S310. Since the UE is actually adjacent to one gNB in most cases, it is inefficient utilization of resources that all gNBs in the RAN area transmit DL data by using the unique A-RNTI.

FIGS. 4 and 5 are diagrams illustrating the operation of the inactive mode UE that identifies an adjacent gNB by performing a 2-step or 4-step random access channel (RACH) and receives DL data from the adjacent gNB according to an embodiment of the disclosure.

First, all gNBs belonging to the RAN area perform paging by using the A-RNTI of the UE at operation S410 or S510. Then, the UE responding to the paging performs a 2-step or 4-step RACH and inform, via the RACH message 1 (S420) or the RACH message 3 (S520), the gNB that the UE corresponds to the A-RNTI contained in the paging signal. The gNB that receives this message understands that the inactive mode UE is located nearby, and transmits DL data. This operation causes overhead because all gNBs in the RAN area transmit paging signals. Also, other overhead occurs in a procedure in which the UE has to perform the 2-step or 4-step RACH operation.

Referring to FIGS. 2 to 5, when the gNB has the valid C-RNTI, the data transmission/reception of the inactive mode UE has the least delay and needs the least signaling of the UE and the gNB. Therefore, it is advantageous for the inactive mode UE to stay around the gNB having the valid C-RNTI as long as possible. This aspect should be reflected in the cell reselection operation of the inactive mode UE. The disclosure proposes a cell selection operation that allows the inactive mode UE to stay around the gNB having the valid C-RNTI as long as possible.

First, the cell reselection operation of the UE in LTE will be described. In LTE, the cell reselection of the idle mode UE refers to an operation of selecting a cell by the UE for camping on, acquiring system information, maintaining synchronization, and receiving a paging signal. In order to understand the cell reselection operation, it is necessary to understand the cell selection operation. The cell selection includes the operation of measuring and inducing the following Srxlev and checking whether Srxlev is greater than zero (details are the same as LTE standard and thus will be omitted herein). Here, Srxlev is composed of Qrxlevmeas, Qrxlevmin, Qrxlevminoffset, and Pcompensation. Qrxlevmeas corresponds to a reference signal received power (RSRP) value measured by the UE, and the others, Qrxlevmin, Qrxlevminoffset, and Pcompensation, are parameters notified to the UE by the gNB through system information, a radio resource control (RRC) message, or the like.

TABLE 1

Cell selection criterion: S

Suitable cells
 Srxlev > 0
  Srxlev = Qrxlevmeas − (Qrxlevmin − Qrxlevminoffset) − Pcompensation
  Pcompensation = max(UE_TXPWR_MAX_RACH − P_MAX, 0)

Based on the concept of suitable cells described above, i.e., Srxlev>0, the cell reselection is performed through the following operations in LTE. First, the UE measures the signal strength for the currently camping cell (i.e., serving cell) and neighbor cells, and then derives Rs and Rn. Here, $Q_{meas,s}$ and $Q_{meas,n}$ denote the signal strength (RSRP) for the serving cell and the neighbor cell, respectively. Also, $Q_{hyst,s}$ and $Q_{offset,n}$ are parameters that the gNB provides to the UE to prevent frequent cell reselection. After measuring the signal strength for cells, the UE selects a cell having the highest Rs or Rn among cells having Srxlev greater than zero and then performs camping on the selected cell. If the currently camping cell and the newly selected cell are different from each other, this means the UE performs the cell reselection.

TABLE 2

Cell ranking criterion: R

Ranking of cells
 Rs = Qmeas,s + Qhyst,s
 Rn = Qmeas,n − Qoffset,s,n
Reselected cell
 Suitable (S criterion) and
 Best rank (highest R)

Described above is a cell reselection process of the idle mode UE in LTE. Meanwhile, in the inactive mode which is expected to be newly introduced in NR, it is advantageous for the UE to stay in a cell having a valid C-RNTI as long as possible in view of fast data transmission/reception of the inactive mode UE. Considering this, proposed is a cell reselection operation suitable for fast data transmission/reception of the inactive mode UE. In this disclosure, the term cell is used interchangeably with a base station, a gNB, or an e Node B (eNB), all of which have the same meaning.

The disclosure proposes a method for allowing an inactive mode UE to stay as long as possible in a gNB having a C-RNTI valid for the UE by applying an additional offset to the gNB regardless of whether a certain cell is a serving cell or a neighbor cell in a cell reselection.

Figure 6:
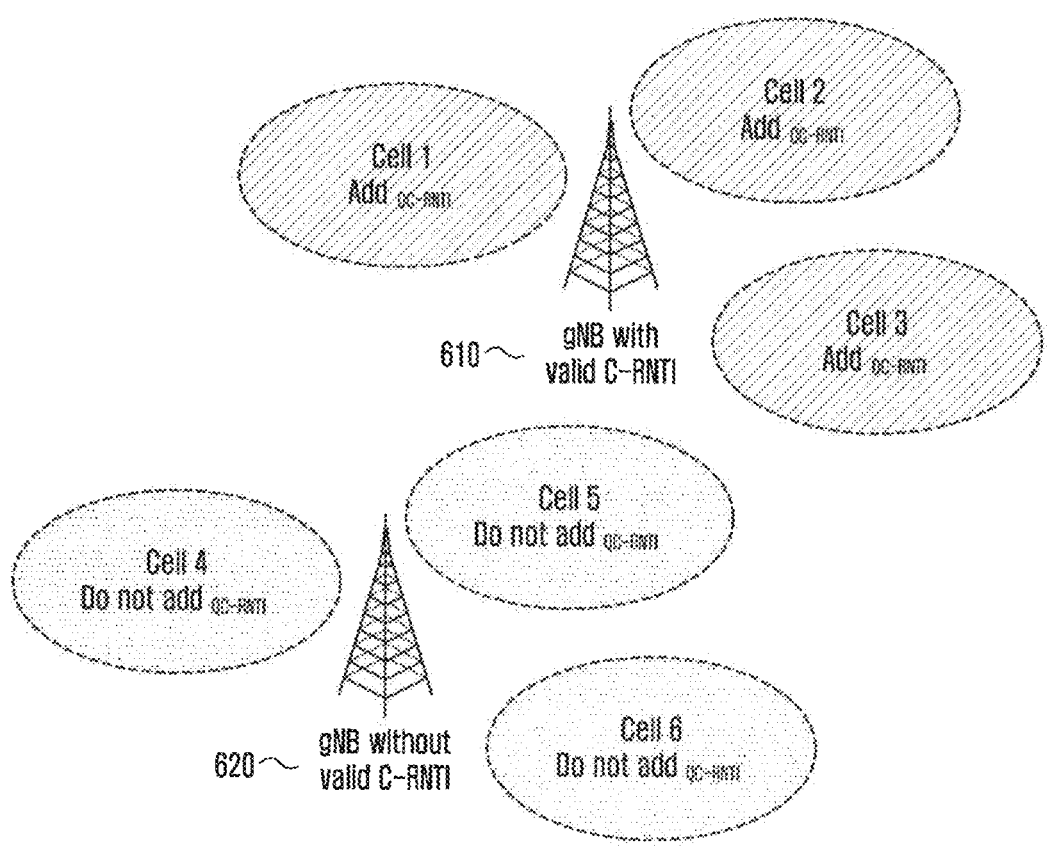
FIG. 6 is a diagram illustrating a difference between a gNB having a valid C-RNTI and a gNB having no valid C-RNTI in cell reselection of an inactive mode UE according to an embodiment of the disclosure.

FIG. 6 is a diagram illustrating a cell reselection method of an inactive mode UE according to an embodiment of the disclosure.

Referring to FIG. 6, for a gNB 610 having a valid C-RNTI for the inactive mode UE, the UE adds an additional offset, QC-RNTI, in the cell reselection and applies it to cell ranking. On the other hand, for a gNB 620 having no valid C-RNTI for the inactive mode UE, the UE performs cell ranking without additional offset.

The basic cell reselection operation is the same as described above. In case of the gNB having the valid C-RNTI of the inactive mode UE as shown in FIG. 6, the UE may apply an additional offset (referred to as $Q_{C-RNTI}$ herein). According to the disclosure, for the gNB that does not have the valid C-RNTI for the inactive mode UE, the UE does not apply an additional offset ($Q_{C\_RNTI}$). The cell reselection equation according to the disclosure is as follows.

TABLE 3

Cell ranking criterion for inactive mode UE: Rinactive

Ranking of cells
  Rs = Qmeas,s + Qhyst,s + $Q_{C\text{-}RNTI,s}$
  Rn = Qmeas,n − Qoffset,s,n + $Q_{C\text{-}RNTI,n}$
    $Q_{C\text{-}RNTI,s}$ = X (if cell s has valid C-RNTI for inactive mode UE) or 0 (if cell s does not have valid C-RNTI for inactive mode UE)
    $Q_{C\text{-}RNTI,n}$ = Y (if cell n has valid C-RNTI for inactive mode UE) or 0 (if cell n does not have valid C-RNTI for inactive mode UE)
    X and Y are configured by gNB via RRC signaling or system information
Reselected cell
  Suitable (S criterion) and
  Best rank (highest R)

Alternatively, the cell reselection equation according to the disclosure is as follows.

TABLE 4

Cell ranking criterion for inactive mode UE: Rinactive

Figure 7:
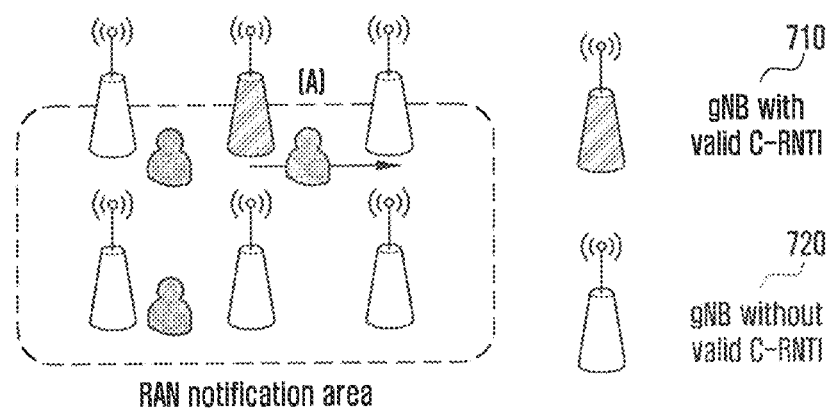
FIG. 7 is a diagram illustrating a cell reselection operation in a situation where an inactive mode UE moves from a gNB having a valid C-RNTI to a gNB having no valid C-RNTI according to an embodiment of the disclosure.
Figure 8:
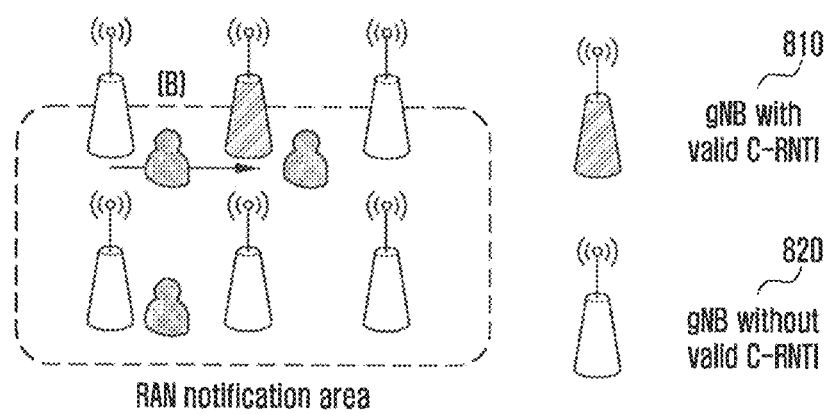
FIG. 8 is a diagram illustrating a cell reselection operation in a situation where an inactive mode UE moves from a gNB having no valid C-RNTI to a gNB having a valid C-RNTI according to an embodiment of the disclosure.
Figure 9:
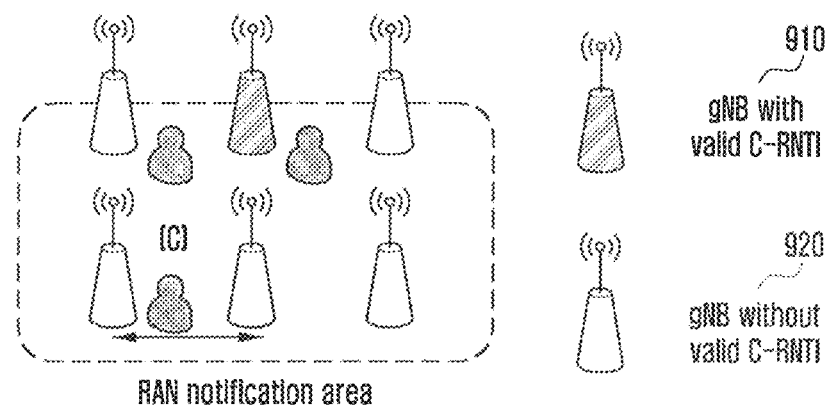
FIG. 9 is a diagram illustrating a cell reselection operation in a situation where an inactive mode UE moves from a gNB having no valid C-RNTI to another gNB having no valid C-RNTI according to an embodiment of the disclosure.

Ranking of cells
  Rs = Qmeas,s + Qhyst,s + $Q_{C\text{-}RNTI,s}$
  Rn = Qmeas,n − Qoffset,s,n
    $Q_{C\text{-}RNTI,s}$ = X (If cell s has valid C-RNTI for inactive mode UE) or 0 (if cell s does not have valid C-RNTI for inactive mode UE)
    X is configured by gNB via RRC signaling or system information The inactive mode UE performs a cell reselection operation according to the above equation in the following three situations as shown in FIGS. 7 to 9.

FIG. 7 is a diagram illustrating a cell reselection operation in a situation where an inactive mode UE moves from a gNB having a valid C-RNTI to a gNB having no valid C-RNTI according to an embodiment of the disclosure.

Referring to FIG. 7, it is assumed that the UE is currently camping on the gNB 710 having the valid C-RNTI. According to the disclosure, it is advantageous in view of fast data transmission/reception that the UE remains as long as possible in the current serving cell, i.e., the gNB 710 having the valid C-RNTI. Therefore, when deriving Rs for the current serving cell in the ranking process for cell reselection, the UE adds $Q_{C\text{-}RNTI,s}$ in addition to $Q_{meas,s}$ and $Q_{hyst,s}$.

However, since the gNB 720 to which the UE is moving does not have the valid C-RNTI for the UE, the UE does not apply any additional offset other than $Q_{meas,n}$ and $Q_{offset,n}$. In this example, the inactive mode UE derives Rs and Rn in this manner and compares them to perform the final cell reselection.

TABLE 5

Example of equation related to FIG. 7

Rs = $Q_{meas,s}$ + $Q_{hyst,s}$ + $Q_{C\text{-}RNTI,s}$ (= X dB)
Rn = $Q_{meas,n}$ − $Q_{offset,s,n}$
$Q_{C\text{-}RNTI,n}$ = 0

FIG. 8 is a diagram illustrating a cell reselection operation in a situation where an inactive mode UE moves from a gNB having no valid C-RNTI to a gNB having a valid C-RNTI according to an embodiment of the disclosure.

Referring to FIG. 8, it is assumed that the UE is currently camping on the gNB 820 having no valid C-RNTI. According to the disclosure, it is advantageous in view of fast data transmission/reception that the UE remains as long as possible in a neighbor cell, i.e., the gNB 810 having the valid C-RNTI, rather than in the current serving cell, i.e., the gNB 820 having no valid C-RNTI. Therefore, when deriving Rs for the current serving cell in the ranking process for cell reselection, the UE does not apply any additional offset other than $Q_{meas,s}$ and $Q_{hyst,s}$.

However, since the gNB 810 to which the UE is moving does not have the valid C-RNTI for the UE, the UE adds $Q_{C\text{-}RNTI,n}$ in addition to $Q_{meas,n}$ and $Q_{offset,s,n}$. In this example, the inactive mode UE derives Rs and Rn in this manner and compares them to perform the final cell reselection.

TABLE 6

Example of equation related to FIG. 8

Rs = $Q_{meas,s}$ + $Q_{hyst,s}$
Rn = $Q_{meas,n}$ − $Q_{offset,s,n}$ + $Q_{C\text{-}RNTI,n}$ (= Y dB)
$Q_{C\text{-}RNTI,s}$ = 0

FIG. 9 is a diagram illustrating a cell reselection operation in a situation where an inactive mode UE moves from a gNB having no valid C-RNTI to another gNB having no valid C-RNTI according to an embodiment of the disclosure.

Referring to FIG. 9, it is assumed that the UE is currently camping on the gNB 920 having no valid C-RNTI. The disclosure produces an effect different from the conventional method when the cell reselection is performed between a gNB having a C-RNTI and a gNB having no C-RNTI. Therefore, in the situation of FIG. 9, the cell reselection operation is similar to conventional one. That is, when deriving Rs for the current serving cell in the ranking process for cell reselection, the UE does not apply any additional offset other than $Q_{meas,s}$ and $Q_{hyst,s}$. In addition, when deriving Rn for a neighbor cell, the UE the UE does not apply any additional offset other than $Q_{meas,n}$ and $Q_{hyst,n}$. In this example, the inactive mode UE derives Rs and Rn in this manner and compares them to perform the final cell reselection.

TABLE 7

Example of equation related to FIG. 9

$$Rs = Q_{meas,s} + Q_{hyst,s}$$
$$Rn = Q_{meas,n} - Q_{offset,s,n}$$
$$Q_{C-RNTI,s} = Q_{C-RNTI,n} = 0$$

Figure 10:
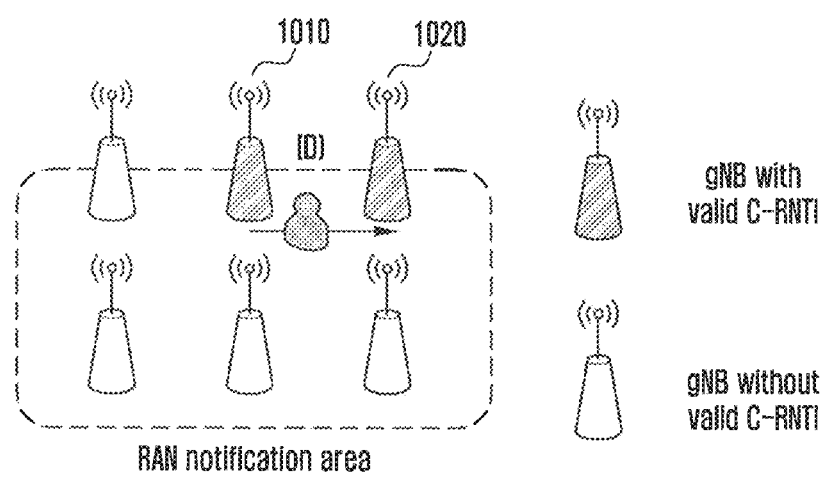
FIG. 10 is a diagram illustrating a cell reselection operation in a situation where an inactive mode UE moves from a gNB having a valid C-RNTI to another gNB having a valid C-RNTI according to an embodiment of the disclosure.

FIG. 10 is a diagram illustrating a cell reselection operation in a situation where an inactive mode UE moves from a gNB having a valid C-RNTI to another gNB having a valid C-RNTI according to an embodiment of the disclosure.

In an environment where cooperative transmission/reception is performed, a plurality of base stations may have a C-RNTI. In this situation, when deriving Rs for the current serving cell in the ranking process for cell reselection, the UE may apply additional offset in addition to $Q_{meas,s}$ and $Q_{hyst,s}$. Also, when deriving Rn for a neighbor cell, the UE may apply additional offset in addition to $Q_{meas,n}$ and $Q_{offset,s,n}$. In this example, the inactive mode UE derives Rs and Rn in this manner and compares them to perform the final cell reselection.

TABLE 8

Example of equation related to FIG. 10

$$Rs = Q_{meas,s} + Q_{hyst,s} + Q_{C-RNTI,s} \ (= X \ dB)$$
$$Rn = Q_{meas,n} - Q_{offset,s,n} + Q_{C-RNTI,n} \ (= Y \ dB)$$

Proposed in the disclosure is a method for allowing the UE to stay as long as possible in the gNB having the valid C-RNTI by applying an additional offset to the gNB having the valid C-RNTI when the inactive mode UE performs cell reselection. Although the gNB having the valid C-RNTI is exemplarily used in this disclosure, the disclosure can be extended to any base station. Herein, such a base station includes the following examples.

Example 1: Macro cell
Example 2: Home cell (HeNB)
Example 3: Specific cell assigned to a UE through system information or RRC signaling by a base station
Example 4: Cell using a specific frequency, e.g., 6 GHz, or less or more
Example 5: Cells installed and operated by a specific operator Therefore, when the disclosure is applied, the UE can preferentially perform the cell reselection for the cell as described above.

Second Embodiment

With the emergence of smart phones, the traffic of smart phones is increasing exponentially, and there is a growing demand for an increase of battery life of smart phones. This means that efficient power saving technique is required, and thus the power saving mode operation of a terminal is needed. Various techniques have been proposed and standardized so that the terminal can operate in power saving mode more frequently and reestablish the network connection more quickly.

In order to accomplish a higher data transfer rate, the fifth generation (5G) communication system considers implementation at a super-high frequency (mmWave) band (e.g., such as a 60 GHz band). In order to obviate a path loss of a radio wave and increase a delivery distance of a radio wave at the super-high frequency band, various techniques such as a beamforming, a massive multiple-input multiple-output (MIMO), a full dimensional MIMO (FD-MIMO), an array antenna, an analog beam-forming, and a large scale antenna are discussed in the 5G communication system.

Additionally, for an improvement in network of the 5G communication system, technical developments are made in an advanced small cell, a cloud radio access network (cloud RAN), an ultra-dense network, a device to device (D2D) communication, a wireless backhaul, a moving network, a cooperative communication, coordinated multi-points (CoMP), a reception interference cancellation, and the like.

Besides, in the 5G communication system, a hybrid frequency shift key and quadrature amplitude modulation (FQAM) and a sliding window superposition coding (SWSC) are developed as advanced coding modulation (ACM) schemes, and a filter bank multi carrier (FBMC), a non orthogonal multiple access (NOMA), and a sparse code multiple access (SCMA) are also developed as advanced access techniques.

In a communication system, a terminal needs an initial cell selection method and a cell reselection method in an idle mode for selecting the best base station to access. Also, in a connected mode, a terminal should perform a radio resource management (RRM) measurement so as to perform handover to move to a better cell. In order to select cells and compare the performance of cells, each terminal should be able to observe or calculate a measured value representative of each cell or a value derived from the measured value. In order to achieve this, in LTE, different base stations reserve orthogonal resources in a shared frequency band using the omni-beam and transmit a cell specific reference signal of each cell. The terminal measures this signal and thus knows the reference signal received power (RSRP) of each cell.

Also, in a next generation communication system that considers beamforming, various methods in which different base stations transmit cell and beam specific reference signals on different resources while using different beams and a terminal derives a representative value corresponding to a certain cell by using measured values of a plurality of beams transmitted in the cell are needed.

In addition, when base stations transmit two or more types of reference signals generated by different signal generation rules using two or more beams having different beam areas, coverages, transmission periods, etc., a method for deriving a representative value corresponding to a certain cell has not been studied yet.

The disclosure relates to a next generation wireless communication system and, more particularly, to a system, method, and apparatus for performing cell measurement and mobility management operations using signals transmitted by means of beamforming in a beamforming-based system including one or more base stations and one or more terminals.

Also, the disclosure relates to a procedure for a beam measurement, a beam measurement report, and a handover start in a wireless system having a base station and a terminal each of which uses multiple antennas.

The disclosure provides a method for a beam-measuring entity (i.e., a terminal) to derive a representative value of a beam-using entity (i.e., a base station) by using observed and measured beam information in a wireless communication having a base station and a terminal each of which uses multiple antennas, especially in a system and environment using beamforming of multiple antennas, and also provides a trigger condition for transmitting a beam measurement report by using the derived representative value of the beam-using entity.

The disclosure provides a trigger condition for a beam-using entity (i.e., a base station) to transmit a signal for additional beam measurement to a beam-measuring entity (i.e., a terminal) by using a beam measured value or a representative value of the beam-using entity reported by the beam-measuring entity, whether a specific condition is satisfied, or the like in a wireless communication having a base station and a terminal each of which uses multiple antennas, especially in a system and environment using beamforming of multiple antennas.

The disclosure provides a procedure that, using a beam measured value or a representative value of a beam-using entity (i.e., a base station) reported by a beam-measuring entity (i.e., a terminal), whether a specific condition is satisfied, or the like, the beam-using entity exchanges information with a neighbor beam-using entity (i.e., a neighbor base station) related to the report of the beam-measuring entity and thereby enables the neighbor beam-using entity to transmit a signal for additional beam measurement in a wireless communication having a base station and a terminal each of which uses multiple antennas, especially in a system and environment using beamforming of multiple antennas.

<Method for Transmitting and Receiving Two or More Different Types of Reference Signals>

Figure 11:
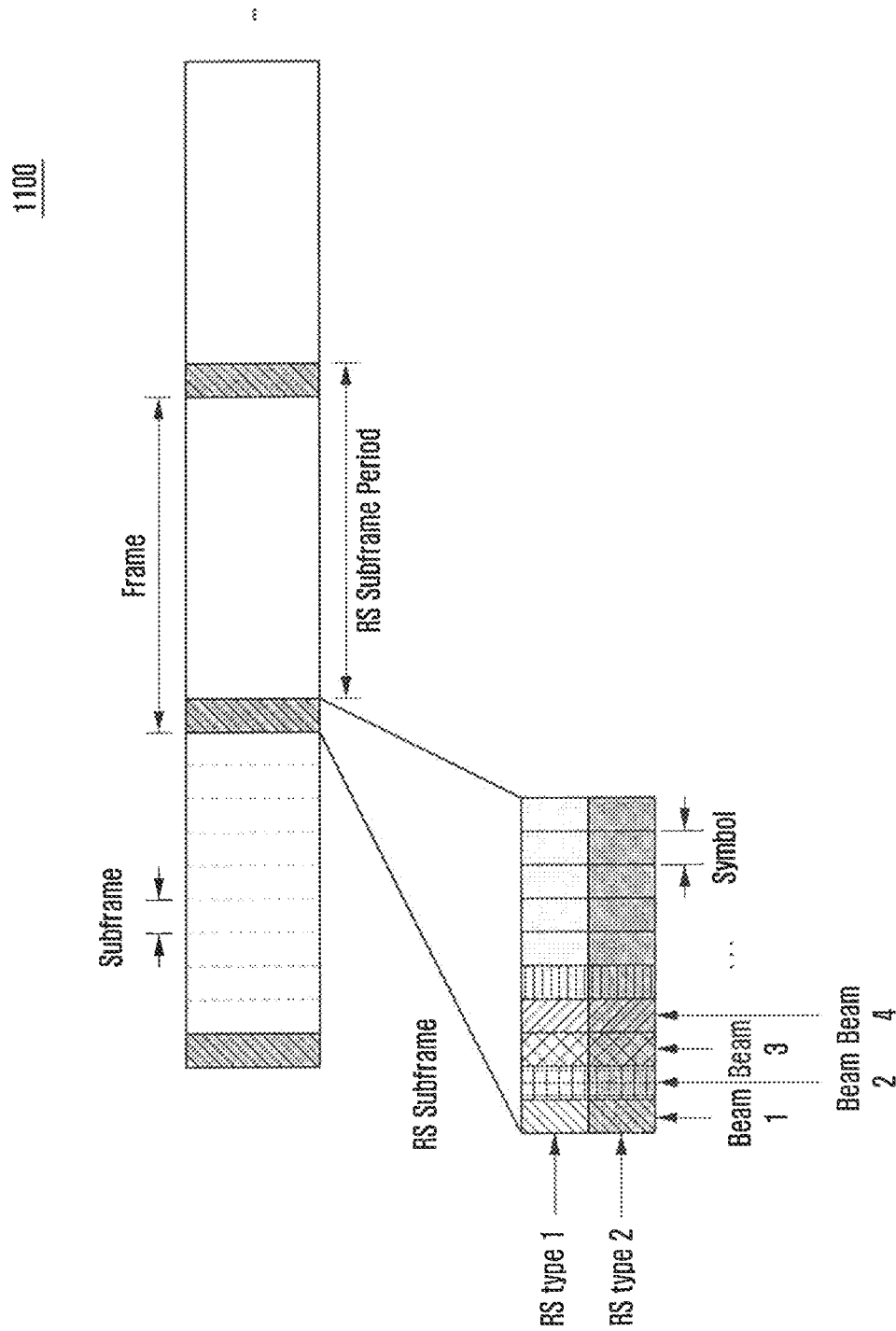
FIG. 11 is a diagram illustrating that different types of reference signals having the same period are transmitted through different frequency bands according to an embodiment of the disclosure.
Figure 12:
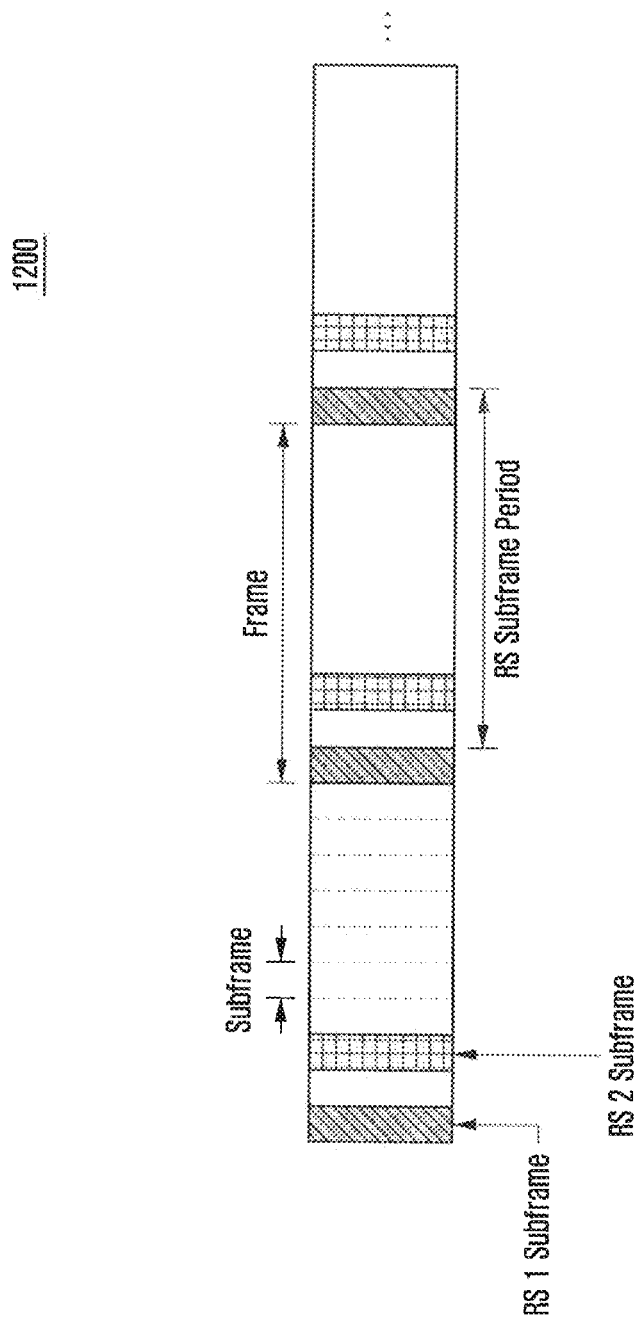
FIG. 12 is a diagram illustrating that different types of reference signals having the same period are transmitted through the same frequency band according to an embodiment of the disclosure.
Figure 13:
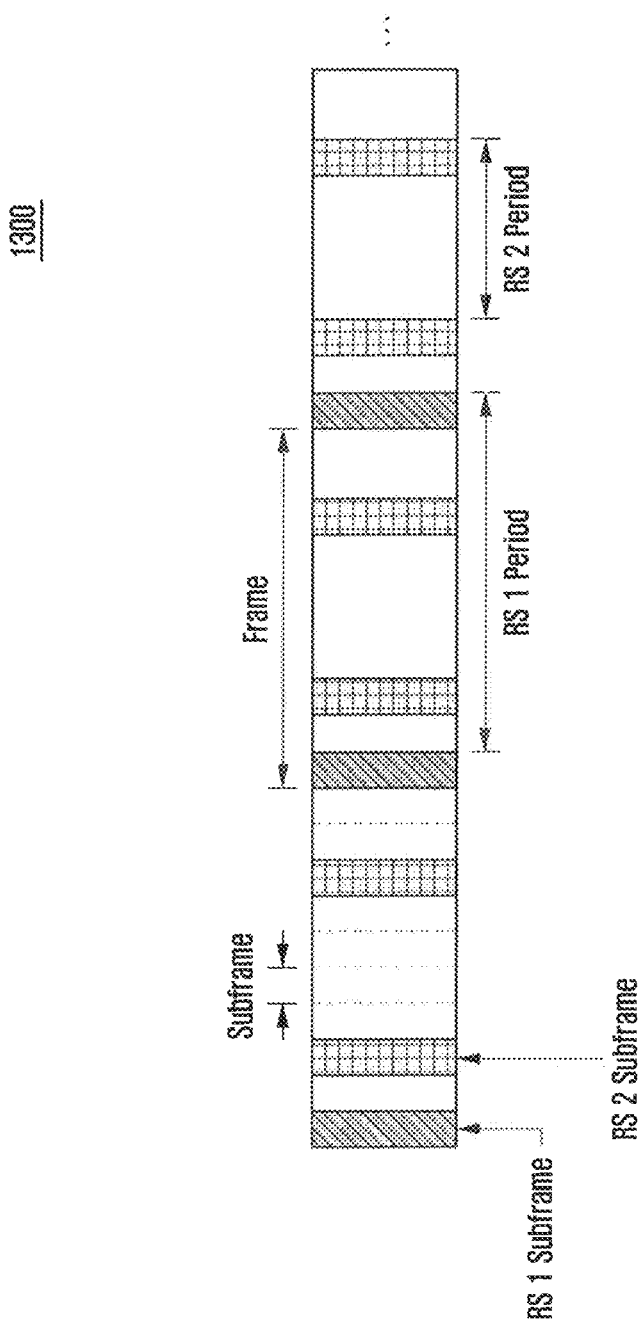
FIG. 13 is a diagram illustrating that different types of reference signals having different periods are transmitted through the same frequency band according to an embodiment of the disclosure.

FIGS. 11 to 13 are diagrams illustrating a method for transmitting different types of reference signals according to various embodiments of the disclosure.

Referring to FIG. 11, as indicated by reference numeral 1100, different types of reference signals (RSs) having the same period may be transmitted using different frequency bands on the same time resource.

Referring to FIG. 12, alternatively, as indicated by reference numeral 1200, different types of RSs having the same period may be transmitted using the same frequency band on different time resources.

Referring to FIG. 13, alternatively, as indicated by reference numeral 1300, different types of RSs having different periods may be transmitted using the same frequency band on different time resources.

In addition, different types of reference signals having different periods may be transmitted using the same or different sequences on the same or different time and frequency resources.

<Method for a Terminal to Calculate a Cell Measured Value>

Signals having different beam characteristics are significantly different in received signal strength and transmission performance. For example, when a terminal receives a signal at the same position, a wide beam has lower RSRP and lower received signal quality (a channel quality indicator (CQI), reference signal received quality (RSRQ), signal-to-interference ration (SINR), signal-to-noise ratio (SNR)), compared to a narrow beam, since the power is dispersed.

Like this, when different reference signals having different beam characteristics are transmitted by base station(s), antenna(s), or transmission point(s) in a cell, a terminal may measure different reference signals. In this case, reference signal measured values may show a relative difference according to the beam characteristics as mentioned above.

Figure 14:
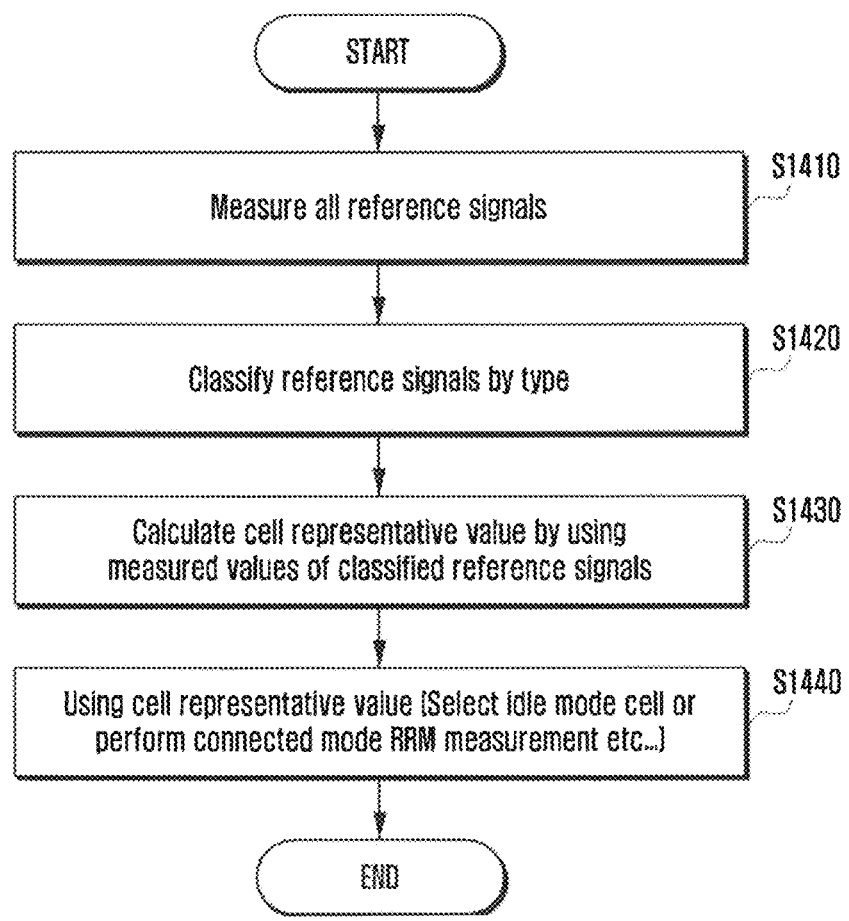
FIG. 14 is a diagram illustrating a method for a terminal to calculate a measured value of a cell which transmits different reference signals according to an embodiment of the disclosure.

FIG. 14 is a diagram illustrating a method for a terminal to calculate a measured value of a cell which transmits different reference signals according to an embodiment of the disclosure.

Referring to FIG. 14, the terminal may receive and measure all reference signals at operation S1410. Then, the terminal may classify the received reference signals into reference signals (RSs) of the same type at operation S1420.

For example, the terminal may distinguish synchronization signals (SSs), cell specific reference signals (RSs), and beam specific RSs. In addition, the terminal may distinguish signals having the same sequence generation rule and function from other signals.

Then, using measured values of the classified reference signals, the terminal may calculate a cell representative value at operation S1430.

Thereafter, using the cell representative value, the terminal may select a cell of an idle mode or perform RRM measurement at operation S1440.

Figure 15:
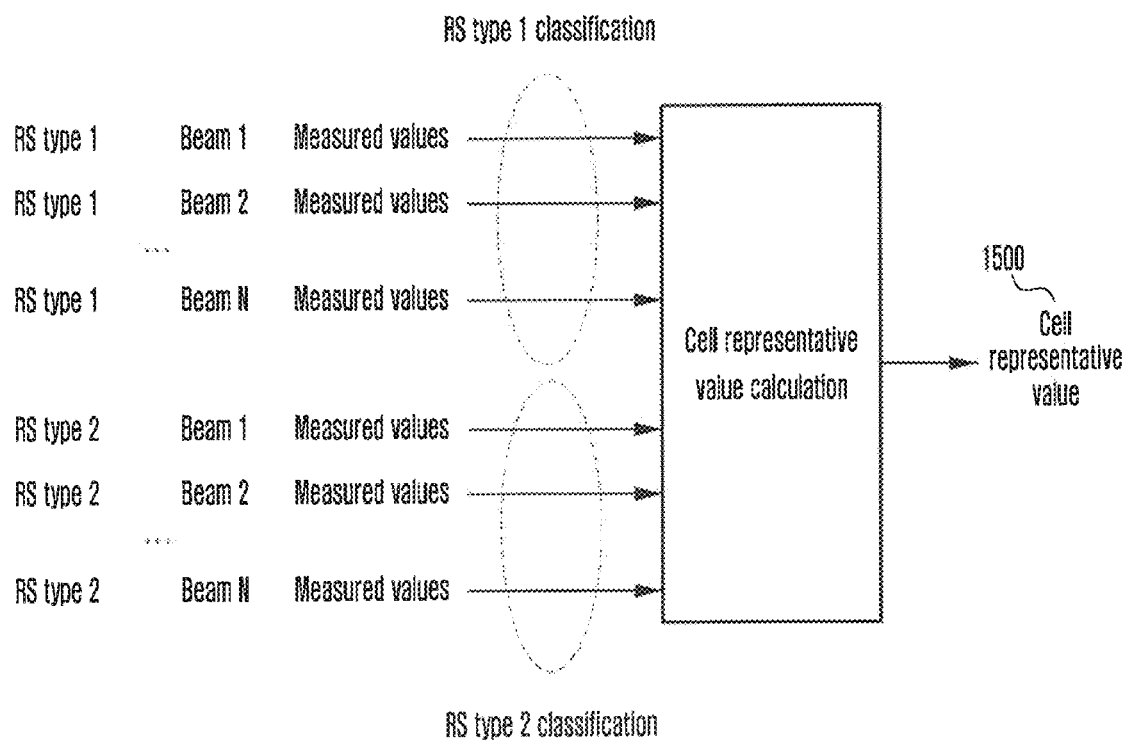
FIG. 15 is a diagram illustrating a method for classifying measured signals into reference signals of the same type and calculating a cell representative value by using measured values according to an embodiment of the disclosure.

FIG. 15 is a diagram illustrating a method for classifying measured signals into reference signals of the same type and calculating a cell representative value by using measured values according to an embodiment of the disclosure.

Referring to FIG. 15, the terminal may classify received signals by type. Then, the terminal may calculate a cell representative value 1500 by using measured values of the classified signals, and use the calculated cell representative value for the idle mode cell selection, the connected mode RRM measurement, or the like.

There are various methods for calculating the cell representative value by using measurement results of same type signals transmitted on beams having the same characteristics. For example, measured values may be summed up, averaged, weighted summed, or weighted averaged. The measured value may be a value obtained by applying L1 filtering or L3 filtering to the result of measurement through sweeping of a base station beam and a terminal beam. In this case, the measured value may be calculated as a single value through a method such as summation, average, weighted summation, or weighted average before and after L1 filtering or before and after L3 filtering, and then the cell representative value may be obtained through a subsequent process.

In addition, the measured value may be measured for each beam pair, for the same base station beam, or for the same terminal beam. These methods may be equally used as a method for calculating a cell representative value by using only one type signals according to the present patent.

Figure 16:
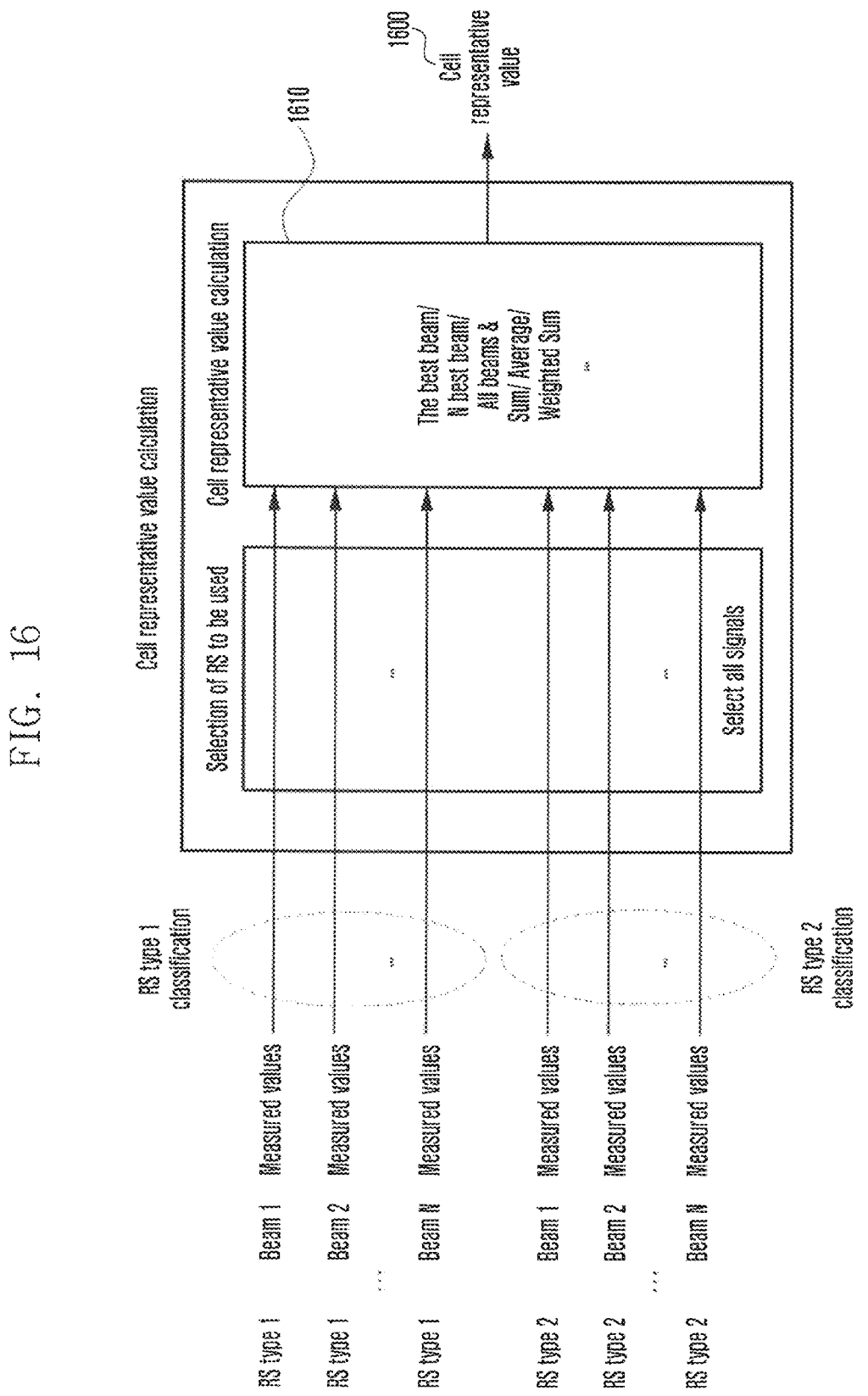
FIG. 16 is a diagram illustrating a method for calculating a cell representative value by using all measured reference signals according to an embodiment of the disclosure.

FIG. 16 is a diagram illustrating a method for calculating a cell representative value by using all measured reference signals according to an embodiment of the disclosure.

Referring to FIG. 16, a cell representative value 1600 may be calculated through a method 1610 such as summation, average, weighted summation, or weighted average for a beam of best signal strength, N beams of good signal strength, or all beams. In this case, the measured value may be calculated for each beam, and the above-described methods for calculating the cell representative value may be used.

Figure 17:
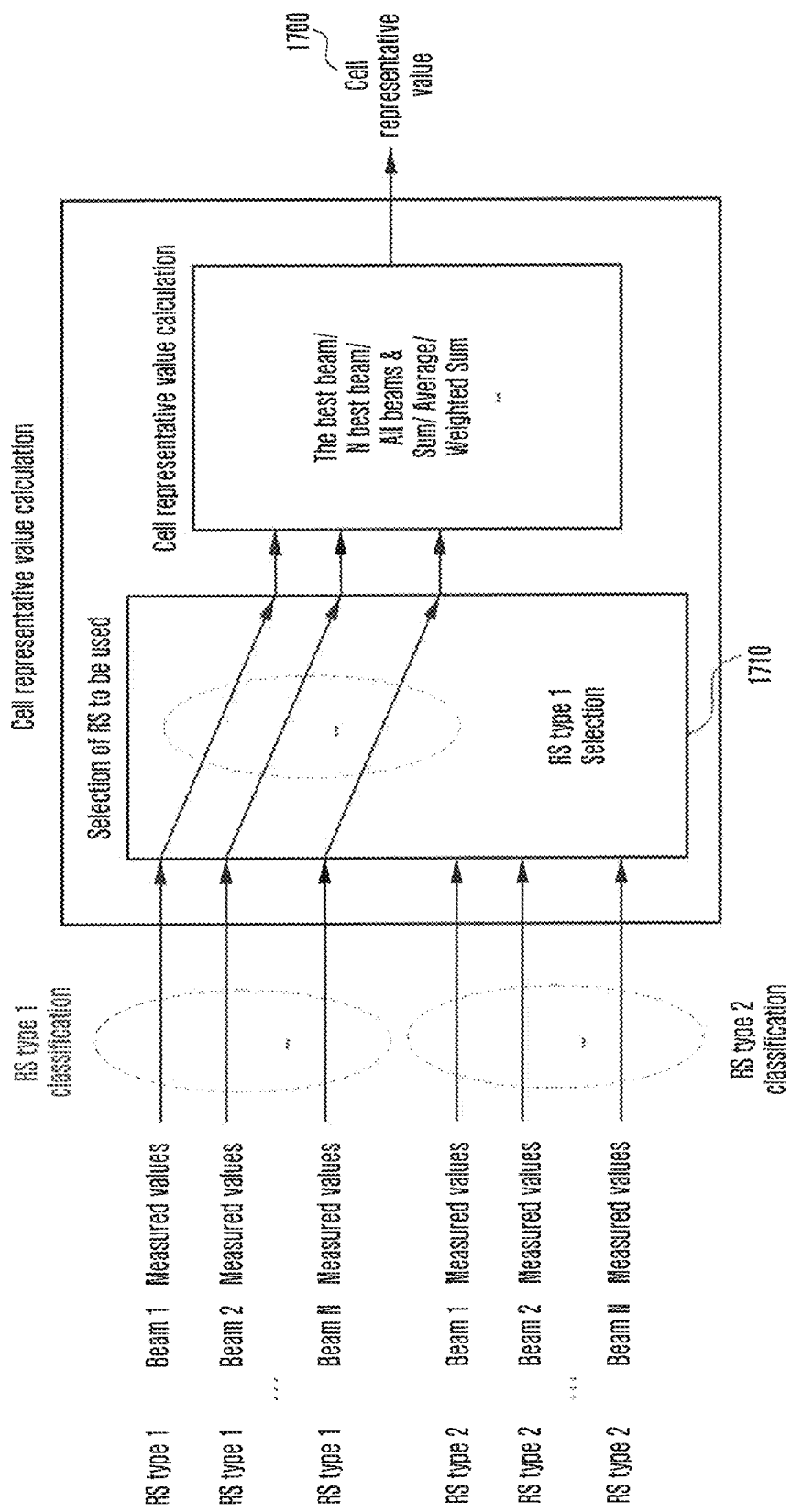
FIG. 17 is a diagram illustrating a method for calculating a cell representative value according to an embodiment of the disclosure.

FIG. 17 is a diagram illustrating a method for calculating a cell representative value according to an embodiment of the disclosure.

Referring to FIG. 17, the terminal may identify the types of the classified reference signals, select one or more reference signal types, and calculate the cell representative value.

Specifically, the terminal may select a reference signal type 1 at operation 1710 and calculate a cell representative value 1700 by using measured values of reference signals transmitted on various beams included in the selected type. Of course, the above-described methods for calculating the cell representative value by using only beams included in reference signals of the same type may be used.

Referring to FIG. 17, a rule used by the terminal to select a specific type of reference signal and calculate a representative value of a corresponding cell may be already determined in the system including the terminal and the base station. Therefore, the terminal and the base station may know in advance such a rule without special information exchange and signal transmission. Such rules for selecting a reference signal may be determined by considering one or more of the following examples:

If a reference signal beam of a particular type prioritized in the standard is observed and measured, the terminal may calculate the cell representative value with only the reference signal beam of that particular type. For example, when a beam specific reference signal (beam RS, additional RS, beamformed demodulation RS (DM-RS), channel state indicator (CSI)-RS (CSI-RS), etc.) is measured, the terminal may calculate the cell representative value by using only the corresponding reference signal type.

Alternatively, if a reference signal type having a narrower beam width than other types is observed and measured, the terminal may prioritize the reference signal type having the narrowest beam width and calculate the cell representative value by using only this reference signal type.

Alternatively, if a reference signal type having a wider beam width than other types is observed and measured, the terminal may prioritize the reference signal type having the widest beam width and calculate the cell representative value by using only this reference signal type.

Alternatively, if a reference signal type transmitted more frequently than other types is observed and measured, the terminal may prioritize the most frequently transmitted reference signal type and calculate the cell representative value by using only this reference signal type.

Alternatively, if a reference signal type transmitted more sparsely than other types is observed and measured, the terminal may prioritize the most sparsely transmitted reference signal type and calculate the cell representative value by using only this reference signal type.

Alternatively, if a reference signal type transmitted in a wider coverage than other types is observed and measured, the terminal may prioritize the reference signal type transmitted in the widest coverage and calculate the cell representative value by using only this reference signal type.

Alternatively, if a reference signal type transmitted in a smaller coverage than other types is observed and measured, the terminal may prioritize the reference signal type transmitted in the smallest coverage and calculate the cell representative value by using only this reference signal type.

In another embodiment, the terminal may manage mobility by using only a reference signal supported by different base stations (i.e., a serving base station and a target base station).

In addition, the base station may transmit a certain signal and participate (config.) in the corresponding determination to allow the terminal to select a specific type of reference signal.

Figure 18:
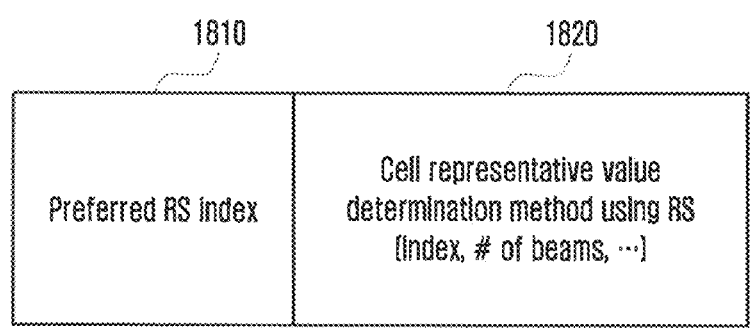

FIGS. 18 and 19 show examples of a signal transmitted to a terminal by a base station and utilized to calculate a cell measured value according to an embodiment of the disclosure.

Referring to FIG. 18, the signal transmitted to the terminal by the base station may include a preferred reference signal type 1810 and information 1820 about a method for determining a cell representative value by using the reference signal. For example, this information 1820 may include the number of beams (e.g., 1, K, all) to be used for determining a cell representative value, an index indicating a method for selecting a beam (e.g., whether to select an arbitrary beam or the best beam), the type of an equation for calculating a cell representative value (e.g., sum, average, and weighted sum with different weights for different K beams), and the like.

The base station and the terminal may know in advance an index regarding a method for calculating a cell representative value as shown in Table 9 below. In case of weighted summation, the base station should transmit respective weights as shown in FIG. 20.

TABLE 9

Derivation index in a base station transmission signal for measurement of a cell representative value by a terminal (Derivation index for cell level measurement)

| Derivation Method | Index |
| --- | --- |
| Summation | 0 |
| Average | 1 |
| Weighted summation | 2 |

Referring to FIG. 19, alternatively, the signal transmitted to the terminal by the base station may include indexes 1910, 1920, and 1930 of preferred reference signal types and information 1940, 1950, and 1960 about methods for determining a cell representative value by using the reference signal. For example, this information 1820 may include the number of beams (e.g., 1, K, all) to be used for determining a cell representative value, an index indicating a method for selecting a beam (e.g., whether to select an arbitrary beam or the best beam), the type of an equation for calculating a cell representative value (e.g., sum, average, and weighted sum with different weights for different K beams), and the like. The base station and the terminal may know in advance an index of each reference signal type as shown in Table 10 below.

TABLE 10

Reference signal index for measurement of a cell representative value by a terminal the UE (RS index for cell level measurement)

| Kind of RS | Index |
| --- | --- |
| Beam based additional RS (could be BRS, MRS, CSI-RS, —) | 0 |
| Synchronization Signal | 1 |
| DM-RS for PBCH | 2 |

This information may be included as an information element in part of a certain RRC message, as a media access control (MAC) control element (CE) in part of a certain MAC message, or as a physical (PHY) element in part of a certain PHY message.

FIG. 20 is a diagram illustrating an example of a signal including weights transmitted to a terminal by a base station according to an embodiment of the disclosure.

Referring to FIG. 20, the signal may include a preferred reference signal type 2010, the number of beams 2020 to be used, and information about a method 2030 for determining a cell representative value. Also, any information described above in FIGS. 18 and 19 may be further included. In addition, if the method for determining a cell representative value is weighted average or weighted summation, the base station may transmit respective weights 2040 to the terminal.

Figure 21:
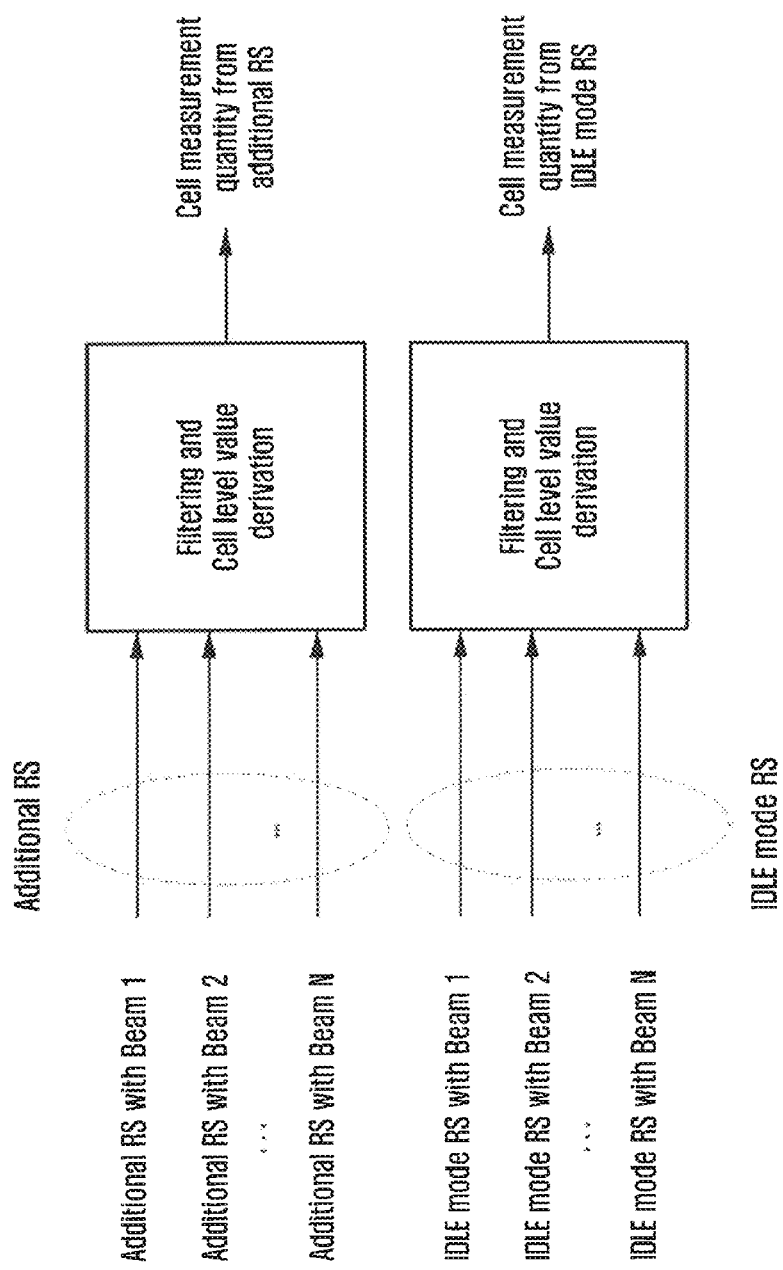
FIG. 21 is a diagram illustrating a method for a terminal to calculate a cell representative value for each reference signal (RS) from different RSs through a separate procedure according to an embodiment of the disclosure.

FIG. 21 is a diagram illustrating a method for a terminal to calculate a cell representative value for each RS from different RSs through a separate procedure according to an embodiment of the disclosure.

Referring to FIG. 21, the terminal may calculate cell representative values for respective RSs through separate procedures without mixing or selecting different beam measurement information received from different type RSs. In this case, the filtering and cell representative value calculation equations for different type RSs may be the same or different.

If different filtering and cell representative value calculation equations are used for different type RSs, the base station may transmit this information to the terminal to perform filtering and cell representative value calculation.

Figure 22:
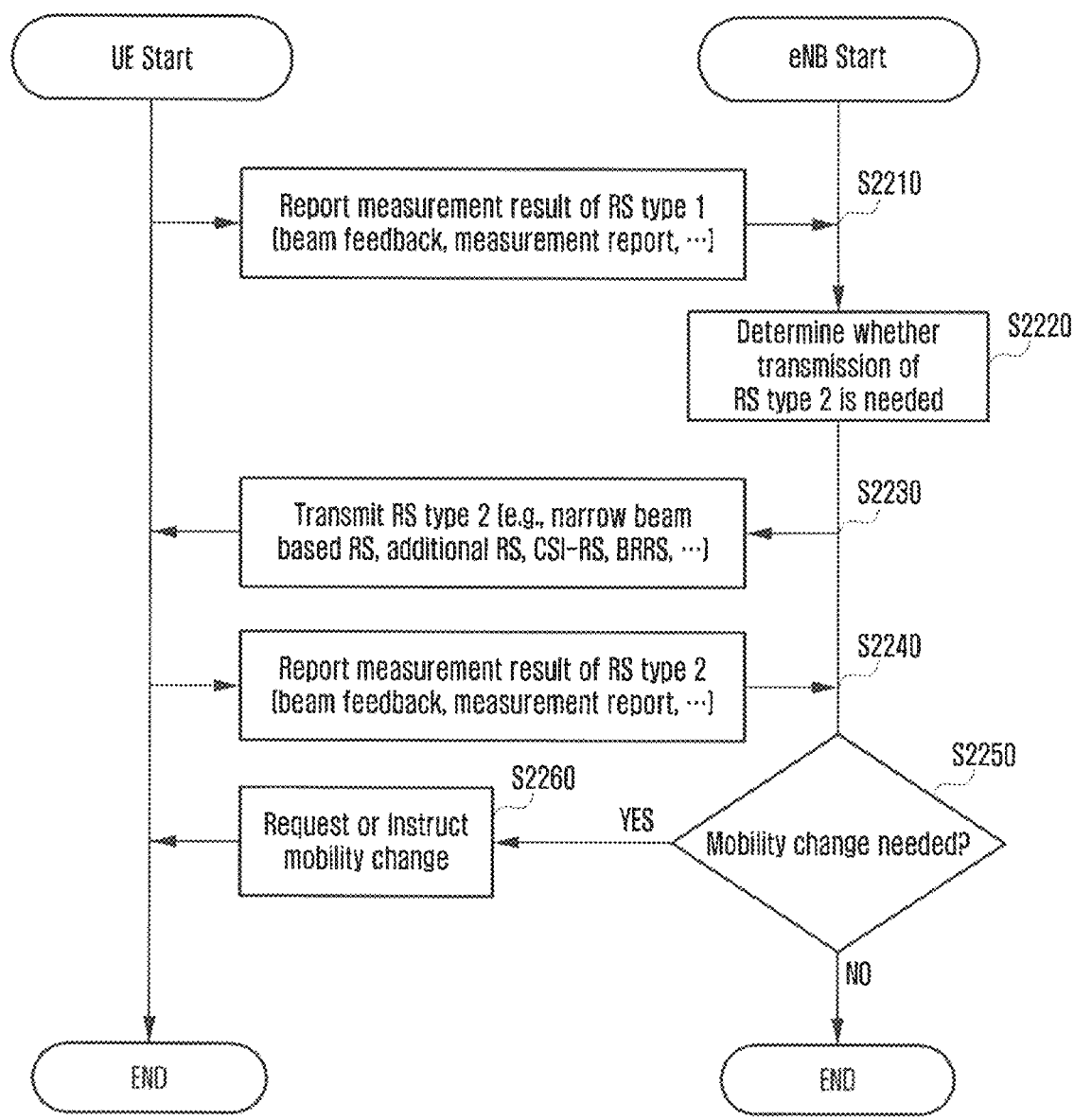
FIG. 22 is a diagram illustrating a method for controlling a change of mobility by using different types of reference signals according to an embodiment of the disclosure.

FIG. 22 is a diagram illustrating a method for controlling a change of mobility by using different types of reference signals according to an embodiment of the disclosure.

Referring to FIG. 22, a UE (i.e., a terminal) may report a measurement result of a reference signal type 1 at operation S2210.

Based on the measurement result, a gNB (i.e., a base station) may determine at operation S2220 whether transmission of a reference signal type 2 is needed.

If it is determined that transmission of the reference signal type 2 is required, the gNB may transmit the reference signal type 2 to the UE at operation S2230. Then, the gNB may receive a measurement result of the reference signal type 2 at operation S2240.

At operation S2250, the gNB determines whether a mobility change (handover, etc.) is necessary, based on the measurement result. If necessary, the gNB may request or instruct the mobility change at operation S2260.

At this time, the gNB may determine a cell representative value by using values measured through different types of reference signals according to a method described above or to be described below, and then determine, by using the representative value, whether the mobility change is necessary.

FIGS. 23 to 28 show various embodiments of selecting different numbers (N1, N2, . . . , Nk) of beam measurement signals for different types of reference signals (RSs) in the order of best performance and then deriving a cell representative value by multiplying the selected signals by different weights according to various embodiments of the present disclosure. This weight may be a positive number or a negative number, and may be greater or smaller than 1.

Figure 23:
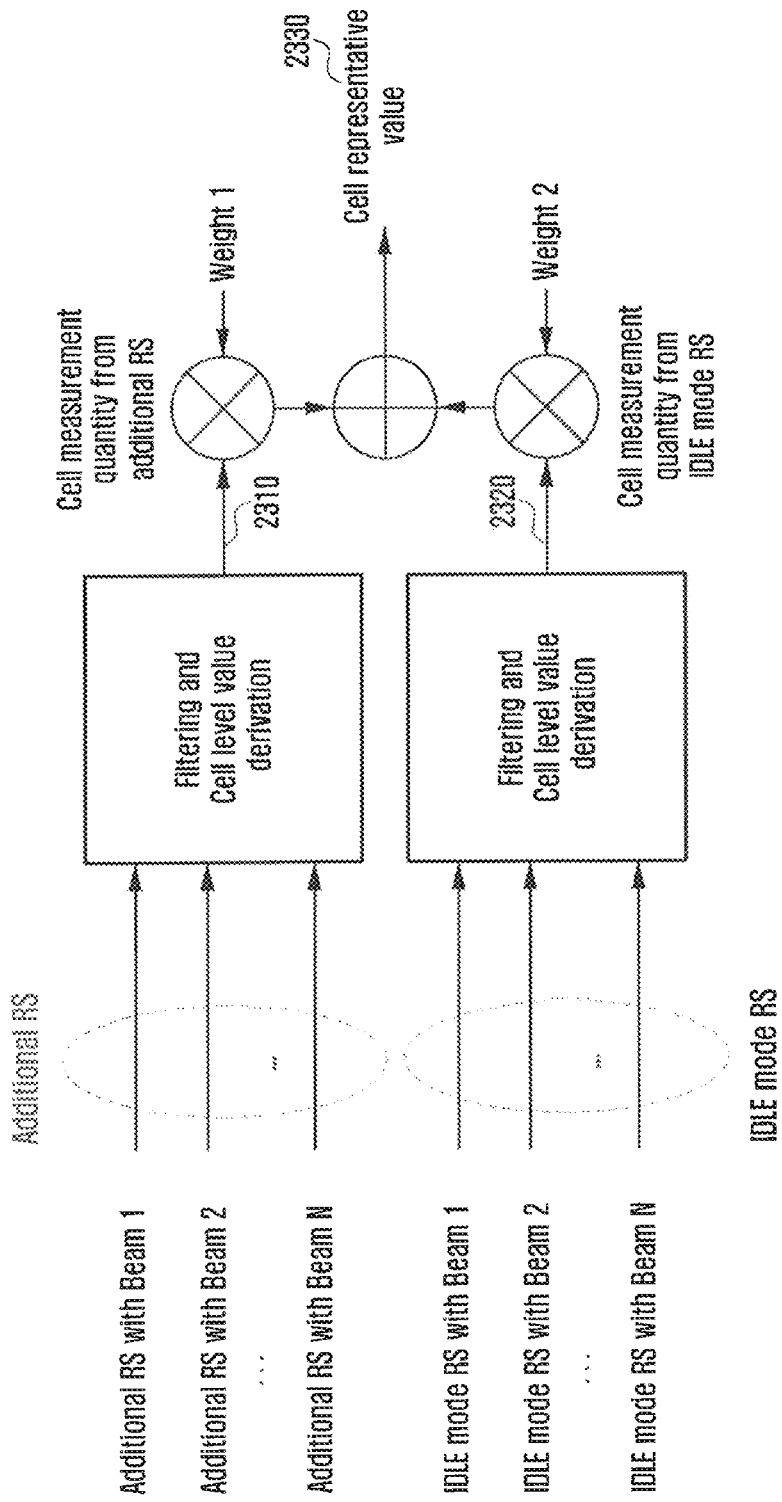
FIG. 23 shows a method for calculating representative values for respective RSs through separate procedures for different types of RSs and then determining one cell representative value by using the above representative values according to an embodiment of the disclosure.

Referring to FIG. 23, a method is illustrated for calculating representative values 2310 and 2320 for respective RSs through separate procedures for different types of RSs and then determining one cell representative value by using the above representative values. Referring to FIG. 23, the UE may determine the cell representative value by multiplying a measured value determined for each RS by a weight.

Figure 24:
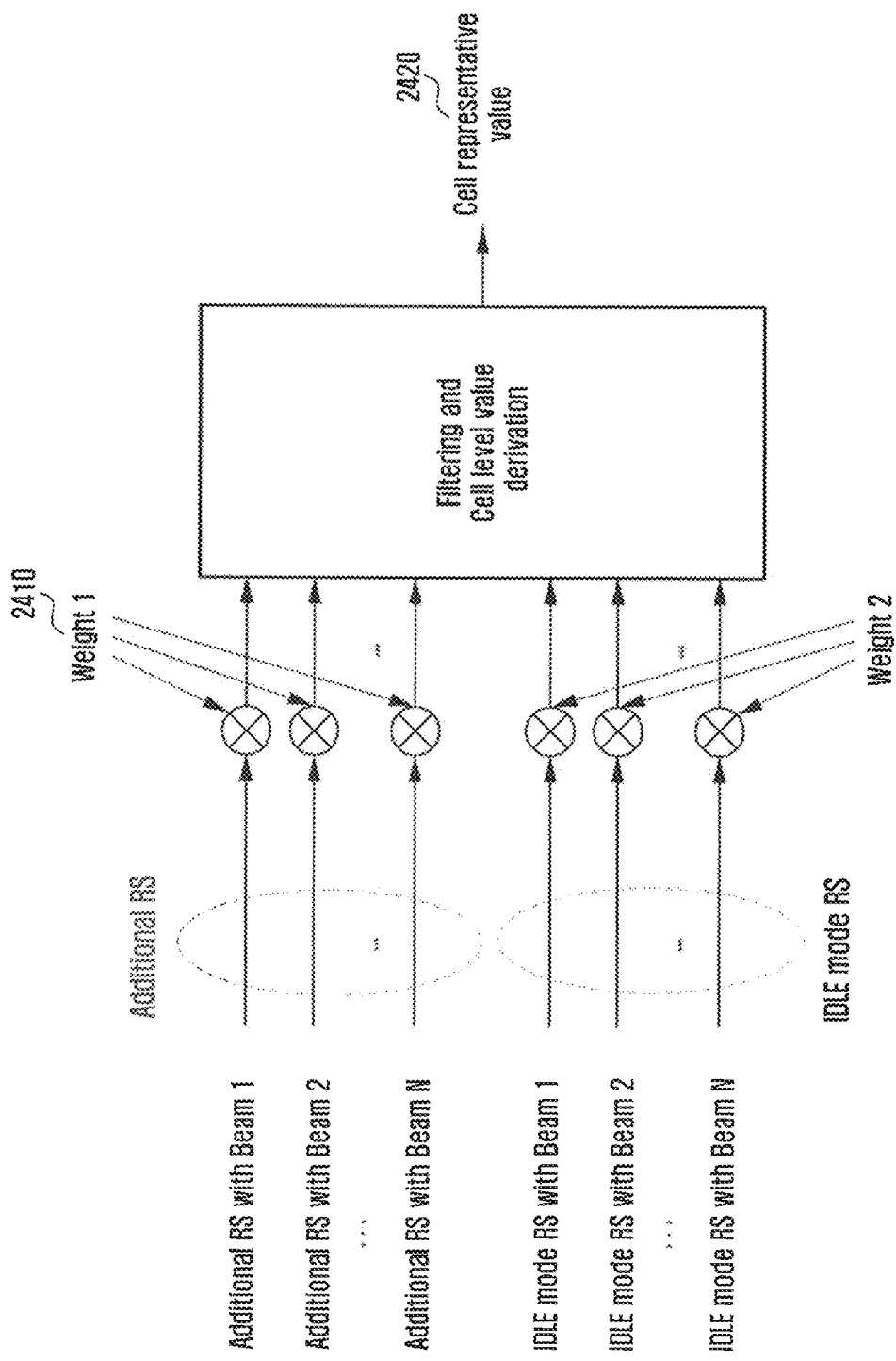
FIG. 24 shows a method for multiplying each beam measurement signal by the same weight with respect to the same type of RSs and then determining a cell representative value according to an embodiment of the disclosure.

Referring to FIG. 24 a method is illustrated for multiplying each beam measurement signal by the same weight 2410 with respect to the same type of RSs and then determining a cell representative value 2420. On the other hand, with respect to different types of RSs, different weights (weight 1 and weight 2) may be applied. However, the weight 1 and the weight 2 may be the same value.

Figure 25:
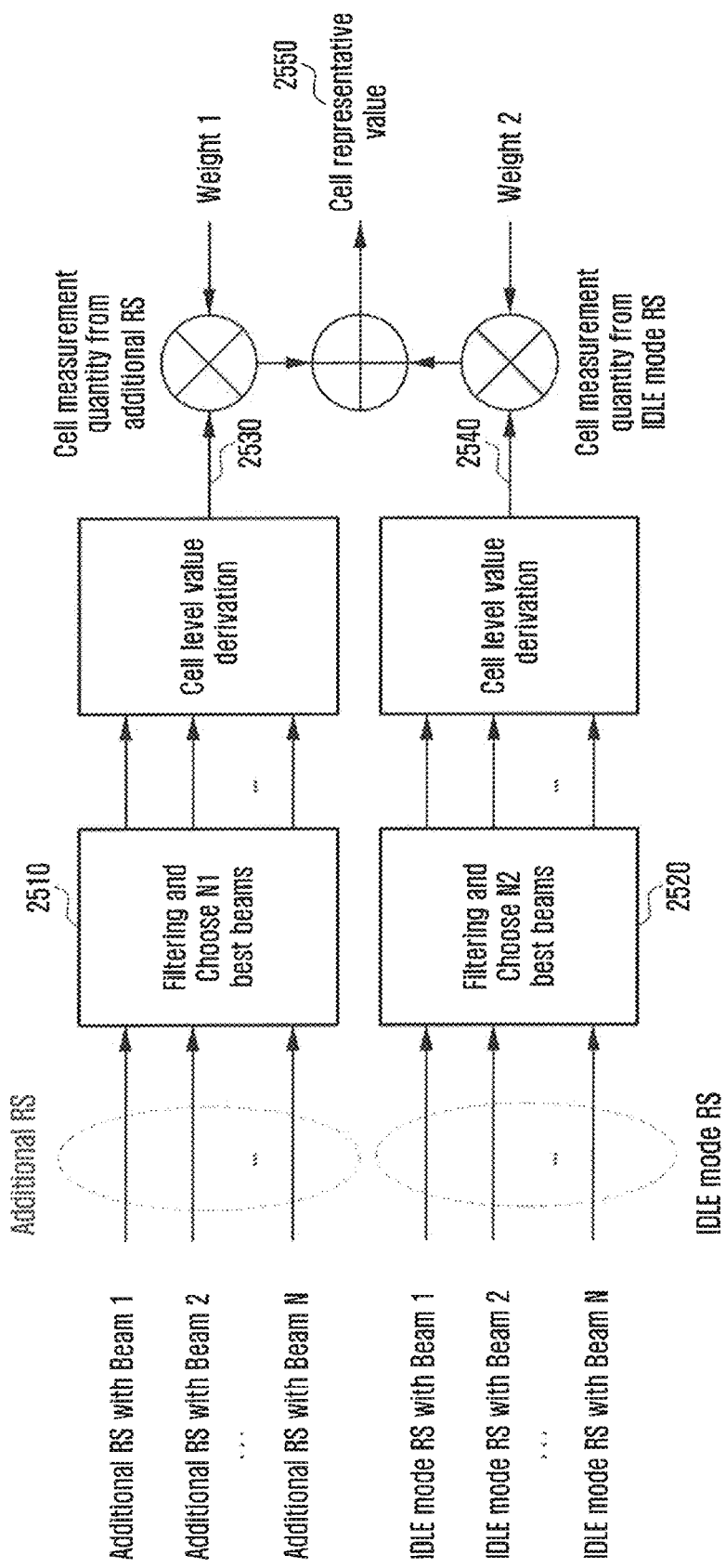
FIG. 25 shows a method for selecting a specific number of beam measurement signals with respect to different types of RSs, multiplying a representative value for each RS by a weight, and thereby deriving a cell representative value according to an embodiment of the disclosure.

Referring to FIG. 25 a method is illustrated for selecting a specific number of beam measurement signals with respect to different types of RSs, multiplying a representative value for each RS by a weight, and thereby deriving a cell representative value. Referring to FIG. 25, the UE may select N1 best beams 2510 and N2 best beams 2520 for additional RSs and idle mode RSs, respectively, and then determine representative values 2530 and 2540 for the respective RSs. Also, the UE may calculate a cell representative value 2550 by applying a weight to the representative value for each RS.

Figure 26:
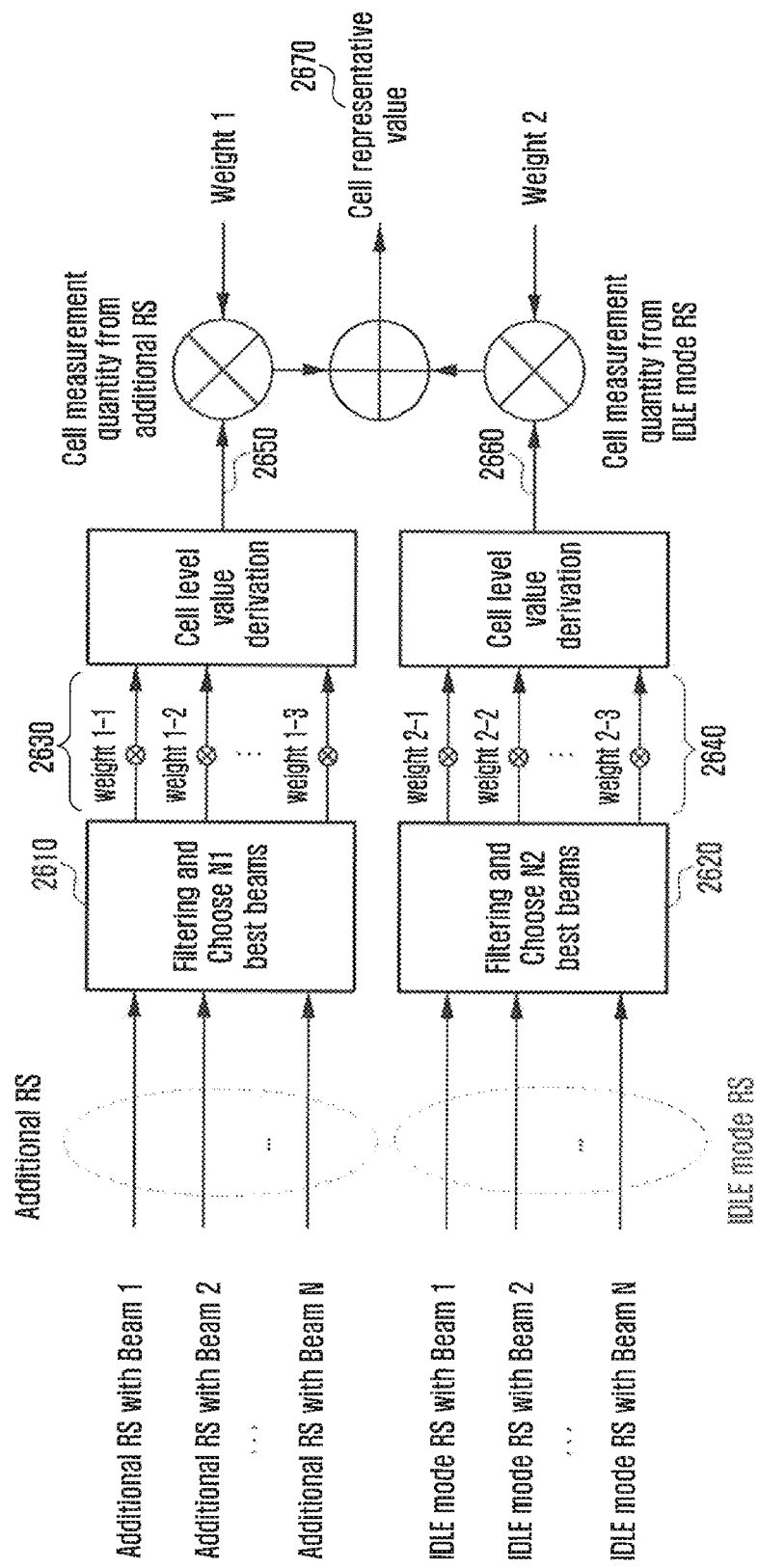
FIG. 26 shows a method for selecting a specific number of beam measurement signals with respect to different types of RSs, calculating a representative value for each RS type by multiplying each selected beam measurement signal by a weight, and deriving a cell representative value by multiplying the representative value for each RS type by a weight according to an embodiment of the disclosure.

Referring to FIG. 26 a method is illustrated for selecting a specific number of beam measurement signals with respect to different types of RSs, calculating a representative value for each RS type by multiplying each selected beam measurement signal by a weight, and deriving a cell representative value by multiplying the representative value for each RS type by a weight. In this case, the weights applied to the respective beam measurement signals may be different from or equal to each other.

Referring to FIG. 26, the UE selects N1 best beams 2610 and N2 best beams 2620 for additional RSs and idle mode RSs, respectively, multiplies each selected beam measurement signal by a corresponding weight 2630 or 2640, and determines a representative value 2650 or 2660 for each RS type. Then, the UE may calculate a cell representative value 2670 by applying a weight to the representative value for each RS type.

Figure 27:
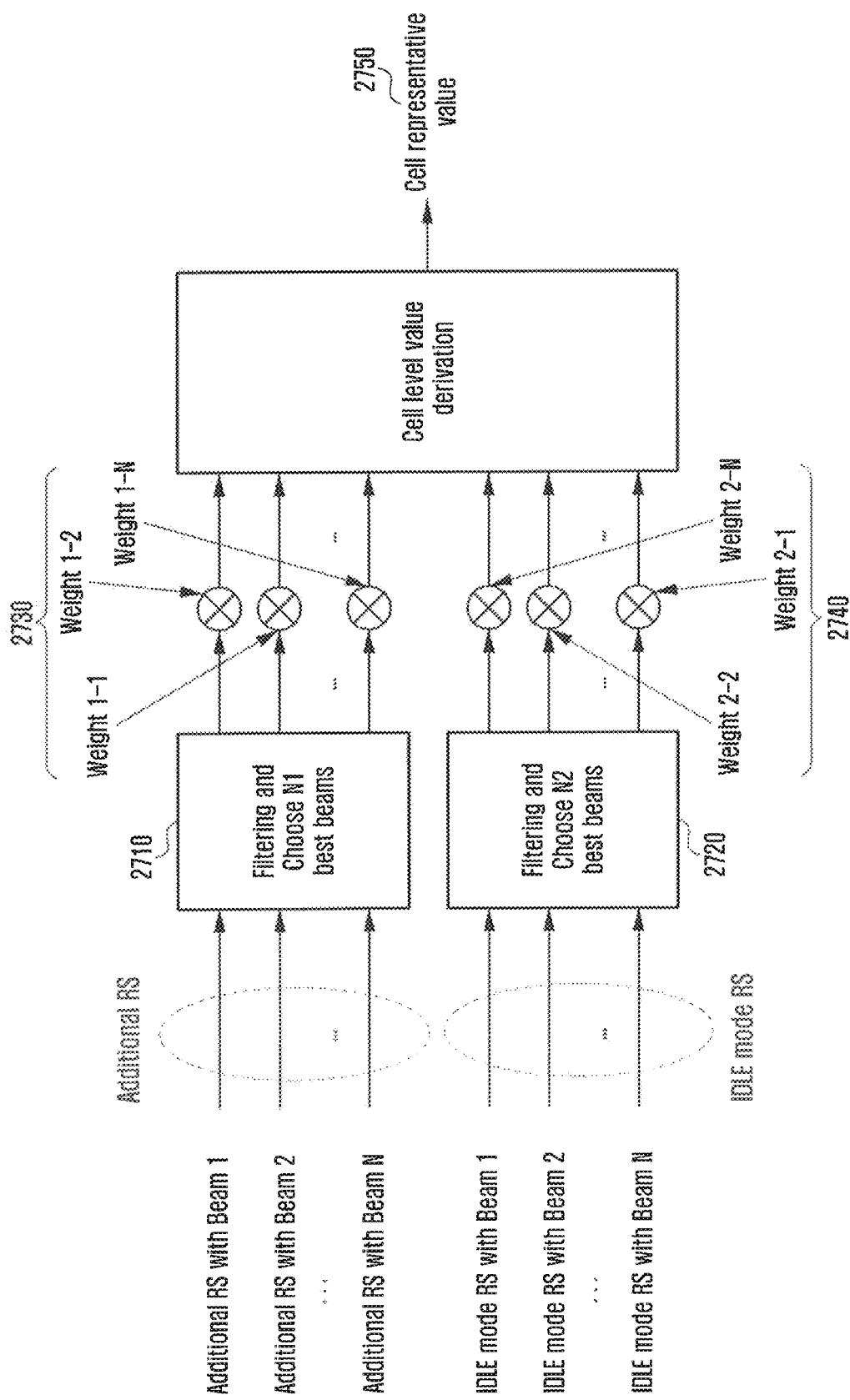
FIG. 27 shows another method for selecting a different number of beam measurement signals with respect to different types of RSs and then deriving a cell representative value by multiplying the selected signals by different weights according to an embodiment of the disclosure.

FIG. 27 shows another method for selecting a different number of beam measurement signals with respect to different types of RSs and then deriving a cell representative value by multiplying the selected signals by different weights according to an embodiment of the disclosure.

Referring to FIG. 27, the UE may select N1 best beams 2710 and N2 best beams 2720 for additional RSs and idle mode RSs, respectively, and multiply each selected beam measurement signal by a corresponding weight 2730 or 2740. Then, using the result, the UE may calculate a cell representative value 2770. In this case, the weights applied to the respective beam measurement signals may be different from or equal to each other.

Figure 28:
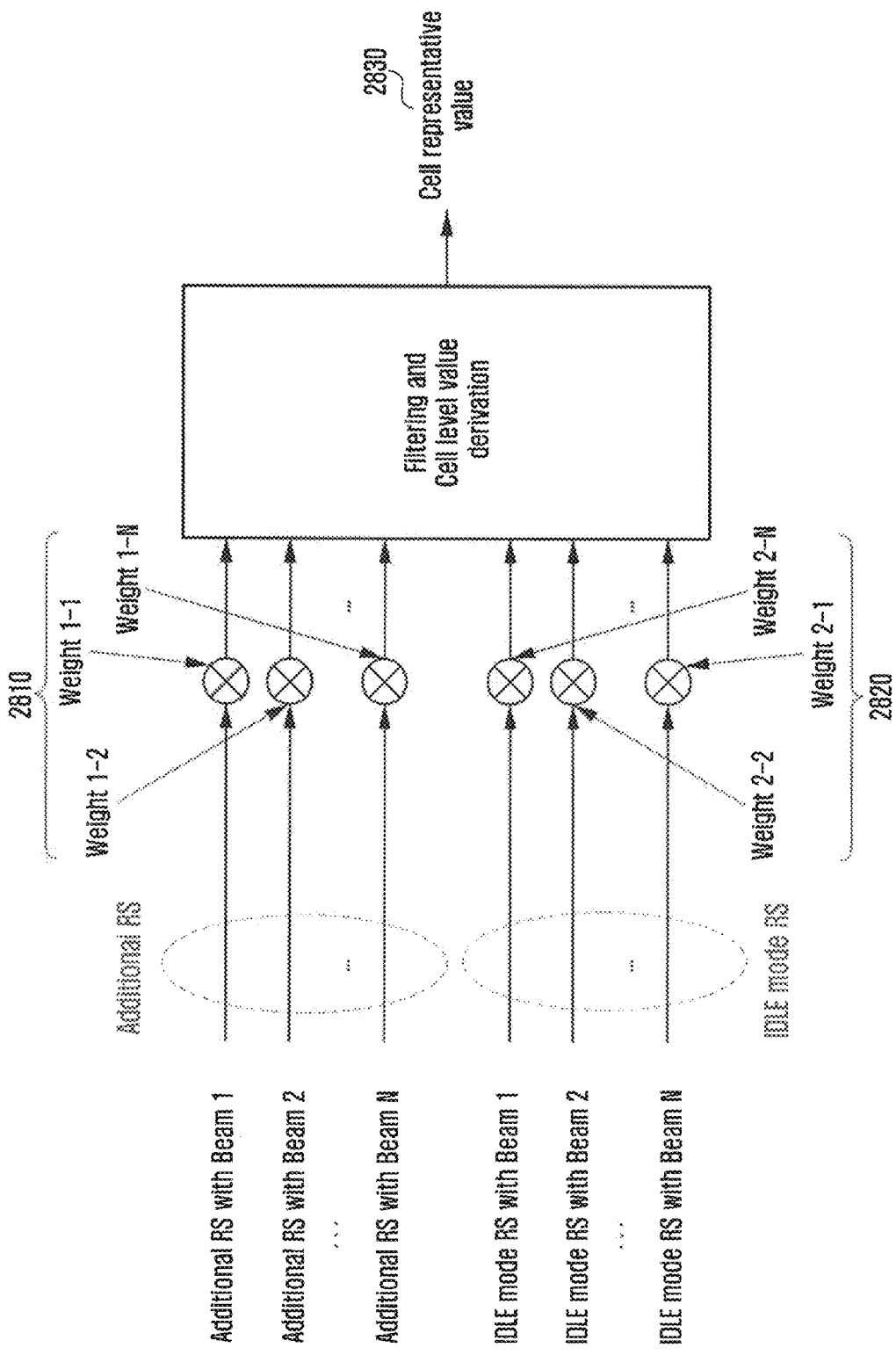
FIG. 28 is a diagram illustrating a method for deriving a cell representative value by multiplying all beam measurement signals by different weights with respect to different types of RSs according to an embodiment of the disclosure.

FIG. 28 is a diagram illustrating a method for deriving a cell representative value by multiplying all beam measurement signals by different weights with respect to different types of RSs according to an embodiment of the disclosure.

Referring to FIG. 28, the UE may multiply each of all beam measurement signals for additional RSs and idle mode RSs by corresponding weight 2810 or 2820. Then, using the result, the UE may calculate a cell representative value 2830. In this case, the weights applied to the respective beam measurement signals may be different from or equal to each other.

Figure 29:
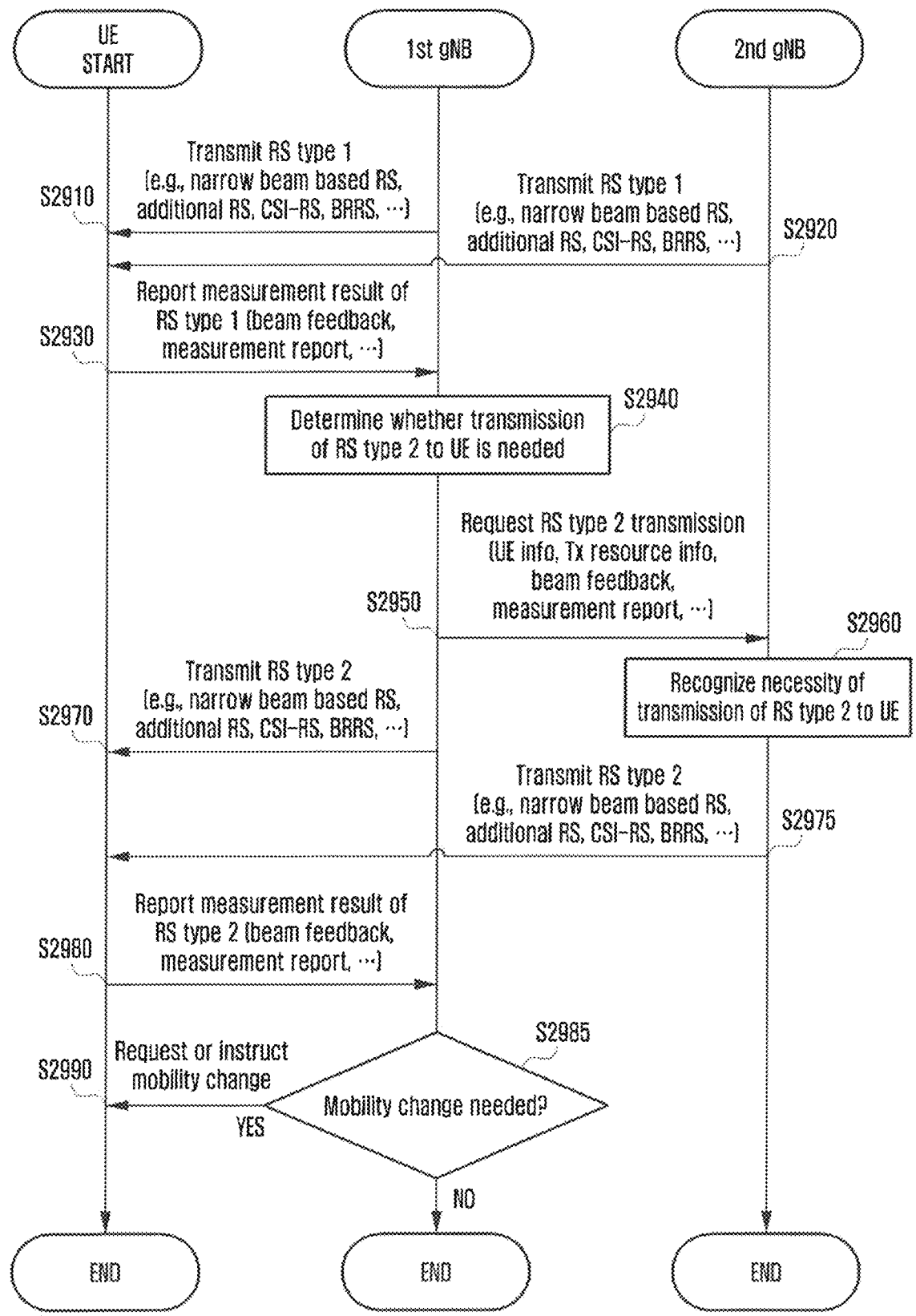
FIG. 29 is a diagram illustrating a method for controlling a mobility change by using different types of reference signals according to an embodiment of the disclosure.

FIG. 29 is a diagram illustrating a method for controlling a mobility change by using different types of reference signals according to an embodiment of the disclosure.

Referring to FIG. 29, the UE may receive a reference signal type 1 from each of the first gNB and the second gNB base station at operations S2910 and S2920, and then report a measurement result to the first gNB at operation S2930.

Based on the measurement result, the first gNB may determines at operation S2940 whether transmission of a reference signal type 2 is required. If it is determined that it is necessary, the first gNB may request the reference signal type 2 to the second gNB at operation S2950.

Accordingly, the second gNB may recognize the necessity of transmission of the reference signal type 2 at operation S2960. Then, each of the first gNB and the second gNB may transmit the reference signal type 2 to the UE at operations S2970 and S2975. Therefore, the UE may transmit a measurement result for the reference signal type 2 to the first gNB at operation S2980. Then, at operation S2985, the first gNB may determine, based on the measurement result, whether it is necessary to change the mobility. If necessary, the first gNB may transmit a request or instruction for the mobility change to the UE at operation S2990.

<Measurement Report Triggering Events Using Measured Values of Different RSs>

| Event | Description |
|---|---|
| | [event NR1] |
| NR1 | Serving becomes better than threshold<br>(Entering condition)<br>NR1-1-1) Ms(IDLE mode RS) − Hys1 > Threshold1<br>NR1-1-2) Ms(Additional RS) − Hys2 > Threshold2<br>NR1-1-3) (Ms(IDLE mode RS) − Hys1 > Threshold1)<br>    && (Ms(Additional RS) − Hys2 > Threshold2)<br>NR1-1-4) MS(IDLE mode RS) + Ms(Additional RS) − Hys3 > Threshold3<br>(Leaving condition)<br>NR1-2-1) Ms(IDLE mode RS) + Hys1 < Threshold1<br>NR1-2-2) Ms(Additional RS) + Hys2 < Threshold2<br>NR1-2-3) (Ms(IDLE mode RS) + Hys1 < Threshold1)<br>    && (Ms(Additional RS) + Hys2 < Threshold2)<br>NR1-2-4) Ms(IDLE mode RS) + Ms(Additional RS) + Hys3 < Threshold3<br># Ms(IDLE mode RS) is the measurement result of the serving cell derived from IDLE mode RS, not taking into account any offsets,<br># Ms(Additional RS) is the measurement result of the serving cell derived from additional RS, not taking into account any offsets,<br># Hys1, Hys2, and Hys3 are the hysteresis parameter for this event (i.e. hysteresis as defined within reportConfigEUTRA for this event),<br># Threshold1, Threshold2, and Threshold3 are the threshold parameter for this event (i.e. a1-Threshold1, a1-Threshold2, and a1-Threshold3 as defined within reportConfigEUTRA for this event).<br># Ms(IDLE mode RS) is expressed in dBm in case of RSRP, or in dB in case of RSRQ and RS-SINR,<br># Ms(Additional RS) is expressed in dBm in case of RSRP, or in dB in case of RSRQ and RS-SINR,<br># Hys1, Hys2, and Hys3 are expressed in dB,<br># Threshold1, Threshold2, and Threshold3 are expressed in the same unit as Ms. |
| | [event NR2] |
| NR2 | Serving becomes worse than threshold<br>(Entering condition)<br>NR2-1-1) Ms(IDLE mode RS) + Hys1 < Threshold1<br>NR2-1-2) Ms(Additional RS) + Hys2 < Threshold2<br>NR2-1-3) (Ms(IDLE mode RS) + Hys1 < Threshold1)<br>    && (Ms(Additional RS) + Hys2 < Threshold2)<br>NR2-1-4) Ms(IDLE mode RS) + Ms(Additional RS) + Hys3 < Threshold3<br>(Leaving condition)<br>NR2-2-1) Ms(IDLE mode RS) − Hys1 > Threshold1<br>NR2-2-2) Ms(Additional RS) − Hys2 > Threshold2<br>NR2-2-3) (Ms(IDLE mode RS) − Hys1 > Threshold1)<br>    && (Ms(Additional RS) − Hys2 > Threshold2)<br>NR2-2-4) Ms(IDLE mode RS) + Ms(Additional RS) − Hys3 > Threshold3<br># Ms(IDLE mode RS) is the measurement result of the serving cell derived from IDLE mode RS, not taking into account any offsets,<br># Ms(Additional RS) is the measurement result of the serving cell derived from additional RS, not taking into account any offsets,<br># Hys1, Hys2, and Hys3 are the hysteresis parameter for this event (i.e. hysteresis as defined within reportConfigEUTRA for this event),<br># Threshold1, Threshold2, and Threshold3 are the threshold parameter for this event (i.e. a1-Threshold1, a1-Threshold2, and a1-Threshold3 as defined within reportConfigEUTRA for this event).<br># Ms(IDLE mode RS) is expressed in dBm in case of RSRP, or in dB in case of RSRQ and RS-SINR,<br># Ms(Additional RS) is expressed in dBm in case of RSRP, or in dB in case of RSRQ and RS-SINR,<br># Hys1, Hys2, and Hys3 are expressed in dB,<br># Threshold1, Threshold2, and Threshold3 are expressed in the same unit as Ms. |

The following table divided into several pages shows the description of event NR3.

| | [event NR3] |
|---|---|
| NR3 | Neighbour becomes offset better than PCell/ PSCell<br>(Entering condition)<br>NR3-1-1) Mn(IDLE mode RS) + Ofn1 + Ocn1 − Hys1 > Mp(IDLE mode RS) + Ofp1 + Ocp1 + Off1 |

NR3-1-2) Mn(Additional RS) + Ofn2 + Ocn2 − Hys2 > Mp(Additional RS) + Ofp2 + Ocp2 + Off2
NR3-1-3) (Mn(IDLE mode RS) + Ofn1 + Ocn1 − Hys1 > Mp(IDLE mode RS) + Ofp1 + Ocp1 + Off1)
&& (Mn(Additional RS) + Ofn2 + Ocn2 − Hys2 > Mp(Additional RS) + Ofp2 + Ocp2 + Off2)
NR3-1-4) Mn(IDLE mode RS) + Mn(Additional RS) + Ofn3 + Ocn3 − Hys3 > Mp(IDLE mode RS) + Mp(Additional RS) + Ofp3 + Ocp3 + Off3
(Leaving condition)
NR3-2-1) Mn(IDLE mode RS) + Ofn1 + Ocn1 + Hys1 < Mp(IDLE mode RS) + Ofp1 + Ocp1 + Off1
NR3-2-2) Mn(Additional RS) + Ofn2 + Ocn2 + Hys2 < Mp(Additional RS) + Ofp2 + Ocp2 + Off2
NR3-2-3) (Mn(IDLE mode RS) + Ofn1 + Ocn1 + Hys1 < Mp(IDLE mode RS) + Ofp1 + Ocp1 + Off1)
&& (Mn(Additional RS) + Ofn2 + Ocn2 + Hys2 < Mp(Additional RS) + Ofp2 + Ocp2 + Off2)
NR3-2-4) Mn(IDLE mode RS) + Mn(Additional RS) + Ofn3 + Ocn3 + Hys3 < Mp(IDLE mode RS) + Mp(Additional RS) + Ofp3 + Ocp3 + Off3
Mn(IDLE mode RS) is the measurement result of the neighbour cell derived from IDLE mode RS, not taking into account any offsets,
Mn(Additional RS) is the measurement result of the neighbour cell derived from additional RS, not taking into account any offsets,
Mp(IDLE mode RS) is the measurement result of the PCell/ PSCell derived from IDLE mode RS, not taking into account any offsets,
Mp(Additional RS) is the measurement result of the PCell/ PSCell derived from additional RS, not taking into account any offsets.
Hys1, Hys2, and Hys3 are the hysteresis parameter for this event (i.e. hysteresis as defined within reportConfigEUTRA for this event),
Ofn1, Ofn2, and Ofn3 are the frequency specific offset of the frequency of the neighbour cell (i.e. offsetFreq as defined within measObjectEUTRA corresponding to the frequency of the neighbour cell).
Ocn1, Ocn2, and Ocn3 are the cell specific offset of the neighbour cell (i.e. cellIndividualOffset as defined within measObjectEUTRA corresponding to the frequency of the neighbour cell), and set to zero if not configured for the neighbour cell.
Ofp1, Ofp2, and Ofp3 are the frequency specific offset of the frequency of the PCell/ PSCell (i.e. offsetFreq as defined within measObjectEUTRA corresponding to the frequency of the PCell/ PSCell).
Ocp1, Ocp2, and Ocp3 are the cell specific offset of the PCell/ PSCell (i.e. cellIndividualOffset as defined within measObjectEUTRA corresponding to the frequency of the PCell/ PSCell), and is set to zero if not configured for the PCell/ PSCell.
Off1, Off2, and Off3 are the offset parameter for this event (i.e. a3-Offset as defined within reportConfigEUTRA for this event).
Mn( ) and Mp( ) are expressed in dBm in case of RSRP, or in dB in case of RSRQ and RS-SINR,
Hys1, Hys2, and Hys3 are expressed in dB,
Ofn, Ocn, Ofp, Ocp, Off are expressed in dB.

[event NR4]

NR4 Neighbour becomes better than threshold
(Entering condition)
NR4-1-1) Mn(IDLE mode RS) + Ofn1 + Ocn1 − Hys1 > Threshold1
NR4-1-2) Mn(Additional RS) + Ofn2 + Ocn1 − Hys2 > Threshold2
MR4-1-3) (Mn(IDLE mode RS) + Ofn1 + Ocn1 − Hys1 > Threshold1)
&& (Mn(Additional RS) + Ofn2 + Ocn2 − Hys2 > Threshold2)
NR4-1-4) Mn(IDLE mode RS) + Mn(Additional RS) + Ofn3 + Ocn3 − Hys3 > Threshold3
(Leaving condition)
NR4-2-1) Mn(IDLE mode RS) + Ofn1 + Ocn1 + Hys1 < Threshold1
NR4-2-2) Mn(Additional RS) + Ofn2 + Ocn2 + Hys2 < Threshold2
NR4-2-3) (Mn(IDLE mode RS) + Ofn1 + Ocn1 + Hys1 < Threshold1)
&& (Mn(Additional RS) + Ofn2 + Ocn2 + Hys2 < Threshold2)
NR4-2-4) Mn(IDLE mode RS) + Mn(Additional RS) + Ofn3 + Ocn3 + Hys3 < Threshold3
Mn(IDLE mode RS) is the measurement result of the neighbour cell derived from IDLE mode RS, not taking into account any offsets.
Mn(Additional RS) is the measurement result of the neighbour cell derived from additional RS, not taking into account any offsets,
Hys1, Hys2, and Hys3 are the hysteresis parameter for this event (i.e. hysteresis as defined within reportConfigEUTRA for this event),
Ofn1, Ofn2, and Ofn3 are the frequency specific offset of the frequency of the neighbour cell (i.e. offsetFreq as defined within measObjectEUTRA corresponding to the frequency of the neighbour cell).
Ocn1, Ocn2 and Ocn3 are the cell specific offset of the neighbour cell (i.e. cellIndividualOffset as defined within measObjectEUTRA corresponding to the frequency of the neighbour cell), and set to zero if not configured for the neighbour cell.

Threshold1, Threshold2, and Threshold3 are the threshold parameter for this event
(i.e. a1-Threshold1, a1-Threshold2, and a1-Threshold3 as defined within
reportConfigEUTRA for this event).
Mn( ) are expressed in dBm in case of RSRP, or in dB in case of RSRQ and RS-SINR,
Hys1, Hys2, and Hys3 are expressed in dB,
Ofn, Ocn, Ofp, Ocp, Off are expressed in dB.
Threshold1, Threshold2, and Threshold3 are expressed in the same unit as Mn( )

The following table divided into several pages shows the description of event NR5.

[event NR5]

NR5  PCell/ PSCell becomes worse than thresholdA and neighbour becomes better than thresholdB
1 > consider the entering condition for this event to be satisfied when both condition
    5-1-X and condition 5-2-X, as specified below, are fulfilled;
1 > consider the leaving condition for this event to be satisfied when condition 5-3-X
    or condition 5-4-X, i.e. at least one of the two, as specified below, is fulfilled;
(Entering condition 1)
NR5-1-1) Mp(IDLE mode RS) + HysA1 < ThresholdA1
NR5-1-2) Mp(Additional RS) + HysA2 < ThresholdA2
NR5-1-3) (Mp(IDLE mode RS) + HysA1 < ThresholdA1)
    && (Mp(Addtional RS) + HysA2 < ThresholdA2)
NR5-1-4) Mp(IDLE mode RS) + Mp(Additional RS) + HysA3 < ThresholdA3
(Entering condition 2)
NR5-2-1) Mn(IDLE mode RS) + Ofn1 + Ocn1 − HysB1 > ThresholdB1
NR5-2-2) Mn(Additional RS) + Ofn2 + Ocn2 − HysB2 > ThresholdB2
NR5-2-3) (Mn(IDLE mode RS) + Ofn1 + Ocn1 − HysB1 > ThresholdB1)
    && (Mn(Additional RS) + Ofn2 + Ocn2 − HysB2 > ThresholdB2)
NR5-2-4) Mn(IDLE mode RS) + Mn(Additional RS) + Ofn3 + Ocn3 − Hys3 > ThresholdB3
(Leaving condition 1)
NR5-3-1) Mp(IDLE mode RS) − HysA1 > ThresholdA1
NR5-3-2) Mp(Additional RS) − HysA2 > thresholdA2
NR5-3-3) (Mp(IDLE mode RS) − HysA1 > ThresholdA1)
    && Mp(Additional RS) − HysA2 > ThresholdA2)
NR5-3-4) Mp(IDLE mode RS) + Mp(Additional RS) − HysA3 > ThresholdA3
(Leaving condition 2)
NR5-4-1) Mn(IDLE mode RS) + Ofn1 + Ocn1 + HysB1 < ThresholdB1
NR5-4-2) Mn(Additional RS) + Ofn1 + Ocn2 + HysB2 < ThresholdB2
NR5-4-3) (Mn(IDLE mode RS) + Ofn1 + Ocn1 + HysB1 < ThresholdB1)
    && (Mn(Additional RS) + Ofn2 + Ocn2 + HysB2 < ThresholdB2)
NR5-4-4) Mn(IDLE mode RS) + Mn(Additional RS) + Ofn3 + Ocn3 + HysB3 < ThresholdB3
Mn(IDLE mode RS) is the measurement result of the neighbour cell derived from
IDLE mode RS, not taking into account any offsets,
Mn(Additional RS) is the measurement result of the neighbour cell derived from
additional RS, not taking into account any offsets,
Mp(IDLE mode RS) is the measurement result of the PCell/ PSCell derived from IDLE
mode RS, not taking into account any offsets,
Mp(Additional RS) is the measurement result of the PCell/ PSCell derived from
additional RS, not taking into account any offsets,
HysA1, HysA2, HysA3, HysB1, HysB2, and HysB3 are the hysteresis parameter for this
event (i.e. hysteresis as defined within reportConfigEUTRA for this event),
Ofn1, Ofn2, and Ofn3 are the frequency specific offset of the frequency of the
neighbour cell (i.e. offsetFreq as defined within measObjectEUTRA corresponding to
the frequency of the neighbour cell).
Ocn1, Ocn2, and Ocn3 are the cell specific offset of the neighbour cell (i.e.
cellIndividualOffset defined within measObjectEUTRA corresponding to the
frequency of the neighbour cell), and set to zero if not configured for the neighbour
cell.
Ofp1, Ofp2, and Ofp3 are the frequency specific offset of the frequency of the PCell/
PSCell (i.e. offsetFreq as defined within measObjectEUTRA corresponding to the
frequency of the PCell/ PSCell).
Ocp1, Ocp2, and Ocp3 are the cell specific offset of the PCell/ PSCell (i.e.
cellIndividualOffset as defined within measObjectEUTRA corresponding to the
frequency of the PCell/ PSCell), and is set to zero if not configured for the PCell/
PSCell.
Off1, Off2, and Off3 are the offset parameter for this event (i.e. a3-Offset as defined
within reportConfigEUTRA for this event).
Mn( ) and MP( ) are expressed in dBm in case of RSRP, or in dB in case of RSRQ and
RS-SINR,
HysA1, HysA2, HysA3, HysB1, HysB2, and HysB3 are expressed in dB,
Ofn, Ocn, Ofp, Ocp, Off are expressed in dB.

The following table divided into several pages shows the description of event NR6.

| [event NR6] |
| --- |
| NR6 Neighbour becomes offset better than SCell |
| (Entering condition) |
| NR3-1-1) Mn(IDLE mode RS) + Ocn1 − Hys1 > Ms(IDLE mode RS) + Ocs1 + Off1 |
| NR3-1-2) Mn(Additional RS) + Ocn2 − Hys2 > Ms(Additional RS) + Ocs2 + Off2 |
| NR3-1-3) (Mn(IDLE mode RS) + Ocn1 − Hys1 > Ms(IDLE mode RS) + Ocs1 + Off1) |
| && (Mn(Additional RS) + Ocn2 − Hys2 > Ms(Additional RS) + Ocs2 + Off2) |
| + NR3-1-4) Mn(IDLE mode RS) + Mn(Additional RS) + Ocn3 − Hys3 > Ms(IDLE mode RS) |
| Ms(Additional RS) + Ocs3 + Off3 |
| (Leaving condition) |
| NR3-2-1) Mn(IDLE mode RS) + Ocn1 + Hys1 < Ms(IDLE mode RS) + Ocs1 + Off1 |
| NR3-2-2) Mn(Additional RS) + Ocn2 + Hys2 < Ms(Additional RS) + Ocs2 + Off2 |
| NR3-2-3) Mn(IDLE mode RS) + Ocn1 + Hys1 < Ms(IDLE mode RS) + Ocs1 + Off1) |
| && (Mn(Additional RS) + Ocn2 + Hys2 < Ms(Additional RS) + Ocs2 + Off2) |
| NR3-2-4) Mn(IDLE mode RS) + Mn(Additional RS) + Ocn3 + Hys3 < Ms(IDLE mode RS) + Ms(Additional RS) + Ocs3 + Off3 |
| # Mn(IDLE mode RS) is the measurement result of the neighbour cell derived from IDLE mode RS, not taking into account any offsets, |
| # Mn(Additional RS) is the measurement results of the neighbour cell derived from additional RS, not taking into account any offsets, |
| # Ms(IDLE mode RS) is the measurement result of the serving cell derived from IDLE mode RS, not taking into account any offsets, |
| # Ms(Additional RS) is the measurement result of the serving cell derived from additional RS, not taking into account any offsets, |
| # Hys1, Hys2, and Hys3 are the hysteresis parameter for this event (i.e. hysteresis as defined within reportConfigEUTRA for this event), |
| # Ocn1, Ocn2, and Ocn3 are the cell specific offset of the neighbour cell (i.e. cellIndividualOffset as defined within measObjectEUTRA corresponding to the frequency of the neighbour cell), and set to zero if not configured for the neighbour cell. |
| #Ocs1, Ocs2, and Ocs3 are the cell specific offset of the serving cell (i.e. cellIndividualOffset as defined within measObjectEUTRA corresponding to the frequency of the PCell/ PSCell), and is set to zero if not configured for the PCell/ PSCell. |
| #Off1, Off2, and Off3 are the offset parameter for this event (i.e. a3-Offset as defined within reportConfigEUTRA event). |
| # Mn( ) and Ms( ) are expressed in dBm in case of RSRP, or in dB in case of RSRQ and RS-SINR, |
| # Hys1, Hys2, and Hys3 are expressed in dB, |
| # Ocn, Ocs, Off are expressed in dB. |

The following table divided into several pages shows the description of event NR7.

| [event NR7] |
| --- |
| NR7 Neighbour becomes offset better than PCell/ PSCell, while there are more than N beams above threshold in that neighbour cell |
| 1> consider the entering condition for this event to be satisfied when both condition 7-1-X and condition 7-2-X, as specified below, are fulfilled; |
| 1> consider the leaving condition for this event to be satisfied when condition 7-3-X or condition 7-4-X, i.e. at least one of the two, as specified below, is fulfilled; |
| (Entering condition 1) |
| NR7-1-1) Mn(IDLE mode RS) + Ofn1 + Ocn1 − Hys1 > Mp(IDLE mode RS) + Ofp1 + Ocp1 + Off1 |
| NR7-1-2) Mn(Additional RS) + Ofn2 + Ocn2 − Hys2 > Mp(Additional RS) + Ofp2 + Ocp2 + Off2 |
| NR7-1-3) (Mn(IDLE mode RS) + Ofn1 + Ocn1 − Hys1 > Mp(IDLE mode RS) + Ofp1 + Ocp1 + Off1) |
| && (Mn(Additional RS) + Ofn2 + Ocn2 − Hys2 > Mp(Addttional RS) + Ofp2 + Ocp2 + Off2) |
| NR7-1-4) Mn(IDLE mode RS) + Mn(Additional RS) + Ofn3 + Ocn3 − Hys3 > Mp(IDLE mode RS) + Mp(Additional RS) + Ofp3 + Ocp3 + Off3 |
| (Entering condition 2) |
| NR7-2-1) # of beams satisfy (MBn(IDLE mode RS) > Threshold1) > N1, |
| NR7-2-2) # of beams satisfy (MBn(Additional RS) > Threshold2) > N2, |
| NR7-2-3) # of beams satisfy ((MBn(IDLE mode RS) > Threshold1) or (MBn(Additional RS) > Threshold2) ) > N3, |
| (Leaving condition 1) |
| NR7-3-1) Mn(IDLE mode RS) + Ofn1 + Ocn1 + Hys1 < Mp(IDLE mode RS) + Ofp1 + Ocp1 + Off1 |

-continued

[event NR7]

NR7-3-2) Mn(Additional RS) + Ofn2 + Ocn2 + Hys2 < Mp(Additional RS) +
Ofp2 + Ocp2 + Off2
NR7-3-3) (Mn(IDLE mode RS) + Ofn1 + Ocn1 + Hys1 < Mp(IDLE mode RS) +
Ofp1 + Ocp1 + Off1)
&& (Mn(Additional RS) + Ofn2 + Ocn2 + Hys2 < Mp(Additional RS) +
Ofp2 + Ocp2 + Off2)
NR7-3-4) Mn(IDLE mode RS) + Mn(Additional RS) + Ofn3 + Ocn3 + Hys3 <
Mp(IDLE mode RS) + Mp(Additional RS) + Ofp3 + Ocp3 + Off3 -
(Leaving condition 2)
NR7-4-1) # of beams satisfy (MBn(IDLE mode RS) > Threshold1) < N1,
NR7-4-2) # of beams satisfy (MBn(Additional RS) > Threshold2) < N2,
NR7-4-3) # of beams satisfy ( (MBn(IDLE mode RS) > Threshold1) or |
(MBn(Additional RS) > Threshold2) ) < N3,
Mn(IDLE mode RS) is the measurement result of the neighbor cell derived from IDLE mode
RS, not taking into account any offsets.
Mn(Additional RS) is the measurement result of the neighbor cell derived from additional RS,
not taking into account any offsets.
MBn(IDLE mode RS) is the measurement result of a beam of the neighbor cell derived from
IDLE mode RS, not taking into account any offsets.
MBn(Additional RS) is the measurement result of a beam of the neighbour cell derived from
additional RS, not tkaing into account any offsets.
Mp(IDLE mode RS) is the measurement result of the PCell/ PSCell derived from IDLE mode RS,
not taking into account any offsets.
Mp(Additional RS) is the measurement result of PCell/ PSCell deived from additional RS,
not taking into account any offsets.
Hys1, Hys2, and Hys3 are the hysteresis parameter for this event (i.e. hysteresis as defined
within reportConfigEUTRA for this event).
Ofn1, Ofn2, and Ofn3 are the frequency specific offset of the frequency of the neighbor cell
(i.e. offsetFreq as defined within measObjectEUTRA corresponding to the frequency of the
neighbor cell).
Ocn1, Ocn2, and Ocn3 are the cell specific offset of the neighbor cell (i.e. cellindividualOffset
as defined within measObjectEUTRA corresponding to the frequency of the neighbor cell), and
set to zero is not configured for the neighbor cell.
Ofp1, Ofp2, and Ofp3 are the frequency specific offset of the frequency of the PCell/ PSCell (i.e
offsetFreq as defined within measObjectEUTRA corresponding to the frequency of the PCell/
PSCell).
Ocp1, Ocp2, and Ocp3 are the cell specific offset of the PCell/ PSCell (i.e. cellindividualOffset as
defined within measObjectEUTRA corresponding to the frequency of the PCell/ PSCell), and is set
to zero if not configured for the PCell/ PSCell.
Off1, Off2, and Off3 are the offset parameter for this event (i.e. a3-Offset as defined within
reportConfigEUTRA for this event).
N1, N2, and N3 are the required number of beams which satisfies the threshold required
Threshold1, Threshold2, and Threshold3 are the threshold parameter for this event (i.e. a1-
Threshold1, a1-Threshold2 and a1-Threshold3 as defined within reportConfigEUTRA for this
event).
Mn( ) and Mp( ) are expressed in dBm in case of RSRP, or in dB in case of RSRQ and RS-SINR.
Hys1, Hys2, and Hys3 are expressed in dB.
Ofn, Ocn, Ofp, Ocp, Off are expressed in dB.
Threshold1, Threshold2, and Threshold3 are expressed in the same unit as Ms.

Figure 30:
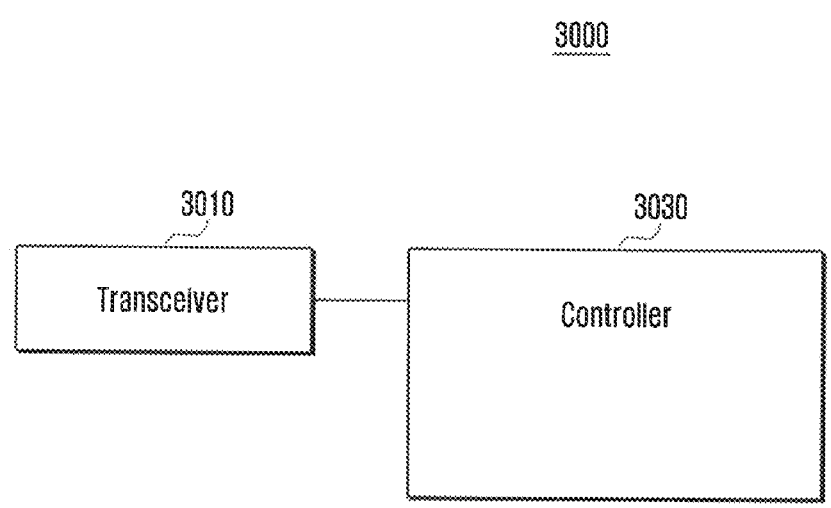
FIG. 30 is a diagram illustrating a terminal according to an embodiment of the disclosure.

FIG. 30 is a diagram illustrating a terminal according to an embodiment of the disclosure.

Referring to FIG. 30, the terminal 3000 may include a transceiver 3010 for transmitting and receiving a signal, and a controller 3030.

The terminal 3000 may transmit and/or receive signals, information, messages, and the like through the transceiver 3010. For example, when defining a controller in the specification, it may be stated that "the controller may be a circuit, an application-specific integrated circuit or at least one processor."

The controller 3030 may control the overall operation of the terminal 3000. The controller 3030 may include at least one processor. The controller 3030 may control the operation of the terminal described in embodiments of the disclosure. For example, the controller 3030 may control a signal flow in the above-described flow diagram.

Figure 31:
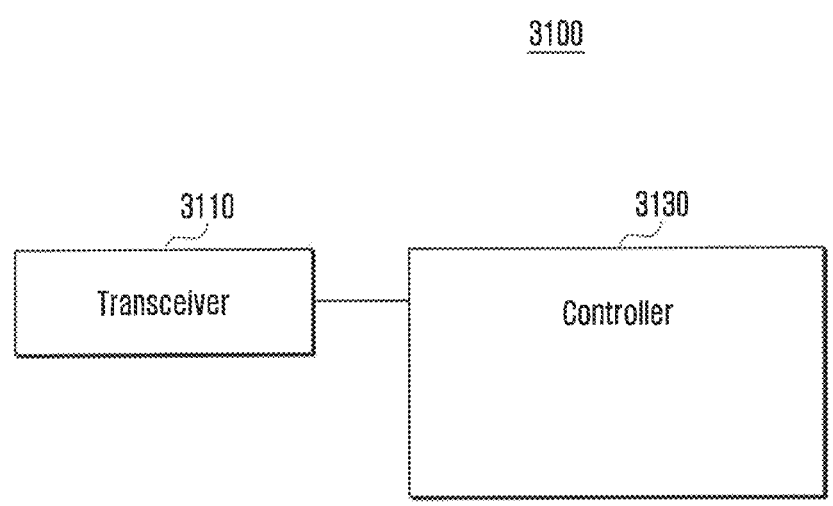
FIG. 31 is a diagram illustrating a base station according to an embodiment of the disclosure.

FIG. 31 is a diagram illustrating a base station according to an embodiment of the disclosure.

Referring to FIG. 31, the base station 3100 may include a transceiver 3110 for transmitting and receiving a signal, and a controller 3130. For example, when defining a controller in the specification, it may be stated that "the controller may be a circuit, an application-specific integrated circuit or at least one processor."

The base station 3100 may transmit and/or receive signals, information, messages, and the like through the transceiver 3110.

The controller 3130 may control the overall operation of the base station 3100. The controller 3130 may include at least one processor. The controller 3130 may control the operation of the base station described in embodiments of the disclosure. For example, the controller 3130 may control a signal flow in the above-described flow diagram.

Third Embodiment

Meanwhile, in a situation where a reference signal (hereinafter referred to as an idle mode RS) for both an idle mode UE and a connected mode UE and a reference signal (hereinafter referred to as a connected mode RS) for only the connected mode UE coexist, a UE may perform an RRM measurement through the idle mode RS and then (a) request the connected mode RS at an appropriate time or (b) report a connected mode RS measurement result to a gNB when the gNB transmits the connected mode RS at an appropriate time. The disclosure provides a related operation.

Figure 32:
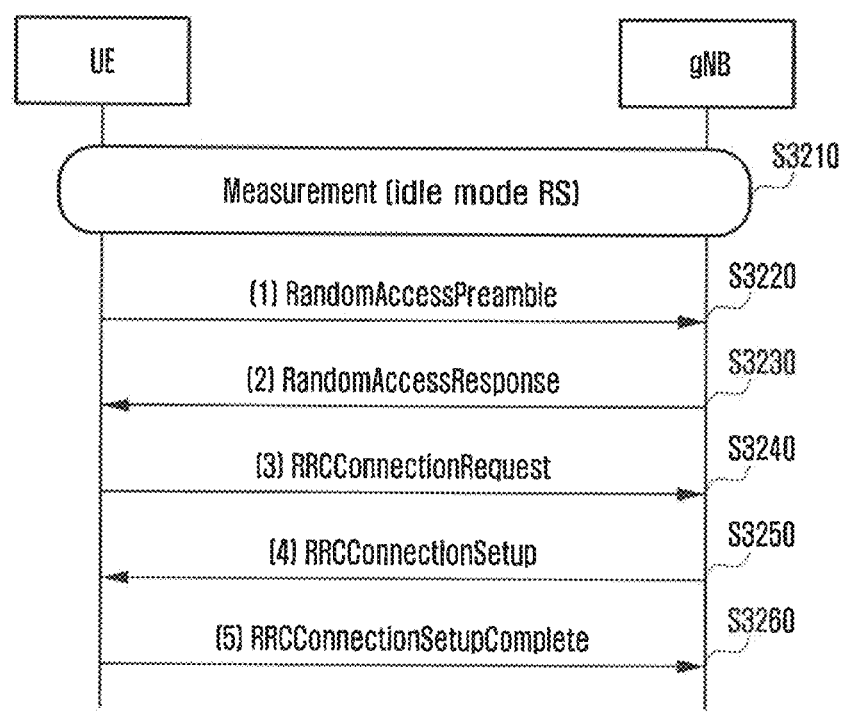
FIG. 32 is a flow diagram illustrating an initial access operation according to an embodiment of the disclosure.

FIG. 32 is a flow diagram illustrating an initial access operation according to an embodiment of the disclosure.

Referring to FIG. 32, in an RRC connection establishment procedure, the disclosure proposes a method about (a) when the UE requests the gNB to transmit the connected mode RS, (b) when the gNB transmits the connected mode RS, and (c) when the gNB allocates a resource for the connected mode RS measurement report of the UE. This operation proposed by the disclosure is based on FIG. 32.

That is, based on a random access procedure and an RRC connection procedure shown in operations S3210 to S3260 of FIG. 32, the UE may request transmission of the connected mode RS, and the gNB may transmit the connected mode RS and allocate a resource for the connected mode RS measurement report of the UE. Details will be described below.

<Request for Connected Mode RS>

The UE may request the gNB to transmit a connected mode RS through preamble classification when transmitting a random access preamble at operation S3220.

For this, random access preambles are classified into two groups. If the UE transmits the random access preamble belonging to one group, the gNB understands a request for the connected mode RS. If the UE transmits the random access preamble belonging to the other group, the gNB understands no request for the connected mode RS.

In case of requesting the connected mode RS, the UE continuously performs blind decoding for physical downlink control channel (PDCCH) to know allocation information about a resource for transmission of the connected mode RS by the gNB and a resource for transmission of a related measurement result report by the UE.

Alternatively, when transmitting an RRC connection request message at operation S3240, the UE may set a bit indicating a request for transmission of the connected mode RS to 1 in the above message so as to request the gNB to transmit the connected mode RS.

If the corresponding bit is set to 0, the gNB understands that the UE does not request the transmission of the connected mode RS.

Alternatively, when transmitting an RRC connection setup complete message at operation S3260, the UE may set a bit indicating a request for transmission of the connected mode RS to 1 in the above message so as to request the gNB to transmit the connected mode RS.

<Allocation of Connected Mode RS Resource>

When transmitting a random access response message at operation S3230, the gNB allocates a resource for transmission of the connected mode RS in the above message.

Alternatively, when transmitting an RRC connection setup message at operation S3250, the gNB allocates a resource for transmission of the connected mode RS in the above message.

Here, the allocated resource is a time/frequency resource and may be expressed as a resource block index or the like.

Alternatively, the gNB allocates a resource for transmission of the connected mode RS through a separate signal, for example, PDCCH downlink control information (DCI).

<Allocation of Connected Mode RS Measurement Result Feedback Resource>

When transmitting the random access response message at operation S3230, the gNB allocates a resource for reporting the connected mode RS measurement result in the above message.

Alternatively, when transmitting the RRC connection setup message at operation S3250, the gNB allocates a resource for reporting the connected mode RS measurement result in the above message.

Alternatively, the gNB allocates a resource for reporting the connected mode RS measurement result through a separate signal, for example, PDCCH DCI.

<Feedback of Connected Mode RS Measurement Result>

When transmitting the RRC connection request message at operation S3240, the UE may insert information about the connected mode RS measurement result in the above message.

Here, the connected mode RS measurement result includes N beam indexes with the highest signal strength and corresponding signal strengths (RSRP or RSRQ) after the connected mode RS measurement. Here, N may be set by the gNB through an RRC message or the like.

Alternatively, when transmitting the RRC connection setup complete message at operation S3260, the UE may insert the connected mode RS measurement result information in the above message.

Alternatively, the UE transmits the connected mode RS measurement result information to the gNB through a separate signal, for example, a physical uplink control channel (PUCCH), a physical uplink shared channel (PUSCH), or the like.

Figure 33:
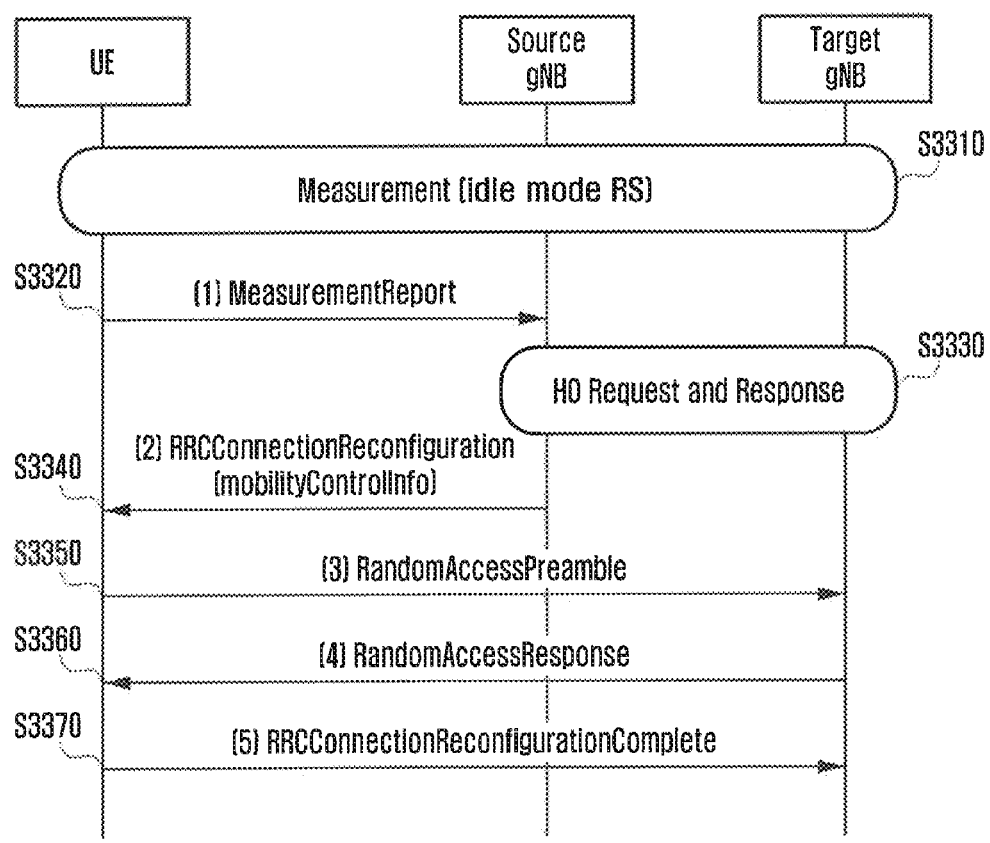
FIG. 33 is a flow diagram illustrating a handover operation according to an embodiment of the disclosure.

FIG. 33 is a flow diagram illustrating a handover operation according to an embodiment of the disclosure.

Referring to FIG. 33, in a handover procedure, the disclosure proposes a method about (a) when the UE requests the gNB to transmit the connected mode RS, (b) when the gNB transmits the connected mode RS, and (c) when the gNB allocates a resource for the connected mode RS measurement report of the UE. This operation proposed by the disclosure is based on FIG. 33.

That is, based on the handover procedure shown in S3310 to S3370 of FIG. 33, the UE may request transmission of the connected mode RS, and the gNB may transmit the connected mode RS and allocate a resource for the connected mode RS measurement report of the UE. Details will be described below.

<Request for Connected Mode RS>

When transmitting a measurement report at operation S3320, the UE sets a bit indicating a request for transmission of the connected mode RS to 1 in the above message so as to request the gNB to transmit the connected mode RS. The source gNB and target gNB may initiate handover request and response at operation S3330.

Alternatively, when transmitting a random access preamble at operation S3350, the UE requests the gNB to transmit the connected mode RS through the preamble classification.

Alternatively, when transmitting an RRC connection reconfiguration complete message at operation S3370, the UE sets a bit indicating a request for transmission of the connected mode RS to 1 in the above message so as to request the gNB to transmit the connected mode RS.

<Allocation of Connected Mode RS Resource>

When transmitting an RRC connection reconfiguration (or mobility control information or handover command) message at operation S3340, the gNB allocates a resource for transmission of the connected mode RS in the above message.

Alternatively, when transmitting a random access response message at operation S3360, the gNB allocates a resource for transmission of the connected mode RS in the above message.

Alternatively, the gNB allocates a resource for transmission of the connected mode RS through a separate signal, for example, PDCCH DCI.

<Allocation of Connected Mode RS Measurement Result Feedback Resource>

When transmitting the RRC connection reconfiguration (or mobility control information or handover command) message at operation S3340, the gNB allocates a resource for reporting the connected mode RS measurement result in the above message.

Alternatively, when transmitting the random access response message at operation S3360, the gNB allocates a resource for reporting the connected mode RS operation measurement result in the above message.

Alternatively, the gNB allocates a resource for reporting the connected mode RS measurement result through a separate signal, for example, PDCCH DCI.

<Feedback of Connected Mode RS Measurement Result>

When transmitting the RRC connection reconfiguration complete message at operation S3370, the UE inserts the connected mode RS measurement result information in the above message.

Alternatively, the UE transmits the connected mode RS measurement result information to the gNB via a separate signal, for example, PUCCH, PUSCH, or the like.

Figure 34:
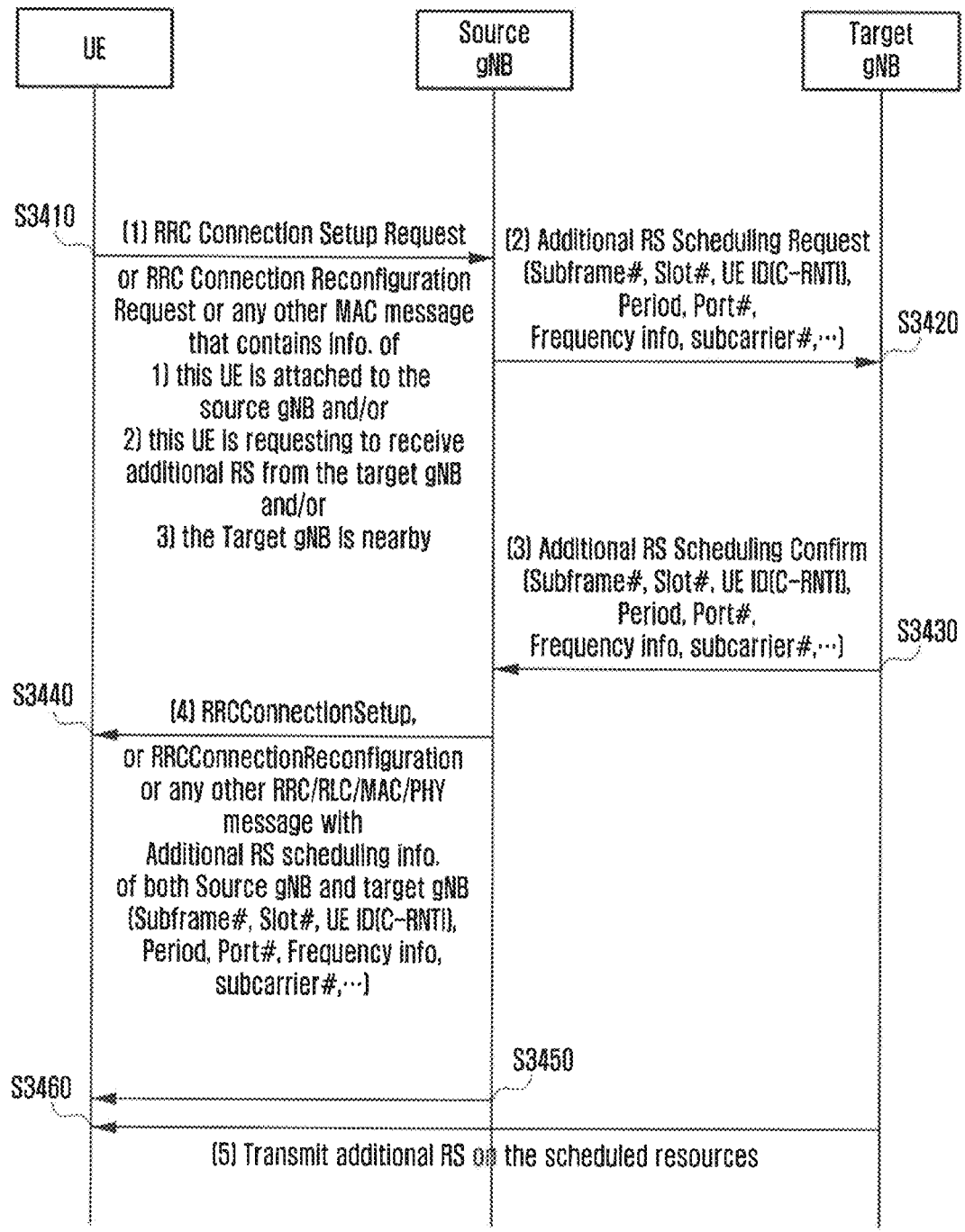
FIG. 34 is a flow diagram illustrating an operation according to an embodiment of the disclosure.

According to still another example, the operation proposed by the disclosure is based on FIG. 34.

FIG. 34 is a flow diagram illustrating an operation according to an embodiment of the disclosure.

Referring to FIG. 34, at operation S3410 of transmitting an RRC connection setup request, the UE may request the source gNB to receive an additional RS from the target gNB. The source gNB may transmit a request for additional RS scheduling to the target gNB at operation S3420, and may receive a response at operation S3430. Accordingly, the source gNB may transmit a response message to the UE at operation S3440 in response to the RRC connection setup request. This message may include scheduling information for the additional RS. At this time, the additional RS may refer to, for example, a CSI-RS.

Therefore, the UE may receive the RS from the source gNB and the target gNB at operations S3450 and S3460.

The disclosure considers a system in which the gNB uses a synchronization signal (SS) and a CSI-RS together. Here, the SS may include both a primary synchronization signal (PSS) and a secondary synchronization signal (SSS). Also, the SS may correspond to a cell-specific signal, and the CSI-RS may be a cell-specific signal, a UE-specific signal, or a UE group-specific signal.

The disclosure considers a situation in which the UE initially accesses the gNB or performs handover from the serving gNB to the target gNB. Also, the disclosure considers a situation where the gNB uses an SS signal when determining whether the UE performs the initial access or handover.

In this situation, the disclosure proposes a UE operation of promptly receiving allocation of a beam to be used for data communication from an initially accessed gNB or a handover target gNB. In general, a beam on which the SS is transmitted may be a relatively wide beam so as to reduce the time required for beam sweeping or for any other reason. However, a beam for transmission of the CSI-RS or data may be a relatively narrow beam so as to obtain a high beamforming gain. Therefore, the gNB or UE may determine, through the SS transmitted on the wide beam, whether to perform the initial access or handover, and the UE may identify the narrow beam to be used for data communication by receiving the CSI-RS from the accessed gNB or the target gNB.

Also, because there is no idea of when the UE will access the gNB, the SS may be regarded as an always-on signal which is always transmitted. However, the CSI-RS may be an always-on signal or not, depending on the overhead of time and frequency resources required for transmission. The disclosure assumes that the SS is an always-on signal and the CSI-RS is not an always-on signal. That is, it is assumed that the gNB may determine whether to transmit the CSI-RS.

The disclosure assumes that the SS is transmitted through a relatively wide beam and the CSI-RS is transmitted through a relatively narrow beam. A mapping relationship between the wide beam for SS transmission and the narrow beam for CSI-RS transmission may be established in accordance with an antenna pattern of the gNB. The disclosure assumes that this relationship is established. An example is as shown in the following table.

TABLE 10

|  | SS beam index. | CSI-RS beam, index. |
| --- | --- | --- |
| Mapping between SS beam and CSI-RS beam. | 1. | 11, 12, 13, . . . , 1N. |
|  | 2. | 21. 22, 23, . . . , 2N. |
|  | 3. | 31, 32, 33, . . . , 3N. |
|  | . . . | . . . |
|  | M. | M, M2, M3, . . . , MN. |

The assumptions considered in the disclosure are as above. However, the disclosure is not limited to the above and may be generalized in case of initial access and handover in a system in which two kinds of RSs are used together.

Figure 35:
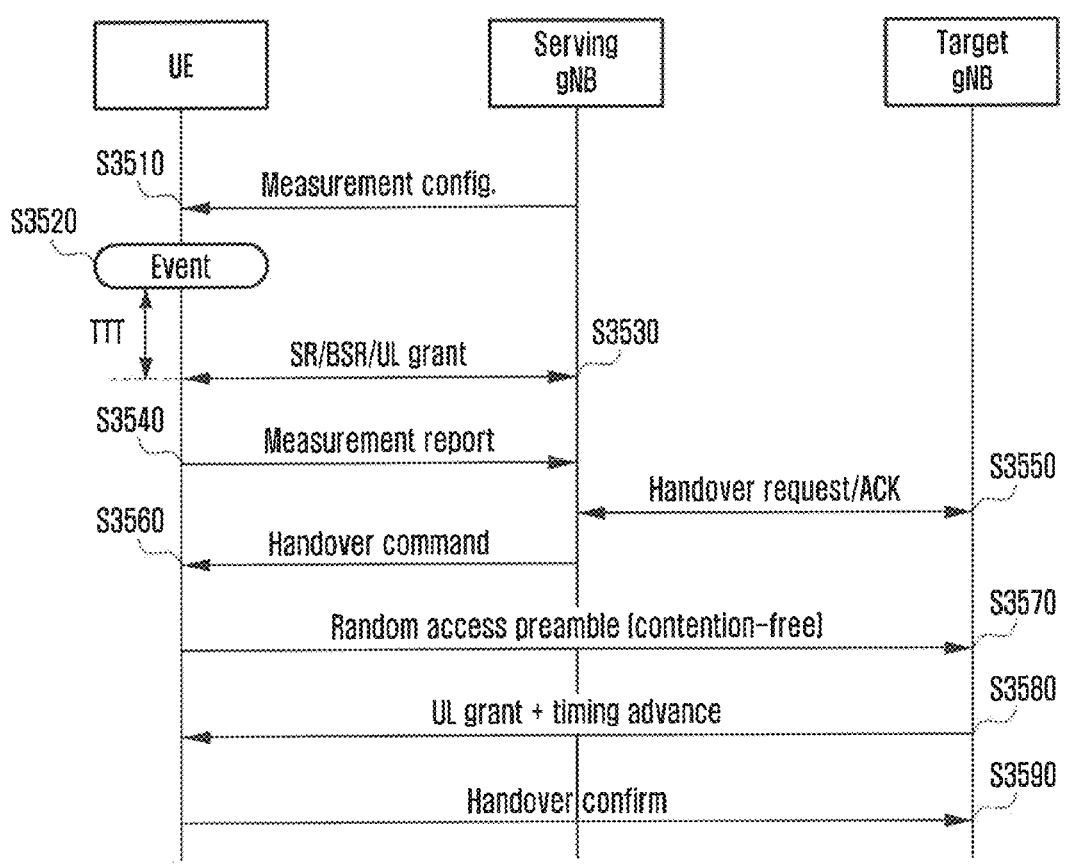
FIGS. 35 to 41 are flow diagrams illustrating various methods for determining a beam to be used for data transmission and reception in a handover process according to embodiments of the disclosure.

FIGS. 35 to 41 are flow diagrams illustrating various methods for determining a beam to be used for data transmission and reception in a handover process according to embodiments of the disclosure;

Referring to FIG. 35, the operation of the disclosure will be described in a situation where the UE performs handover from the serving gNB to the target gNB.

1. Referring to FIG. 35, the serving gNB provides measurement configuration information to the UE at operation S3510.

A. Here, the measurement configuration information includes a frequency to be measured by the UE, a measurement report triggering condition, and the like.

2. The UE performs measurement, based on the measurement configuration information received from the serving gNB.

A. Here, the UE measures the signal strength or quality of the SS transmitted from the serving gNB and the target gNB.

B. In the disclosure, it is assumed that each gNB transmits the SS while sweeping a plurality of beams directed in different directions. Therefore, the UE may distinguish the SSs transmitted through different beams from each other by means of the time and frequency resources used for receiving the SSs.

3. If any event that the signal strength of the target gNB is greater than the signal strength of the serving gNB by offset is detected at operation S3520 through a comparison of signal strength, the UE transmits a measurement report to the serving gNB at operation S3540.

A. In order to transmit the measurement report, the UE may transmit and receive a scheduling request (SR), a buffer status report (BSR), an uplink (UL) grant, etc. to and from the serving gNB at operation S3530.

B. Although the A3 event is described for example, the same principle may be applied to other events.

4. When the measurement report is received from the UE, the serving gNB transmits a handover request to the target gNB at operation S3550 to perform an admission control.

A. If the target gNB can accept the UE, the target gNB transmits an acknowledgement (ACK) for the handover request to the serving gNB at operation S3550 and provides information required for the UE to access the target gNB.

B. This information required for the UE to access the target gNB includes a dedicated random access preamble (RAP) for the UE to synchronize uplink with the target gNB, and a necessary C-RNTI for data transmission/reception between the UE and the target gNB.

5. The serving gNB transmits a handover command to the UE at operation S3560 to provide information necessary for the UE to access the target gNB.

A. Here, the handover command may include the dedicated RAP and the C-RNTI received from the target gNB through the handover request ACK.

6. Based on information included in the handover command, the UE transmits a RAP to the target gNB at operation S3570.

A. This is an operation of the UE for controlling transmission (TX) timing and power to perform uplink transmission/reception with the target gNB.

7. After receiving the RAP from the UE, the target gNB transmits a random access response (RAR) to the UE at operation S3580.

A. After receiving the RAP, the target gNB notifies a TX timing and power adjusting level to the UE through the RAR and, if necessary, requests the UE to transmit the RAP again. After this uplink synchronization, the target gNB allocates an uplink (UL) grant at operation S3580 so that the UE can transmit a handover confirm.

8. The UE with the uplink synchronization receives the RAR and transmits the handover confirm to the target gNB through the UL grant included in the RAR at operation S3590.

A. Through this, the UE completes the handover from the serving gNB to the target gNB.

The above handover operation is designed for a situation where the gNB uses only one RS. This is not suitable for a situation considered in the disclosure, i.e., a situation where the determination of whether to perform handover is based on the SS transmitted on a wide beam, but the actual data transmission/reception uses a narrow beam. Unsuitableness is because the UE fails to determine a narrow beam to be used for transmitting and receiving data to and from the target gNB despite the completion of handover.

In the disclosure, the UE determines whether to perform a handover, through the measurement of the SS transmitted on a wide beam, and then performs the measurement of the CSI-RS transmitted on a narrow beam during the handover procedure so as to find as soon as possible the narrow beam to be used with the target gNB. Hereinafter, various embodiments will be described.

[Handover: Proposed 1]

Figure 36:
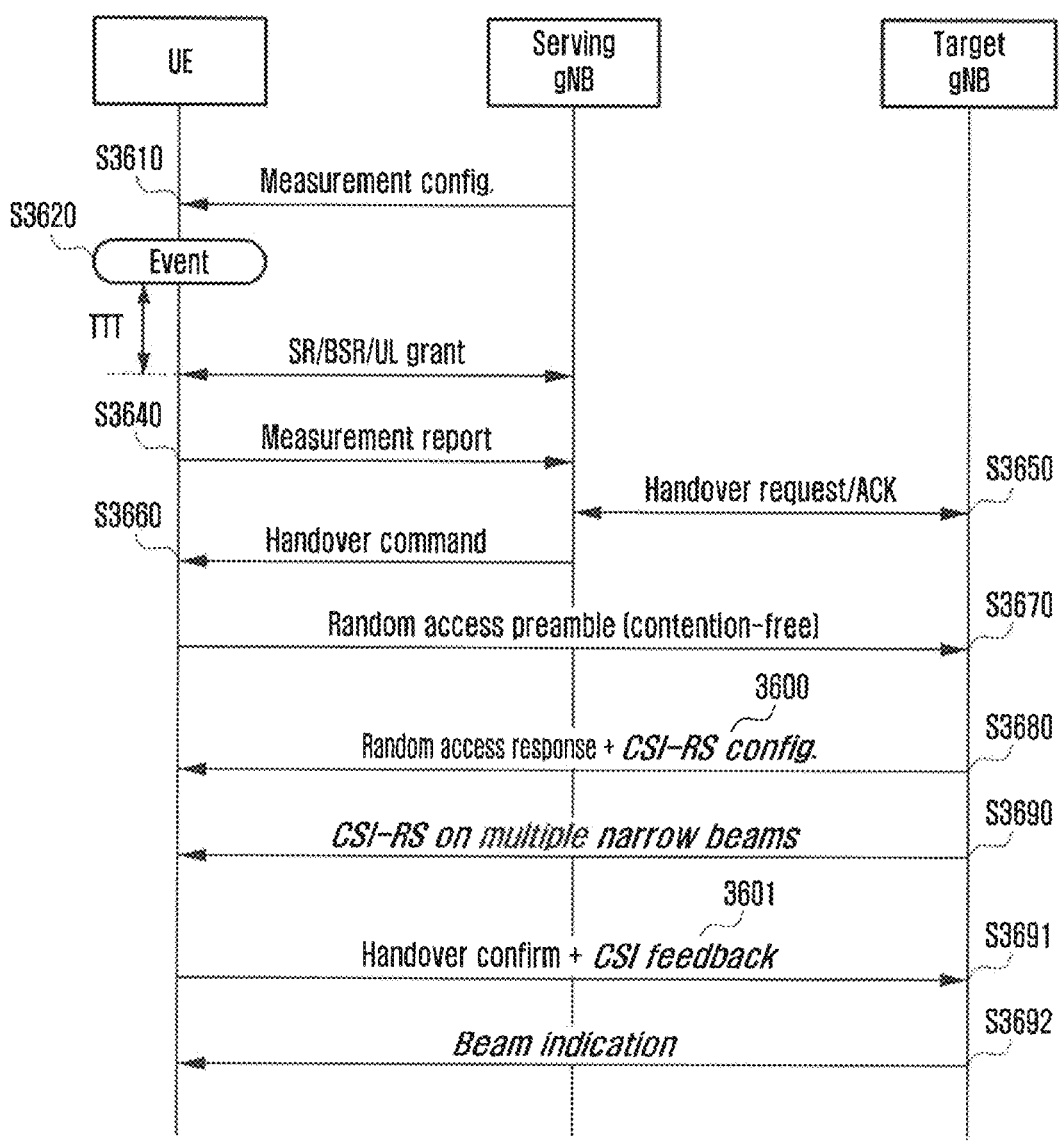

Referring to FIG. 36, an embodiment of Handover: proposed 1 will be described.

1. The serving gNB provides measurement configuration information to the UE at operation S3610.

2. The UE performs measurement, based on the measurement configuration information received from the serving gNB.

A. Here, the UE measures the signal strength or quality of the SS transmitted from the serving gNB and the target gNB.

3. If any event that the signal strength of the target gNB is greater than the signal strength of the serving gNB by offset is detected at operation S3620 through a comparison of signal strength, the UE transmits a measurement report to the serving gNB at operation S3640.

4. When the measurement report is received from the UE, the serving gNB transmits a handover request to the target gNB at operation S3650 to perform an admission control.

5. The serving gNB transmits a handover command to the UE at operation S3660 to provide information necessary for the UE to access the target gNB.

6. Based on information included in the handover command, the UE transmits a RAP to the target gNB at operation S3670.

A. Here, the target gNB may receive the RAP of the UE while sweeping a wide beam used to transmit the SS. In this case, the target gNB memorizes a wide beam used to receive the RAP of the UE and uses it at the next step. If the target gNB receives the RAP of the UE through a plurality of wide beams, the target gNB memorizes a wide beam having the highest signal strength and uses it at the next step.

7. After receiving the RAP from the UE, the target gNB transmits a RAR to the UE at operation S3680.

A. After receiving the RAP, the target gNB notifies a TX timing and power adjusting level to the UE through the RAR and, if necessary, requests the UE to transmit the RAP again. After this uplink synchronization, the target gNB allocates a UL grant so that the UE can transmit a handover confirm.

B. Additionally, in the disclosure, the target gNB transmits CSI-RS configuration information 3600 together with the RAR to the UE. The details of the CSI-RS configuration information will be described after the entire operation description.

8. The target gNB transmits at operation S3690 the CSI-RS through a plurality of narrow beams corresponding to the wide beam used for receiving the RAP.

9. Based on the CSI-RS configuration information, the UE measures the signal strength or quality of the CSI-RS transmitted by the target gNB.

10. The UE with the uplink synchronization receives the RAR and transmits the handover confirm to the target gNB through the UL grant included in the RAR at operation S3691.

A. When transmitting the handover confirm, the UE also transmits feedback 3601 of a measurement result for the CSI-RS. At this time, the UE utilizes the UL grant included in the RAR.

B. Through this, the UE completes the handover from the serving gNB to the target gNB.

11. Based on the CSI-RS feedback of the UE, the target gNB selects a narrow beam to be used by the UE and notifies it to the UE at operation S3692.

In the disclosure, the target gNB provides the CSI-RS configuration information to the UE. This is similar to the CSI-RS configuration information used in LTE. Additionally, the target gNB needs to inform the UE about beam information for transmission of the CSI-RS. Accordingly, the target gNB may insert the SS beam information used for receiving the RAP in the CSI-RS configuration information, or may insert the corresponding CSI-RS beam information. Tables 11 and 12 below show examples of the CSI-RS configuration information that includes antenna port information, time and frequency resource information, subframe information, power information, wide SS beam information used for reception of the RAP, narrow SS beam information to be used for transmission of the CSI-RS, a CSI-RS transmission period, and a CSI-RS configuration valid time.

TABLE 11

CSI-RS-Config
The IE CSI-RS-Config is used to specify the CSI (Channel-State Information) reference signal configuration.
CSI-RS-Config Information Elements

```
-- ASN1Start
CSI-RS-Config-r10 ::=   SEQUENCE {
   csi-RS-r10                CHOICE {
      release                NULL,
      setup SEQUENCE {
         antennaPortsCount-r10   ENUMERATED {an1, an2, an4, an8},
         resourceConfig-r10      INTEGER (0..31),
         subframeConfig-r10      INTEGER (0..154),
         p-C-r10                 INTEGER (-8..15),
         ssBeamIndex             INTEGER (0..255),
         csiBeamSetIndex         INTEGER (0..255),
         csiBeamPeriodcity       INTEGER (0..15),
         csiBeamValidTime        INTEGER (0..255)
      }
   }                         OPTIONAL,
Need ON
}
```

TABLE 12

CSI-RS-Config field descriptions antennaPortsCount.

Parameters represents the number of antenna ports used for transmission of CSI reference signals where value an1 corresponds to 1 antenna port, an2 to 2 antenna ports and so on, see TS 36.211 [21, 6.10.5].
p-C Parameter: $P_C$, see TS 36.213 [23, 7.2.5]. The UE shall ignore p-C-r10 if configured with eMIMO-Type unless it is set to beamformed, alternativeCodebookEnabledBeamformed is set to FALSE and csi-RS-ConfigNZPIdListExt is not configured.
resourceConfig Parameter: CSI reference signal configuration, see TS 36.211 [21, table 6.10.5.2-1 and 6.10.5.2-2].

TABLE 12-continued

CSI-RS-Config field descriptions subframeConfig

Parameter: $I_{CSI-RS}$ see TS 36.211 [21, table 6.10.5.3-1].
ssBeamIndex.

The SS beam that gNB receives the RAP from UE. A set of CSI-RSs that correspond to the SS will be transmitted by the gNB.
csiBeamSetIndex A set of CSI-RS beams that correspond to the SS beam on which gNB receives the RAP from UE.
csiBeamPeriodicity The transmission period of CSI-RS. Its unit can be subframe, second and so on.
csiBeamValidTime The valid time during which the CSI-RS configuration is valid. Its unit can be subframe, second and so on.

Tables 13 to 16 below show methods for determining the CSI-RS transmission period, offset, and resource location in the CSI-RS configuration information used in the disclosure. The CSI-RS transmission period, offset, resource location, and power information (p-C) may be determined according to the CSI-RS configuration information and the following tables.

TABLE 13

CSI reference signal subframe configuration

| CSI-RS-SubframeConfig $I_{CSI-RS}$ | CSI-RS periodicity $T_{CSI-RS}$ (subframes) | CSI-RS subframe offset $\Delta_{CSI-RS}$ (subframes) |
|---|---|---|
| 0-4 | 5 | $I_{CSI-RS}$ |
| 5-14 | 10 | $I_{CSI-RS}$ − 5 |
| 15-34 | 20 | $I_{CSI-RS}$ − 15 |
| 35-74 | 40 | $I_{CSI-RS}$ − 35 |
| 75-154 | 80 | $I_{CSI-RS}$ − 75 |

TABLE 14

Mapping from CSI reference signal configuration to (k', l') for normal cyclic prefix

| | Number of CSI reference signals configured | | | | | |
|---|---|---|---|---|---|---|
| | 1 or 2 | | 4 | | 8 | |
| CSI-RS config. | Normal subframe (k', l') $n_s'$ | Special subframe (k', l') $n_s'$ | Normal subframe (k', l') $n_s'$ | Special subframe (k', l') $n_s'$ | Normal subframe (k', l') $n_s'$ | Special subframe (k', l') $n_s'$ |
| 0 | (9, 5) 0 | (9, 5) 0 | (9, 5) 0 | (9, 5) 0 | (9, 5) 0 | (9, 5) 0 |
| 1 | (11, 2) 1 | (11, 5) 0 | (11, 2) 1 | (11, 5) 0 | (11, 2) 1 | (11, 5) 0 |
| 2 | (9, 2) 1 | (9, 2) 1 | (9, 2) 1 | (9, 2) 1 | (9, 2) 1 | (9, 2) 1 |
| 3 | (7, 2) 1 | (7, 5) 0 | (7, 2) 1 | (7, 5) 0 | (7, 2) 1 | (7, 5) 0 |
| 4 | (9, 5) 1 | | (9, 5) 1 | | (9, 5) 1 | |
| 5 | (8, 5) 0 | (8, 5) 0 | (8, 5) 0 | (8, 5) 0 | | |
| 6 | (10, 2) 1 | (10, 5) 0 | (10, 2) 1 | (10, 5) 0 | | |
| 7 | (8, 2) 1 | (8, 2) 1 | (8, 2) 1 | (8, 2) 1 | | |
| 8 | (6, 2) 1 | (6, 5) 0 | (6, 2) 1 | (6, 5) 0 | | |
| 9 | (8, 5) 1 | | (8, 5) 1 | | | |
| 10 | (3, 5) 0 | (3, 5) 0 | | | | |
| 11 | (2, 5) 0 | (2, 5) 0 | | | | |
| 12 | (5, 2) 1 | (5, 5) 0 | | | | |
| 13 | (4, 2) 1 | (4, 5) 0 | | | | |
| 14 | (3, 2) 1 | (3, 2) 1 | | | | |
| 15 | (2, 2) 1 | (2, 2) 1 | | | | |
| 16 | (1, 2) 1 | (1, 5) 0 | | | | |
| 17 | (0, 2) 1 | (0, 5) 0 | | | | |

TABLE 14-continued

Mapping from CSI reference signal configuration to (k', l') for normal cyclic prefix

| | Number of CSI reference signals configured | | | | | |
|---|---|---|---|---|---|---|
| | 1 or 2 | | 4 | | 8 | |
| | Normal subframe | Special subframe | Normal subframe | Special subframe | Normal subframe | Special subframe |
| CSI-RS config. | (k', l') $n_s'$ | (k', l') $n_s'$ | (k', l') $n_s'$ | (k', l') $n_s'$ | (k', l') $n_s'$ | (k', l') $n_s'$ |
| 18 | (3, 5) 1 | | | | | |
| 19 | (2, 5) 1 | | | | | |
| 20 | (11, 1) 1 | | (11, 1) 1 | | (11, 1) 1 | |
| 21 | (9, 1) 1 | | (9, 1) 1 | | (9, 1) 1 | |
| 22 | (7, 1) 1 | | (7, 1) 1 | | (7, 1) 1 | |
| 23 | (10, 1) 1 | | (10, 1) 1 | | | |
| 24 | (8, 1) 1 | | (8, 1) 1 | | | |
| 25 | (6, 1) 1 | | (6, 1) 1 | | | |
| 26 | (5, 1) 1 | | | | | |
| 27 | (4, 1) 1 | | | | | |
| 28 | (3, 1) 1 | | | | | |
| 29 | (2, 1) 1 | | | | | |
| 30 | (1, 1) 1 | | | | | |
| 31 | (0, 1) 1 | | | | | |

Note:
$n_s' = n_s$ mod 2. Configurations 0-19 for normal subframes are available for frame structure types 1, 2 and 3. Configurations 20-31 and configurations for special subframes are available for frame structure type 2 only.

TABLE 15

Mapping from CSI reference signal configuration to (k', l') for extended cyclic prefix.

| | Number of CSI reference signals configured | | | | | |
|---|---|---|---|---|---|---|
| | 1 or 2 | | 4 | | 8 | |
| | Normal subframe | Special subframe | Normal subframe | Special subframe | Normal Subframe | Special subframe |
| CSI-RS config. | (k', l') $n_s'$ | (k', l') $n_s'$ | (k', l') $n_s'$ | (k', l') $n_s'$ | (k', l') $n_s'$ | (k', l') $n_s'$ |
| 0 | (11, 4) 0 | (11, 4) 0 | (11, 4) 0 | (11, 4) 0 | (11, 4) 0 | (11, 4) 0 |
| 1 | (9, 4) 0 | (9, 4) 0 | (9, 4) 0 | (9, 4) 0 | (9, 4) 0 | (9, 4) 0 |
| 2 | (10, 4) 1 | | (10, 4) 1 | | (10, 4) 1 | |
| 3 | (9, 4) 1 | | (9, 4) 1 | | (9, 4) 1 | |
| 4 | (5, 4) 0 | (5, 4) 0 | (5, 4) 0 | (5, 4) 0 | | |
| 5 | (3, 4) 0 | (3, 4) 0 | (3, 4) 0 | (3, 4) 0 | | |
| 6 | (4, 4) 1 | | (4, 4) 1 | | | |
| 7 | (3, 4) 1 | | (3, 4) 1 | | | |
| 8 | (8, 4) 0 | (8, 4) 0 | | | | |
| 9 | (6, 4) 0 | (6, 4) 0 | | | | |
| 10 | (2, 4) 0 | (2, 4) 0 | | | | |
| 11 | (0, 4) 0 | (0, 4) 0 | | | | |
| 12 | (7, 4) 1 | | | | | |
| 13 | (6, 4) 1 | | | | | |
| 14 | (1, 4) 1 | | | | | |
| 15 | (0, 4) 1 | | | | | |
| 16 | (11, 1) 1 | (11, 1) 1 | (11, 1) 1 | (11, 1) 1 | (11, 1) 1 | (11, 1) 1 |
| 17 | (10, 1) 1 | (10, 1) 1 | (10, 1) 1 | (10, 1) 1 | (10, 1) 1 | (10, 1) 1 |
| 18 | (9, 1) 1 | (9, 1) 1 | (9, 1) 1 | (9, 1) 1 | (9, 1) 1 | (9, 1) 1 |
| 19 | (5, 1) 1 | (5, 1) 1 | (5, 1) 1 | (5, 1) 1 | | |
| 20 | (4, 1) 1 | (4, 1) 1 | (4, 1) 1 | (4, 1) 1 | | |
| 21 | (3, 1) 1 | (3, 1) 1 | (3, 1) 1 | (3, 1) 1 | | |
| 22 | (8, 1) 1 | (8, 1) 1 | | | | |
| 23 | (7, 1) 1 | (7, 1) 1 | | | | |
| 24 | (6, 1) 1 | (6, 1) 1 | | | | |
| 25 | (2, 1) 1 | (2, 1) 1 | | | | |
| 26 | (1, 1) 1 | (1, 1) 1 | | | | |
| 27 | (0, 1) 1 | (0, 1) 1 | | | | |

Note:
$n_s' = n_s$ mod 2. Configurations 0-15 for normal subframes are available for both frame structure type 1 and type 2. Configurations 16-27 and configurations for special subframes are available for frame structure type 2 only.

TABLE 16

$P_C$ in CSI-RS-Config
UE assumption on reference PDSCH transmitted power for CSI
feedback $P_C$, if the UE is configured in transmission mode 9.
UE assumption on reference PDSCH transmitted power for CSI
feedback $P_C$ for each CSI process, if the UE is configured
in transmission mode 10. If CSI subframe sets $C_{CSI,0}$ and $C_{CSI,1}$
are configured by higher layers for a CSI process, pc is
configured for each CSI subframe set of the CSI process.

In addition, in the disclosure, the UE transmits the feedback 3601 of a measurement result for the CSI-RS to the target gNB. Table 17 below shows the contents of feedback by the UE.

TABLE 17

Contents of CSI-RS feedback
For each measurement, the following
information is sent to the target gNB.

| | |
|---|---|
| Resource index | Based on the time-frequency resources, the UE can identify the beam on which CSI-RS is received |
| Subframe index | Based on the subframe, the UE can identify the beam on which CSI-RS is received |
| Antenna port index | Based on the antenna port, the UE can identify the beam on which CSI-RS is received |
| CSI-RS beam index | Based on the beam index (if it is included in CSI-RS), the UE can identify the beam on which CSI-RS is received |
| RSRP (or RSRQ) | RSRP (or RSRQ) measured by CSI-RS |

[Handover: Proposed 2]

Figure 37:
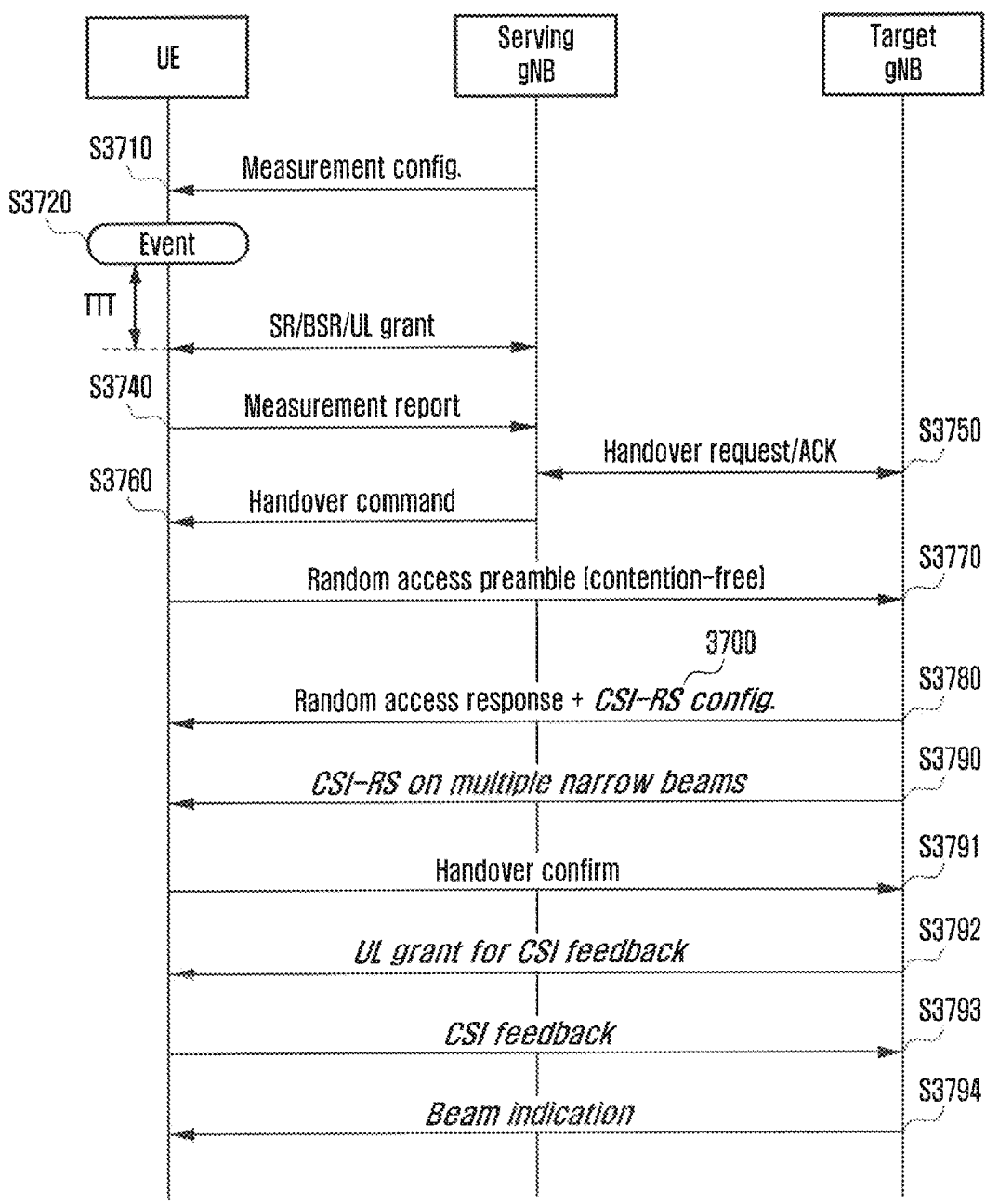

Referring to FIG. 37, an embodiment of Handover: proposed 2 will be described.

1. The serving gNB provides measurement configuration information to the UE at operation S3710.

2. The UE performs measurement, based on the measurement configuration information received from the serving gNB.

A. Here, the UE measures the signal strength or quality of the SS transmitted from the serving gNB and the target gNB.

3. If any event that the signal strength of the target gNB is greater than the signal strength of the serving gNB by offset is detected at operation S3720 through a comparison of signal strength, the UE transmits a measurement report to the serving gNB at operation S3740.

4. When the measurement report is received from the UE, the serving gNB transmits a handover request to the target gNB at operation S3750 to perform an admission control.

5. The serving gNB transmits a handover command to the UE at operation S3760 to provide information necessary for the UE to access the target gNB.

6. Based on information included in the handover command, the UE transmits a RAP to the target gNB at operation S3770.

A. Here, the target gNB may receive the RAP of the UE while sweeping a wide beam used to transmit the SS. In this case, the target gNB memorizes a wide beam used to receive the RAP of the UE and uses it at the next step. If the target gNB receives the RAP of the UE through a plurality of wide beams, the target gNB memorizes a wide beam having the highest signal strength and uses it at the next step.

7. After receiving the RAP from the UE, the target gNB transmits a RAR to the UE at operation S3780.

A. After receiving the RAP, the target gNB notifies a TX timing and power adjusting level to the UE through the RAR and, if necessary, requests the UE to transmit the RAP again.

After this uplink synchronization, the target gNB allocates a UL grant so that the UE can transmit a handover confirm.

B. Additionally, in the disclosure, the target gNB transmits CSI-RS configuration information 3700 together with the RAR to the UE. The details of the CSI-RS configuration information are as described above.

8. The target gNB transmits at operation S3790 the CSI-RS through a plurality of narrow beams corresponding to the wide beam used for receiving the RAP.

9. Based on the CSI-RS configuration information, the UE measures the signal strength or quality of the CSI-RS transmitted by the target gNB.

10. The UE with the uplink synchronization receives the RAR and transmits the handover confirm to the target gNB through the UL grant included in the RAR at operation S3791.

A. Through this, the UE completes the handover from the serving gNB to the target gNB.

11. The target gNB allocates a UL grant for feedback of a CSI-RS measurement result to the UE at operation S3792.

12. Using the allocated UL grant, the UE transmits the feedback of the CSI-RS measurement result to the target gNB at operation S3793.

13. Based on the CSI-RS feedback of the UE, the target gNB selects a narrow beam to be used by the UE and notifies it to the UE at operation S3794.

[Handover: Proposed 3]

Figure 38:
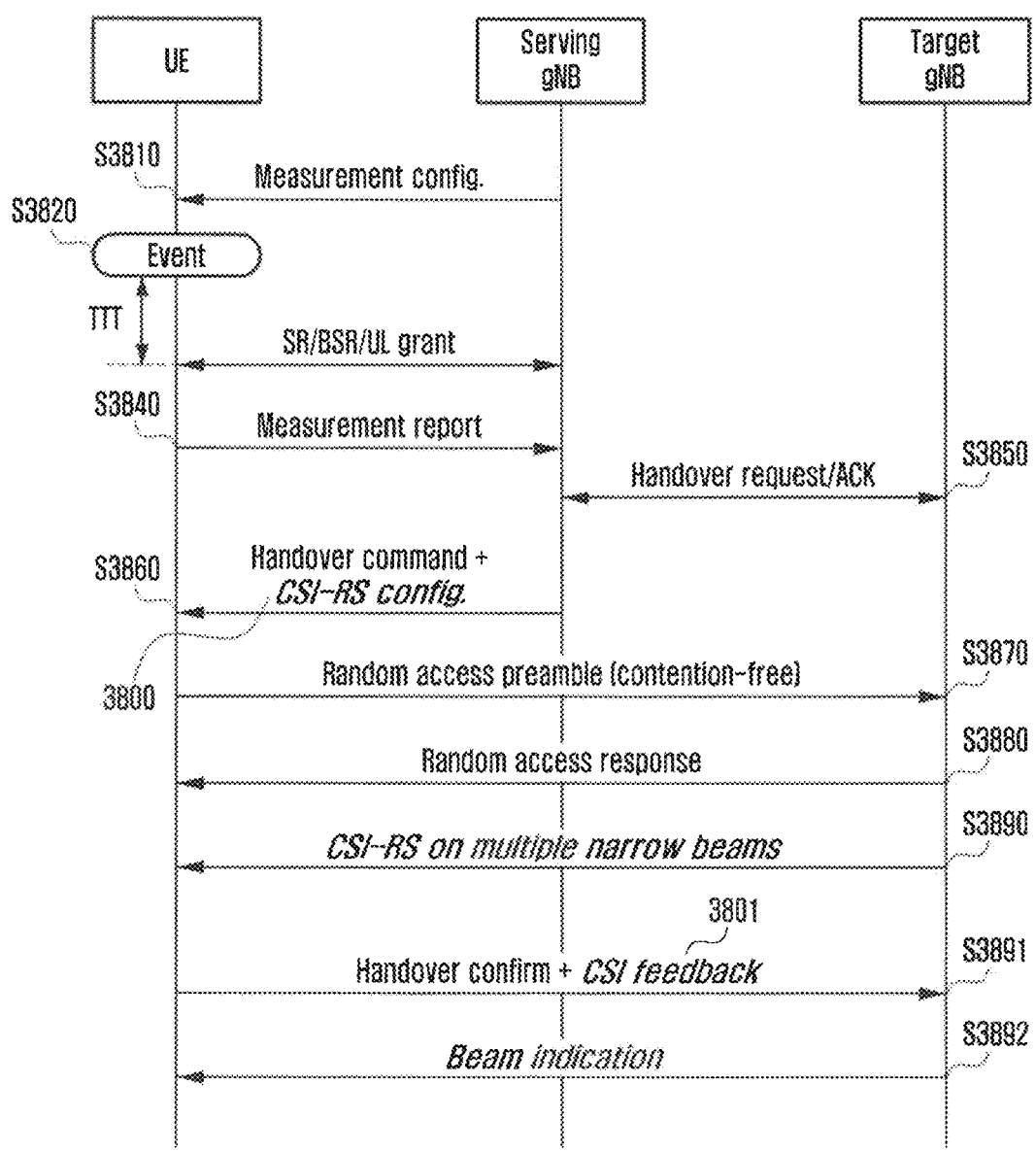

Referring to FIG. 38, an embodiment of Handover: proposed 3 will be described.

1. The serving gNB provides measurement configuration information to the UE at operation S3810.

2. The UE performs measurement, based on the measurement configuration information received from the serving gNB.

A. Here, the UE measures the signal strength or quality of the SS transmitted from the serving gNB and the target gNB.

3. If any event that the signal strength of the target gNB is greater than the signal strength of the serving gNB by offset is detected at operation S3820 through a comparison of signal strength, the UE transmits a measurement report to the serving gNB at operation S3840.

4. When the measurement report is received from the UE, the serving gNB transmits a handover request to the target gNB at operation S3850 to perform an admission control.

A. In the disclosure, the serving gNB delivers information contained in the measurement report to the target gNB. This information includes an SS beam index of the target gNB measured by the UE and corresponding signal strength.

B. Also, the target gNB determines CSI-RS configuration, based on the measurement report received from the serving gNB, and then delivers it to the serving gNB through a handover request ACK.

5. The serving gNB transmits a handover command to the UE at operation S3860 to provide information necessary for the UE to access the target gNB.

A. Additionally, in the disclosure, the serving gNB transmits CSI-RS configuration information 3800 together with the handover command to the UE. The details of the CSI-RS configuration information are as described above.

6. Based on information included in the handover command, the UE transmits a RAP to the target gNB at operation S3870.

A. Here, the target gNB may receive the RAP of the UE while sweeping a wide beam used to transmit the SS. In this case, the target gNB memorizes a wide beam used to receive the RAP of the UE and uses it at the next step. If the target gNB receives the RAP of the UE through a plurality of wide beams, the target gNB memorizes a wide beam having the highest signal strength and uses it at the next step.

7. After receiving the RAP from the UE, the target gNB transmits a RAR to the UE at operation S3880.

A. After receiving the RAP, the target gNB notifies a TX timing and power adjusting level to the UE through the RAR and, if necessary, requests the UE to transmit the RAP again. After this uplink synchronization, the target gNB allocates a UL grant so that the UE can transmit a handover confirm.

B. Additionally, in the disclosure, the target gNB transmits CSI-RS configuration information 3600 together with the RAR to the UE. The details of the CSI-RS configuration information will be described after the entire operation description.

8. The target gNB transmits at operation S3890 the CSI-RS through a plurality of narrow beams corresponding to the wide beam used for receiving the RAP.

9. Based on the CSI-RS configuration information, the UE measures the signal strength or quality of the CSI-RS transmitted by the target gNB.

10. The UE with the uplink synchronization receives the RAR and transmits the handover confirm to the target gNB through the UL grant included in the RAR at operation S3891.

A. When transmitting the handover confirm, the UE also transmits feedback 3801 of a measurement result for the CSI-RS. At this time, the UE utilizes the UL grant included in the RAR.

B. Through this, the UE completes the handover from the serving gNB to the target gNB.

11. Based on the CSI-RS feedback of the UE, the target gNB selects a narrow beam to be used by the UE and notifies it to the UE at operation S3892.

[Handover: Proposed 4]

Figure 39:
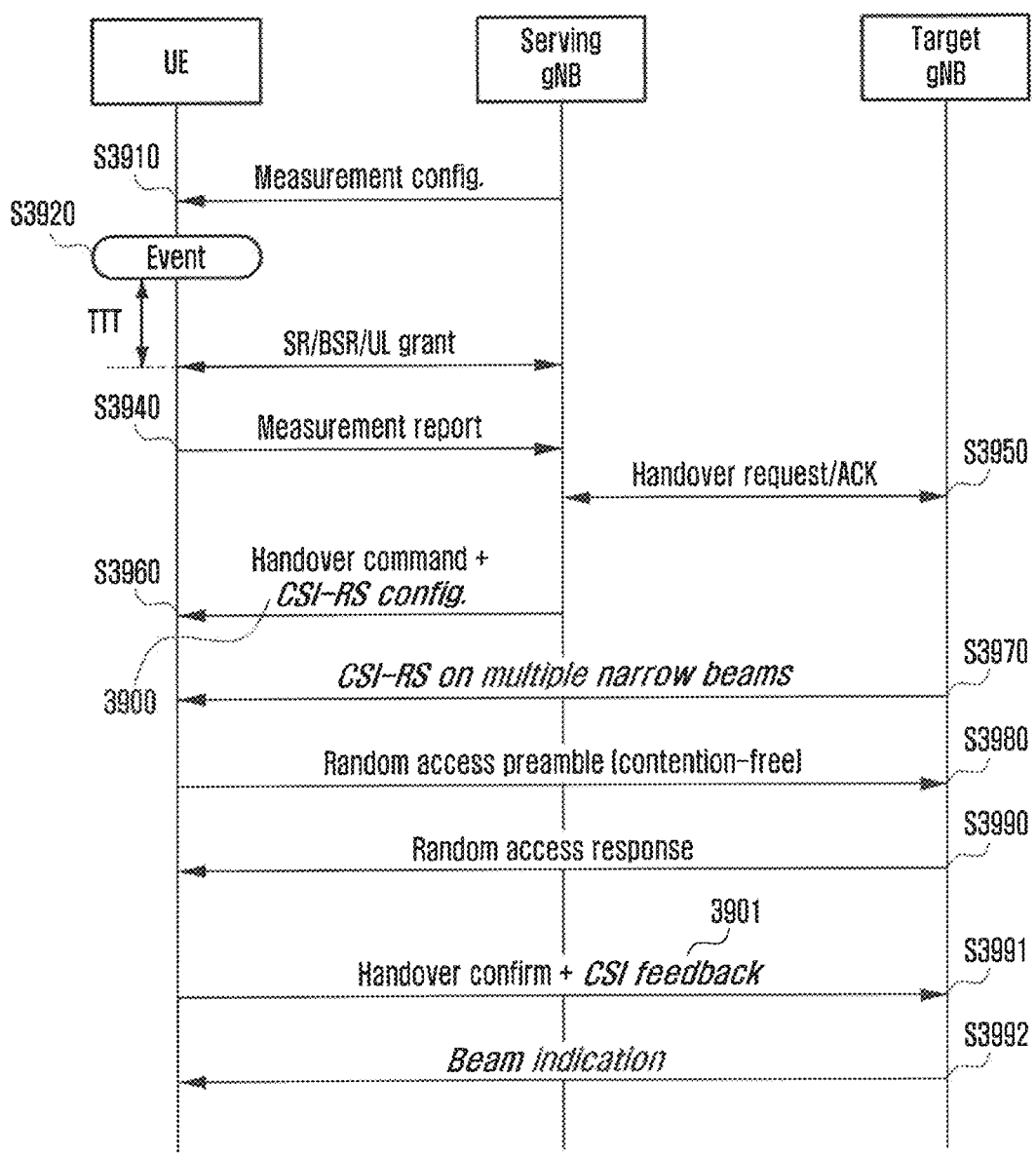

Referring to FIG. 39, an embodiment of Handover: proposed 4 will be described.

1. The serving gNB provides measurement configuration information to the UE at operation S3910.

2. The UE performs measurement, based on the measurement configuration information received from the serving gNB.

A. Here, the UE measures the signal strength or quality of the SS transmitted from the serving gNB and the target gNB.

3. If any event that the signal strength of the target gNB is greater than the signal strength of the serving gNB by offset is detected at operation S3920 through a comparison of signal strength, the UE transmits a measurement report to the serving gNB at operation S3940.

4. When the measurement report is received from the UE, the serving gNB transmits a handover request to the target gNB at operation S3950 to perform an admission control.

A. In the disclosure, the serving gNB delivers information contained in the measurement report to the target gNB. This information includes an SS beam index of the target gNB measured by the UE and corresponding signal strength.

B. Also, the target gNB determines CSI-RS configuration, based on the measurement report received from the serving gNB, and then delivers it to the serving gNB through a handover request ACK.

5. The serving gNB transmits a handover command to the UE at operation S3960 to provide information necessary for the UE to access the target gNB.

A. Additionally, in the disclosure, the serving gNB transmits CSI-RS configuration information 3900 together with the handover command to the UE. The details of the CSI-RS configuration information are as described above.

6. The target gNB transmits at operation S3970 the CSI-RS through a plurality of narrow beams corresponding to a wide beam having the highest signal strength measured by the UE and contained in the measurement report.

7. Based on the CSI-RS configuration information, the UE measures the signal strength or quality of the CSI-RS transmitted by the target gNB.

8. Based on information included in the handover command, the UE transmits a RAP to the target gNB at operation S3980.

9. After receiving the RAP from the UE, the target gNB transmits a RAR to the UE at operation S3990.

A. After receiving the RAP, the target gNB notifies a TX timing and power adjusting level to the UE through the RAR and, if necessary, requests the UE to transmit the RAP again. After this uplink synchronization, the target gNB allocates a UL grant so that the UE can transmit a handover confirm.

10. The UE with the uplink synchronization receives the RAR and transmits the handover confirm to the target gNB through the UL grant included in the RAR at operation S3991.

A. When transmitting the handover confirm, the UE also transmits feedback 3901 of a measurement result for the CSI-RS. At this time, the UE utilizes the UL grant included in the RAR.

B. Through this, the UE completes the handover from the serving gNB to the target gNB.

11. Based on the CSI-RS feedback of the UE, the target gNB selects a narrow beam to be used by the UE and notifies it to the UE at operation S3992.

[Handover: Proposed 5]

Figure 40:
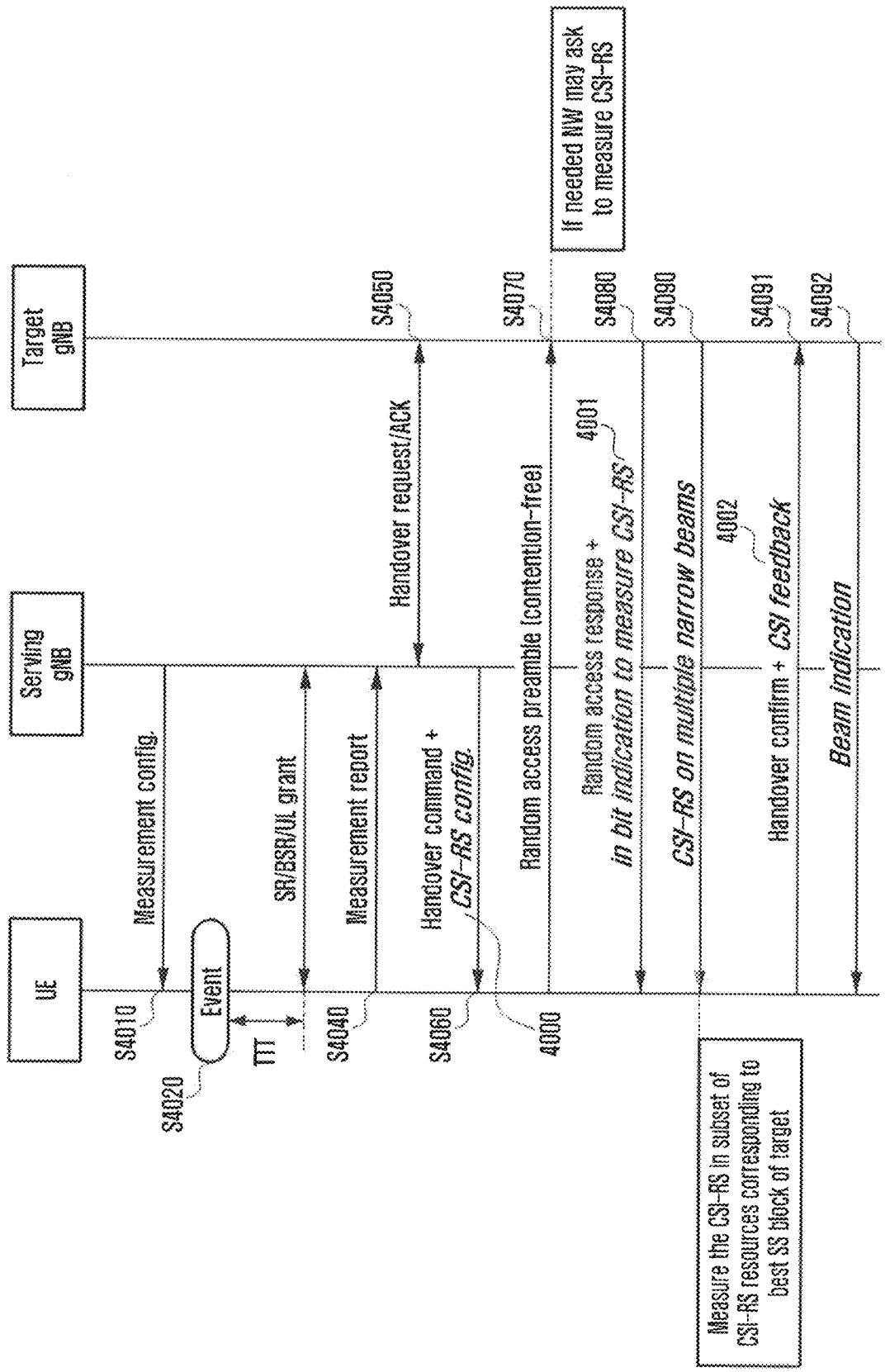

Referring to FIG. 40, an embodiment of Handover: proposed 5 will be described.

1. The serving gNB provides measurement configuration information to the UE at operation S4010.

2. The UE performs measurement, based on the measurement configuration information received from the serving gNB.

A. Here, the UE measures the signal strength or quality of the SS transmitted from the serving gNB and the target gNB.

3. If any event that the signal strength of the target gNB is greater than the signal strength of the serving gNB by offset is detected at operation S4020 through a comparison of signal strength, the UE transmits a measurement report to the serving gNB at operation S4040.

4. When the measurement report is received from the UE, the serving gNB transmits a handover request to the target gNB at operation S4050 to perform an admission control.

A. In the disclosure, the serving gNB delivers information contained in the measurement report to the target gNB. This information includes an SS beam index of the target gNB measured by the UE and corresponding signal strength.

B. Also, the target gNB determines CSI-RS configuration, based on the measurement report received from the serving gNB, and then delivers it to the serving gNB through a handover request ACK.

5. The serving gNB transmits a handover command to the UE at operation S4060 to provide information necessary for the UE to access the target gNB.

A. Additionally, in the disclosure, the serving gNB transmits CSI-RS configuration information 4000 together with the handover command to the UE. The details of the CSI-RS configuration information are as described above.

6. Based on information included in the handover command, the UE transmits a RAP to the target gNB at operation S4070.

A. Here, the target gNB may receive the RAP of the UE while sweeping a wide beam used to transmit the SS. In this case, the target gNB memorizes a wide beam used to receive the RAP of the UE and uses it at the next step. If the target gNB receives the RAP of the UE through a plurality of wide beams, the target gNB memorizes a wide beam having the highest signal strength and uses it at the next step.

7. After receiving the RAP from the UE, the target gNB transmits a RAR to the UE at operation S4080.

A. After receiving the RAP, the target gNB notifies a TX timing and power adjusting level to the UE through the RAR and, if necessary, requests the UE to transmit the RAP again. After this uplink synchronization, the target gNB allocates a UL grant so that the UE can transmit a handover confirm.

B. Additionally, in the disclosure, the RAR contains an indicator 4001 for instructing the UE on CSI-RS measurement.

8. If the CSI-RS measurement instruction indicator contained in the RAR is set to 1, the target gNB transmits at operation S4090 the CSI-RS through a plurality of narrow beams corresponding to a wide beam used for receiving the RAP.

A. If the CSI-RS measurement instruction indicator contained in the RAR is set to 0, the target gNB does not transmit the CSI-RS.

9. In addition, if the CSI-RS measurement instruction indicator contained in the RAR is set to 1, the UE measures the signal strength or quality of the CSI-RS transmitted by the target gNB, based on the CSI-RS configuration information transmitted together with the handover command.

A. If the CSI-RS measurement instruction indicator contained in the RAR is set to 0, the UE does not perform an operation related to the CSI-RS measurement since the target gNB does not transmit the CSI-RS.

10. The UE with the uplink synchronization receives the RAR and transmits the handover confirm to the target gNB through the UL grant included in the RAR at operation S4091.

A. When transmitting the handover confirm, the UE also transmits feedback 4002 of a measurement result for the CSI-RS. At this time, the UE utilizes the UL grant included in the RAR.

B. Through this, the UE completes the handover from the serving gNB to the target gNB.

11. Based on the CSI-RS feedback of the UE, the target gNB selects a narrow beam to be used by the UE and notifies it to the UE at operation S4092.

[Handover: Proposed 6]

Figure 41:
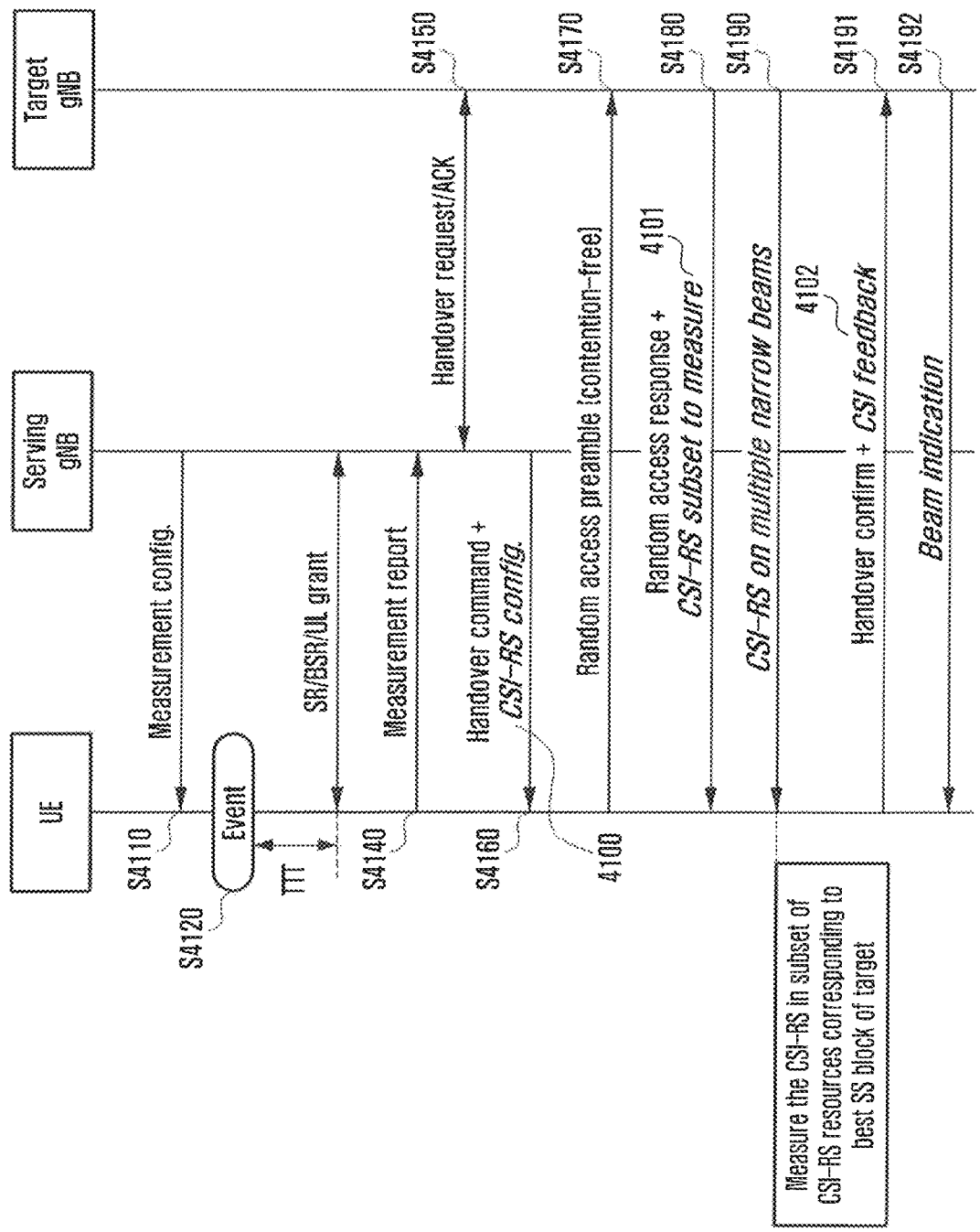

Referring to FIG. 41, an embodiment of Handover: proposed 6 will be described.

1. The serving gNB provides measurement configuration information to the UE at operation S4110.

2. The UE performs measurement, based on the measurement configuration information received from the serving gNB.

A. Here, the UE measures the signal strength or quality of the SS transmitted from the serving gNB and the target gNB.

3. If any event that the signal strength of the target gNB is greater than the signal strength of the serving gNB by offset is detected at operation S4120 through a comparison of signal strength, the UE transmits a measurement report to the serving gNB at operation S4140.

4. When the measurement report is received from the UE, the serving gNB transmits a handover request to the target gNB at operation S4150 to perform an admission control.

A. In the disclosure, the serving gNB delivers information contained in the measurement report to the target gNB. This information includes an SS beam index of the target gNB measured by the UE and corresponding signal strength.

B. Also, the target gNB determines CSI-RS configuration, based on the measurement report received from the serving gNB, and then delivers it to the serving gNB through a handover request ACK.

5. The serving gNB transmits a handover command to the UE at operation S4160 to provide information necessary for the UE to access the target gNB.

A. Additionally, in the disclosure, the serving gNB transmits CSI-RS configuration information 4100 together with the handover command to the UE. The details of the CSI-RS configuration information are as described above.

6. Based on information included in the handover command, the UE transmits a RAP to the target gNB at operation S4170.

A. Here, the target gNB may receive the RAP of the UE while sweeping a wide beam used to transmit the SS. In this case, the target gNB memorizes a wide beam used to receive the RAP of the UE and uses it at the next step. If the target gNB receives the RAP of the UE through a plurality of wide beams, the target gNB memorizes a wide beam having the highest signal strength and uses it at the next step.

7. After receiving the RAP from the UE, the target gNB transmits a RAR to the UE at operation S4180.

A. After receiving the RAP, the target gNB notifies a TX timing and power adjusting level to the UE through the RAR and, if necessary, requests the UE to transmit the RAP again. After this uplink synchronization, the target gNB allocates a UL grant so that the UE can transmit a handover confirm.

B. Additionally, in the disclosure, using the RAR, the target gNB may instruct the UE to measure subset 4101 only of CSI-RS transmission resources specified in the CSI-RS configuration.

C. Here, the target gNB may restrict the antenna port for transmission of the CSI-RS in information included in the CSI-RS configuration through the RAR and notify this restriction to the UE. For example, even if the previously transmitted CSI-RS configuration indicates four antenna ports, the target gNB may inform, through the RAR, the UE that the CSI-RS will be transmitted using only two antenna ports.

D. In addition, even if the previously transmitted CSI-RS configuration indicates M SS beams or CSI-RS beam sets, the target gNB may inform, through the RAR, the UE that the CSI-RS will be transmitted for only N (<M) SS beams or CSI-RS beam sets.

E. In addition, even if the previously transmitted CSI-RS configuration indicates M resource blocks, the target gNB may inform, through the RAR, the UE that the CSI-RS will be transmitted using only N (<M) resource blocks.

F. In addition, even if the previously transmitted CSI-RS configuration indicates M subframes as a period, the target gNB may inform, through the RAR, the UE that the CSI-RS will be transmitted actually at a period of N (<M) subframes.

G. In the disclosure, the CSI-RS configuration information is transmitted together with the handover command. At this time, the target gNB determines the CSI-RS configuration, based on the signal strength of the target gNB contained in the measurement report, and transmits it to the UE. However, the UE transmits the uplink RAP to the target gNB after receiving the handover command, so that the target gNB can more exactly identify the CSI-RS beam set corresponding to the SS beam for transmission of the CSI-RS. Therefore, in the disclosure, the target gNB may use a part of CSI-RS transmission resources included in the CSI-RS configuration information so as to transmit the CSI-RS beam set corresponding to the RAP receiving SS beam.

8. The target gNB transmits at operation S4190 the CSI-RS through a plurality of narrow beams corresponding to a wide beam used for receiving the RAP.

A. Here, the CSI-RS may be transmitted using only a part of the CSI-RS transmission resources specified in the CSI-RS configuration, as instructed to the UE in the RAR.

9. The UE measures the signal strength or quality of the CSI-RS transmitted by the target gNB, based on CSI-RS subset information 4101 contained in the RAR as well as the CSI-RS configuration information transmitted together with the handover command.

10. The UE with the uplink synchronization receives the RAR and transmits the handover confirm to the target gNB through the UL grant included in the RAR at operation S4191.

A. When transmitting the handover confirm, the UE also transmits feedback 4102 of a measurement result for the CSI-RS. At this time, the UE utilizes the UL grant included in the RAR.

B. Through this, the UE completes the handover from the serving gNB to the target gNB.

11. Based on the CSI-RS feedback of the UE, the target gNB selects a narrow beam to be used by the UE and notifies it to the UE at operation S4192.

Next, the operation of the disclosure will be described in a situation where the idle mode UE initially accesses the gNB. An initial access operation is as follows.

[Initial Access]

Figure 42:
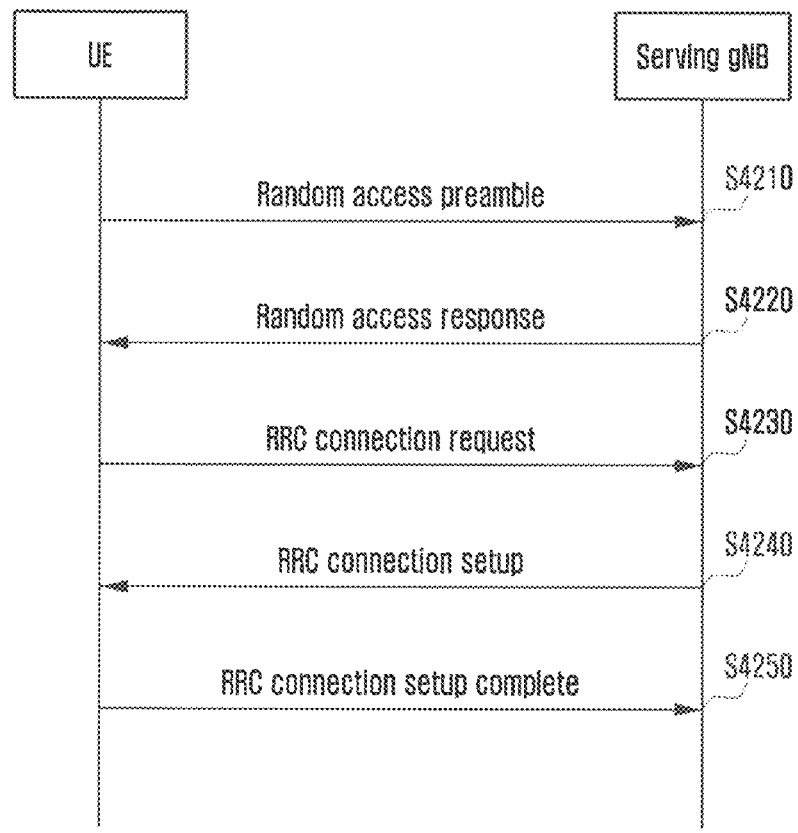
FIG. 42 is a flow diagram illustrating a random access operation according to an embodiment of the disclosure.

FIG. 42 is a flow diagram illustrating a random access operation according to an embodiment of the disclosure.

Referring to FIG. 42, the initial access operation will be described.

1. While performing reception (RX) beam sweeping, the UE measures the signal strength or quality of each beam for the SS transmitted by the gNB through TX beam sweeping.

2. When the SS is measured, the UE transmits an RAP toward one or more gNB beams having the greatest signal strength at operation S4210.

3. When the RAP is received, the gNB transmits an RAR to the UE by using one or more gNB beams having the greatest signal strength at operation S4220.

A. The RAR contains a UL grant so that the UE can transmit an RRC connection request.

4. After receiving the RAR, the UE transmits the RRC connection request to the gNB through the UL grant contained in the RAR at operation S4230.

5. After receiving the RRC connection request from the UE, the gNB transmits an RRC connection setup to the UE at operation S4240.

6. After receiving the RRC connection setup from the gNB, the UE transmits an RRC connection setup complete to the gNB at operation S4250.

A. Through this, the UE completes the initial access to the gNB.

Since the above operation is the same as the initial access operation defined in LTE, detailed description of each message is omitted. This initial access operation is designed for a situation where the gNB uses only one RS. This is not suitable for a situation considered in the disclosure, i.e., a situation where the determination of whether to perform the initial access is based on the SS transmitted on a wide beam, but the actual data transmission/reception uses a narrow beam. Unsuitableness is because the UE fails to determine a narrow beam to be used for transmitting and receiving data to and from the gNB despite the completion of the initial access.

In the disclosure, the UE determines whether to perform the initial access, through the measurement of the SS transmitted on a wide beam, and then performs the measurement of the CSI-RS transmitted on a narrow beam during the initial access procedure so as to find as soon as possible the narrow beam to be used with the gNB. Hereinafter, various embodiments will be described.

FIGS. 43 to 47 are flow diagrams illustrating various methods for determining a beam to be used for data transmission and reception in a random access process according to various embodiments of the disclosure.

[Initial Access: Proposed 1]

Figure 43:
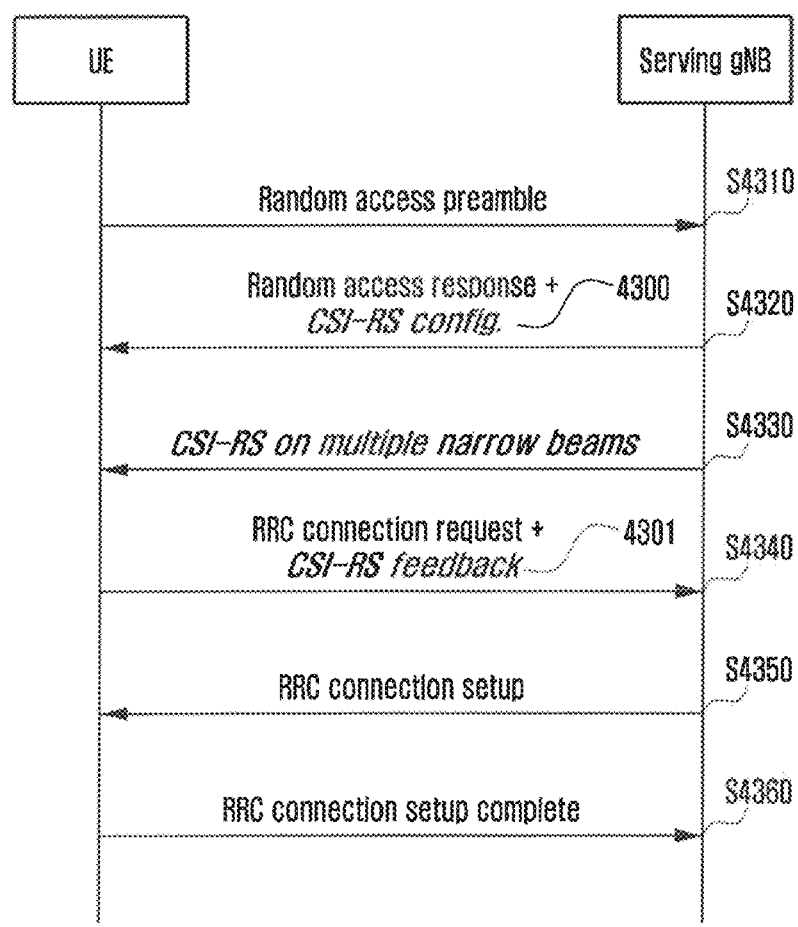
FIGS. 43 to 47 are flow diagrams illustrating various methods for determining a beam to be used for data transmission and reception in a random access process according to various embodiments of the disclosure.

Referring to FIG. 43, an embodiment of Initial access: proposed 1 will be described.

1. While performing RX beam sweeping, the UE measures the signal strength or quality of each beam for the SS transmitted through TX beam sweeping by the gNB.

2. When the SS is measured, the UE transmits an RAP toward one or more gNB beams having the greatest signal strength at operation S4310.

3. When the RAP is received, the gNB transmits an RAR to the UE by using one or more gNB beams having the greatest signal strength at operation S4320.

A. The RAR contains a UL grant so that the UE can transmit an RRC connection request.

B. Additionally, in the disclosure, CSI-RS configuration information 4300 is transmitted together with the RAR to the UE. The details of the CSI-RS configuration information are as described above.

4. The gNB transmits at operation S4330 the CSI-RS through a plurality of narrow beams corresponding to a wide beam used for receiving the RAP or corresponding to a beam having the greatest signal strength among wide beams used for receiving the RAP.

5. Based on the CSI-RS configuration information, the UE measures the signal strength or quality of the CSI-RS transmitted by the gNB.

6. After receiving the RAR, the UE transmits the RRC connection request to the gNB through the UL grant contained in the RAR at operation S4340.

A. When transmitting the RRC connection request, the UE further transmits feedback 4301 of a CSI-RS measurement result.

7. After receiving the RRC connection request from the UE, the gNB transmits an RRC connection setup to the UE at operation S4350.

A. Here, the RRC connection setup may be transmitted using a beam having the greatest signal strength from among a narrow beam included in the CSI-RS feedback and a wide beam used for transmitting the RAR.

8. After receiving the RRC connection setup from the gNB, the UE transmits an RRC connection setup complete to the gNB at operation S4360.

A. Through this, the UE completes the initial access to the gNB.

[Initial Access: Proposed 2]

Figure 44:
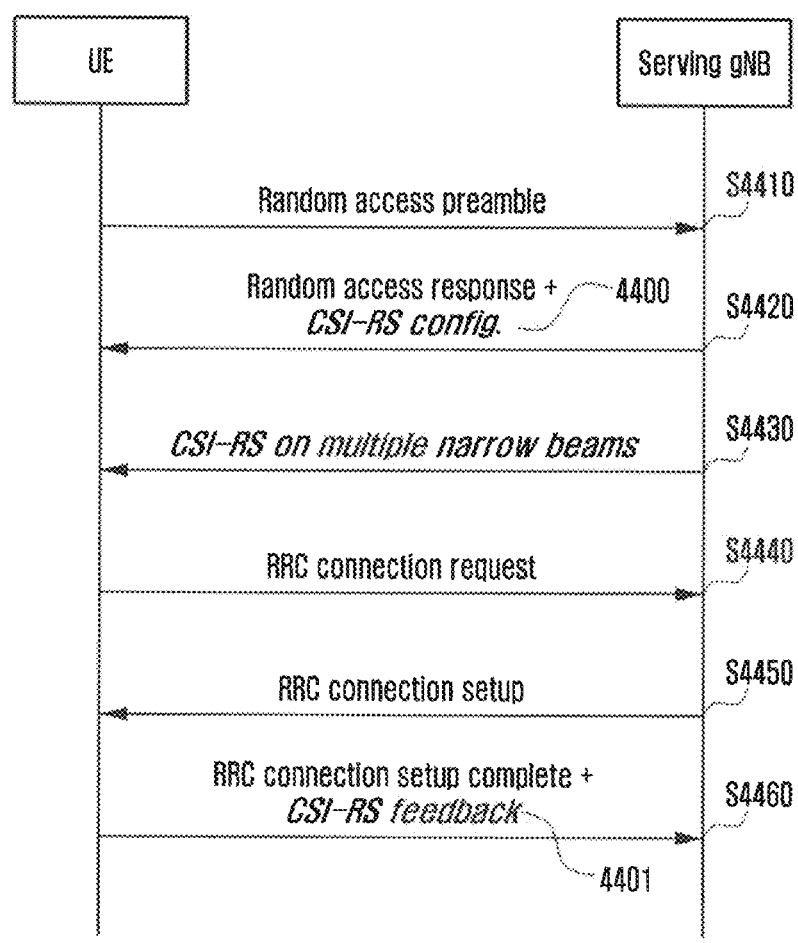

Referring to FIG. 44, an embodiment of Initial access: proposed 2 will be described.

1. While performing RX beam sweeping, the UE measures the signal strength or quality of each beam for the SS transmitted through TX beam sweeping by the gNB.

2. When the SS is measured, the UE transmits an RAP toward one or more gNB beams having the greatest signal strength at operation S4410.

3. When the RAP is received, the gNB transmits an RAR to the UE by using one or more gNB beams having the greatest signal strength at operation S4420.

A. The RAR contains a UL grant so that the UE can transmit an RRC connection request.

B. Additionally, in the disclosure, CSI-RS configuration information 4400 is transmitted together with the RAR to the UE. The details of the CSI-RS configuration information are as described above.

4. The gNB transmits at operation S4430 the CSI-RS through a plurality of narrow beams corresponding to a wide beam used for receiving the RAP or corresponding to a beam having the greatest signal strength among wide beams used for receiving the RAP.

5. Based on the CSI-RS configuration information, the UE measures the signal strength or quality of the CSI-RS transmitted by the gNB.

6. After receiving the RAR, the UE transmits the RRC connection request to the gNB through the UL grant contained in the RAR at operation S4440.

7. After receiving the RRC connection request from the UE, the gNB transmits an RRC connection setup to the UE at operation S4450.

8. After receiving the RRC connection setup from the gNB, the UE transmits an RRC connection setup complete to the gNB at operation S4460.

A. When transmitting the RRC connection setup complete, the UE further transmits feedback 4401 of a CSI-RS measurement result.

B. Through this, the UE completes the initial access to the gNB.

[Initial Access: Proposed 3]

Figure 45:
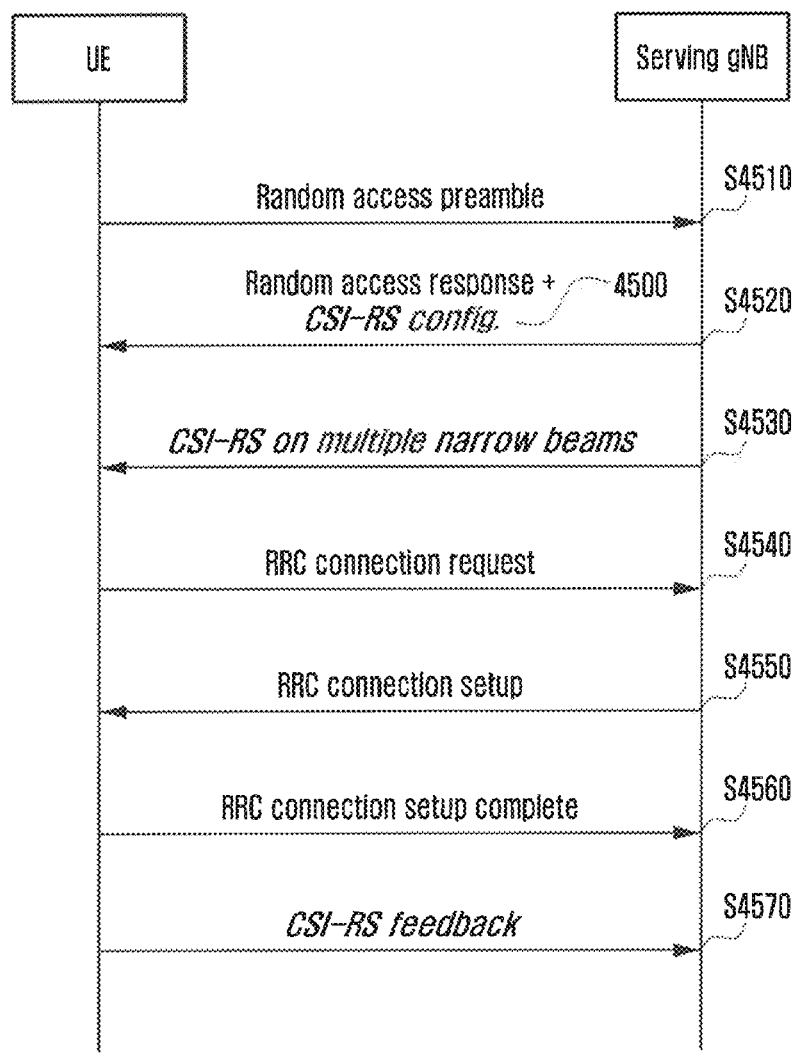

Referring to FIG. 45, an embodiment of Initial access: proposed 3 will be described.

1. While performing RX beam sweeping, the UE measures the signal strength or quality of each beam for the SS transmitted through TX beam sweeping by the gNB.

2. When the SS is measured, the UE transmits an RAP toward one or more gNB beams having the greatest signal strength at operation S4510.

3. When the RAP is received, the gNB transmits an RAR to the UE by using one or more gNB beams having the greatest signal strength at operation S4520.

A. The RAR contains a UL grant so that the UE can transmit an RRC connection request.

B. Additionally, in the disclosure, CSI-RS configuration information 4500 is transmitted together with the RAR to the UE. The details of the CSI-RS configuration information are as described above.

4. The gNB transmits at operation S4530 the CSI-RS through a plurality of narrow beams corresponding to a wide beam used for receiving the RAP or corresponding to a beam having the greatest signal strength among wide beams used for receiving the RAP.

5. Based on the CSI-RS configuration information, the UE measures the signal strength or quality of the CSI-RS transmitted by the gNB.

6. After receiving the RAR, the UE transmits the RRC connection request to the gNB through the UL grant contained in the RAR at operation S4540.

7. After receiving the RRC connection request from the UE, the gNB transmits an RRC connection setup to the UE at operation S4550.

8. After receiving the RRC connection setup from the gNB, the UE transmits an RRC connection setup complete to the gNB at operation S4560.

A. Through this, the UE completes the initial access to the gNB.

9. The gNB allocates a UL grant for receiving a CSI-RS feedback to the UE, and the UE transmits feedback of a CSI-RS measurement result to the gNB through the allocated UL grant at operation S4570.

[Initial Access: Proposed 4]

Figure 46:
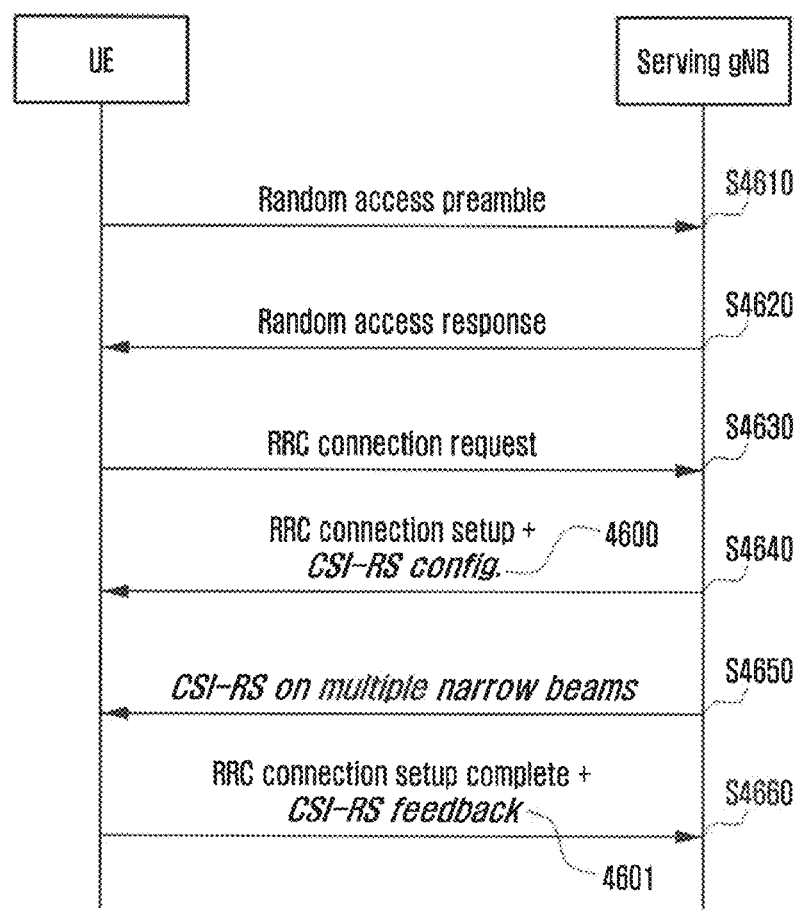

Referring to FIG. 46, an embodiment of Initial access: proposed 4 will be described.

1. While performing RX beam sweeping, the UE measures the signal strength or quality of each beam for the SS transmitted through TX beam sweeping by the gNB.

2. When the SS is measured, the UE transmits an RAP toward one or more gNB beams having the greatest signal strength at operation S4610.

3. When the RAP is received, the gNB transmits an RAR to the UE by using one or more gNB beams having the greatest signal strength at operation S4620.

A. The RAR contains a UL grant so that the UE can transmit an RRC connection request.

4. After receiving the RAR, the UE transmits the RRC connection request to the gNB through the UL grant contained in the RAR at operation S4630.

5. After receiving the RRC connection request from the UE, the gNB transmits an RRC connection setup to the UE at operation S4640.

A. Additionally, in the disclosure, CSI-RS configuration information 4600 is transmitted together with the RAR to the UE. The details of the CSI-RS configuration information are as described above.

6. The gNB transmits at operation S4650 the CSI-RS through a plurality of narrow beams corresponding to a wide beam used for receiving the RAP or corresponding to a beam having the greatest signal strength among wide beams used for receiving the RAP.

7. Based on the CSI-RS configuration information, the UE measures the signal strength or quality of the CSI-RS transmitted by the gNB.

8. After receiving the RRC connection setup from the gNB, the UE transmits an RRC connection setup complete to the gNB at operation S4660.

A. When transmitting the RRC connection setup complete, the UE further transmits feedback 4601 of a CSI-RS measurement result.

B. Through this, the UE completes the initial access to the gNB.

[Initial Access: Proposed 5]

Figure 47:
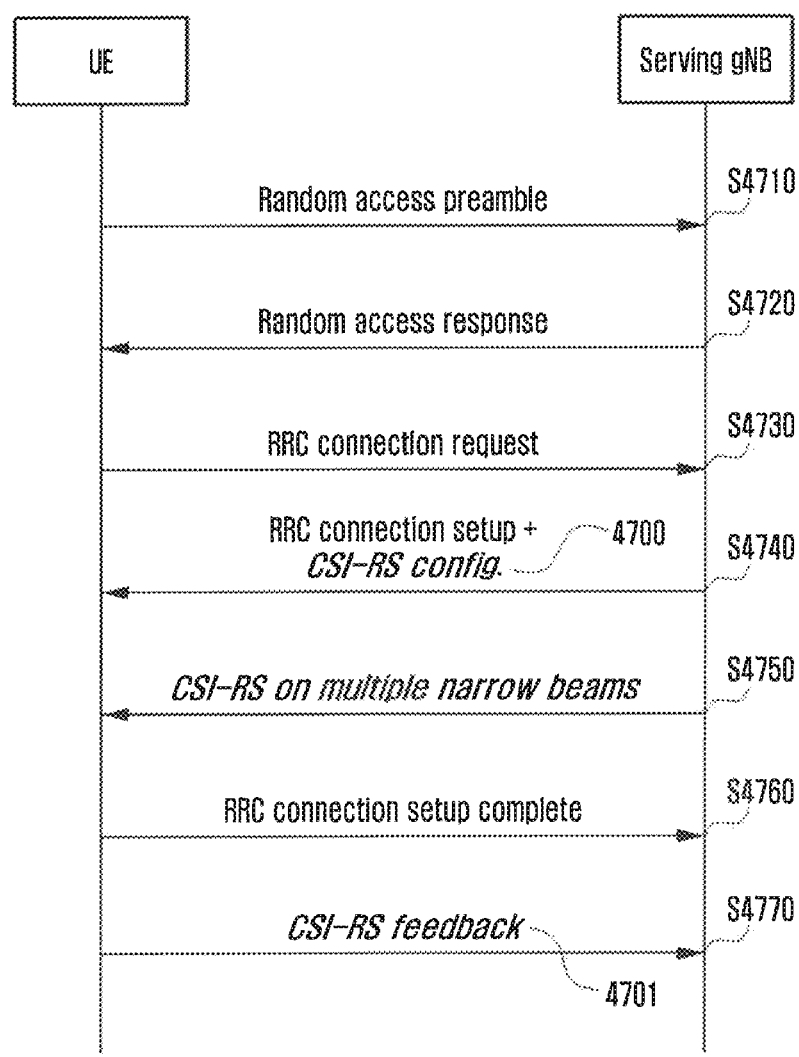

Referring to FIG. 47, an embodiment of Initial access: proposed 5 will be described.

1. While performing RX beam sweeping, the UE measures the signal strength or quality of each beam for the SS transmitted through TX beam sweeping by the gNB.

2. When the SS is measured, the UE transmits an RAP toward one or more gNB beams having the greatest signal strength at operation S4710.

3. When the RAP is received, the gNB transmits an RAR to the UE by using one or more gNB beams having the greatest signal strength at operation S4720.

A. The RAR contains a UL grant so that the UE can transmit an RRC connection request.

4. After receiving the RAR, the UE transmits the RRC connection request to the gNB through the UL grant contained in the RAR at operation S4730.

5. After receiving the RRC connection request from the UE, the gNB transmits an RRC connection setup to the UE at operation S4740.

A. Additionally, in the disclosure, CSI-RS configuration information 4700 is transmitted together with the RAR to the UE. The details of the CSI-RS configuration information are as described above.

6. The gNB transmits at operation S4750 the CSI-RS through a plurality of narrow beams corresponding to a wide beam used for receiving the RAP or corresponding to a beam having the greatest signal strength among wide beams used for receiving the RAP.

7. Based on the CSI-RS configuration information, the UE measures the signal strength or quality of the CSI-RS transmitted by the gNB.

8. After receiving the RRC connection setup from the gNB, the UE transmits an RRC connection setup complete to the gNB at operation S4760.

A. Through this, the UE completes the initial access to the gNB.

9. The gNB allocates a UL grant for receiving a CSI-RS feedback to the UE, and the UE transmits feedback 4701 of a CSI-RS measurement result to the gNB through the allocated UL grant at operation S4770.

Fourth Embodiment

In the LTE system, a multi-carrier scheme such as carrier aggregation (CA) and dual connectivity (DC) for handling a plurality of component carriers (CC) together has been introduced in order to support a wide band. Aggregation of up to 32 CCs can support a bandwidth of 640 MHz in case of 20 MHz CC. However, if a scheme such as LTE CA is applied to support ultra-wideband (e.g., 1 GHz) in a 5G new radio (NR) system, the number of combinations of CCs to be used by the terminal increases exponentially, and the size of a capability report performed by the terminal also increases. Therefore, the terminal has no choice but to operate only within a limited CC combination. In addition, as the number of CCs increases in the CA, the reception complexity of the terminal and the control complexity of the base station are also increased. However, in spite of such problems of the CA or DC, the CA or DC has greater flexibility in the use of resources than a single carrier. This is because the secondary (SCell) addition/release allows a change of an expanded band and also the cross-carrier scheduling allows scheduling of resource transmission/reception for other CCs.

In addition, the 5G system defines an energy-efficient operation with the primary goal of improving the power efficiency [bit/J] of the terminal and base station network by more than 1000 times. For this purpose, it is necessary to control the size of an operating band of the terminal in order to solve a possibility of additional power consumption caused by wideband transmission which is essential in the operation of a super-high frequency band (mmW).

The disclosure proposes operating schemes of a terminal and a base station for achieving energy efficiency key performance indicators (KPI) being discussed in 3GPP RAN 5G system information (SI). Specifically, the disclosure relates to the layer 1/2 operation of a terminal and a base station in a mobile communication system. More specifically, the disclosure relates to a method and apparatus for changing an operating band of a terminal to reduce power consumption of the terminal when the base station desires ultra-wideband signal transmission/reception with the terminal.

The disclosure proposes a control and setup method for ultra wideband transmission/reception in the 5G mobile communication system. In particular, a method for scheduling, handover, and power saving in the ultra wideband is considered. In the 5G mobile communication system, it is expected that various services (or slices) such as enhanced mobile broadband (eMBB), ultra reliable and low latency communication (URLLC), and enhanced machine type communication (eMTC) are to be supported. This may be understood in the same context that the voice over Internet protocol (VoIP) and best effort (BE) services are supported in LTE which is the fourth generation (4G) mobile communication system. In addition, it is expected that various numerologies are to be supported in the 5G mobile communication system. This is specifically due to a difference in subcarrier spacing or transmission time interval (TTI). Therefore, TTIs of various lengths are expected to be supported in the 5G mobile communication system. This is one of distinctive features of the 5G mobile communication system, compared to LTE in which only one kind of TTI (1 ms) is supported. If the 5G mobile communication system supports a TTI (e.g., 0.1 ms) which is much shorter than the 1 ms TTI of LTE, it is expected to be a great help to support URLLC which requires a short delay time. In the disclosure, the numerology is used as a term having the same meaning as subcarrier spacing, subframe length, symbol/sequence length, and the like. Also, the terminals may be configured with different bandwidths (BWs) in different numerology areas. The base station may be also referred to as various terms such as gNB, eNB, NB, and BS. The terminal may be also referred to as various terms such as UE, MS, and STA.

Figure 48:
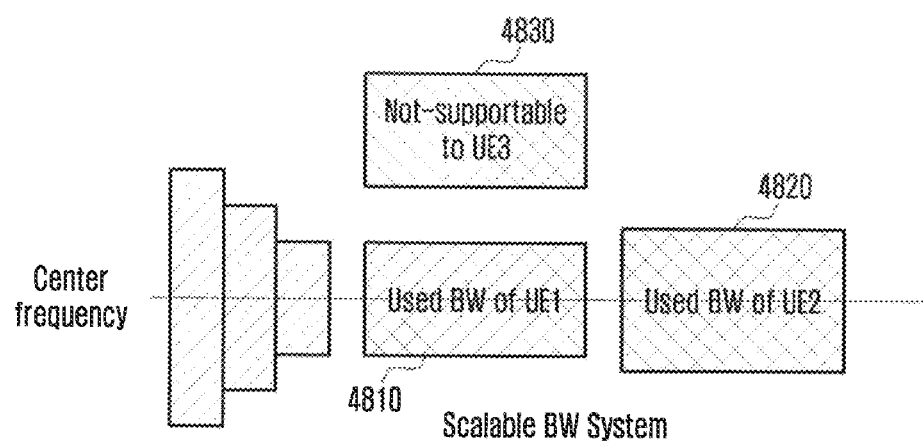
FIG. 48 is a diagram illustrating a long term evolution (LTE) scalable bandwidth (BW) system according to an embodiment of the disclosure.

FIG. 48 is a diagram illustrating an LTE scalable BW system according to an embodiment of the disclosure.

Figure 49:
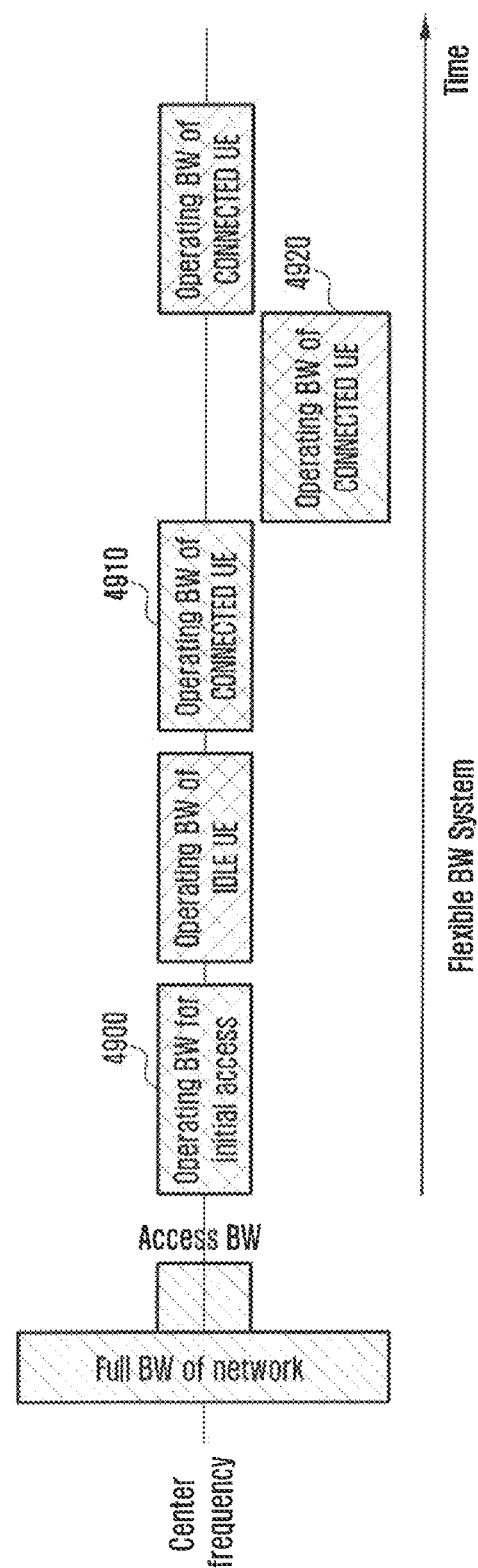
FIG. 49 is a diagram illustrating features of a fifth generation (5G) new radio (NR) flexible BW system according to an embodiment of the disclosure.

FIG. 49 is a diagram illustrating features of a 5G NR flexible BW system according to an embodiment of the disclosure.

Referring to FIG. 48, in order to support various BWs, LTE has introduced the concept of a scalable BW. According to FIG. 48, the LTE system supports terminals having various BWs (e.g., 5/10/20 MHz) with the same center frequency. For example, if the first UE 4810 supports 5 MHz and the second UE 4820 supports 10 MHz, the LTE base station appropriately configures a control channel and transmits a control signal so that both UEs can receive the control signal. However, this method extremely restricts resources that can be used by a terminal having a relatively small band when the total available bandwidth of the base station is very large, namely, in the ultra wideband. For example, when the third UE 4830 operates at the edge of the base station available band, this UE 4830 may not distinctively receive the control signal of the base station.

Referring to FIG. 49, in the 5G NR communication system, the operating band should be able to be flexibly configured. That is, after the RRC connection setup is successful through an access BW 4900 configured from the synchronization signal reception and SI acquisition, the terminal may switch the operating band (or operating BW) from a relatively narrow band (or narrow BW) 4910 to a relatively wide band (or wide BW) 4920 under the control of the base station. Using the wide band, the terminal may receive the control signal of the base station to contribute to the improvement of the control signal performance or may perform data transmission/reception (DL or UL) to improve the efficiency of resources.

Also, in the 5G NR communication system, the terminal should be able to transmit and receive important control signals in order to maintain the connection with the base station even in a certain band which is not supported by the existing scalable BW system. In case of LTE, such important control signals are transmitted via PCell by means of a signaling radio bearer (SRB). Also, in PCell, control signals for scheduling and hybrid automatic-repeat-request (HARQ) procedures in PCell itself and SCell are transmitted and received. In LTE, each of PCell or SCell may be one independent cell. For each cell, a separate MAC entity and corresponding link adaptation and HARQ entity are required. However, in the 5G NR single carrier communication system, the entire band corresponds to one cell. Also, functions of PCell for terminal access, connection setup/maintenance, and data transmission/reception should be basically provided.

Meanwhile, even if the base station operates in the ultra wideband, the terminal can perform transmission/reception only in a part of the entire band because of limited implementation and complexity. In order for the terminal to operate in a band larger than the maximum usable bandwidth (i.e., capable BW), it is necessary to operate in a time division manner. For an easier management, the base station may divide the ultra wideband into bands or sub-bands having suitable sizes and instruct the terminal to perform, in a specific band, various functions (e.g., control signal transmission/reception, data signal transmission/reception, RS, measurement, scheduling, link adaptation, modulation coding scheme (MCS), HARQ, etc.). Also, the terminal may judge and receive the structure of a control channel and a reference signal, based on the band.

Figure 50:
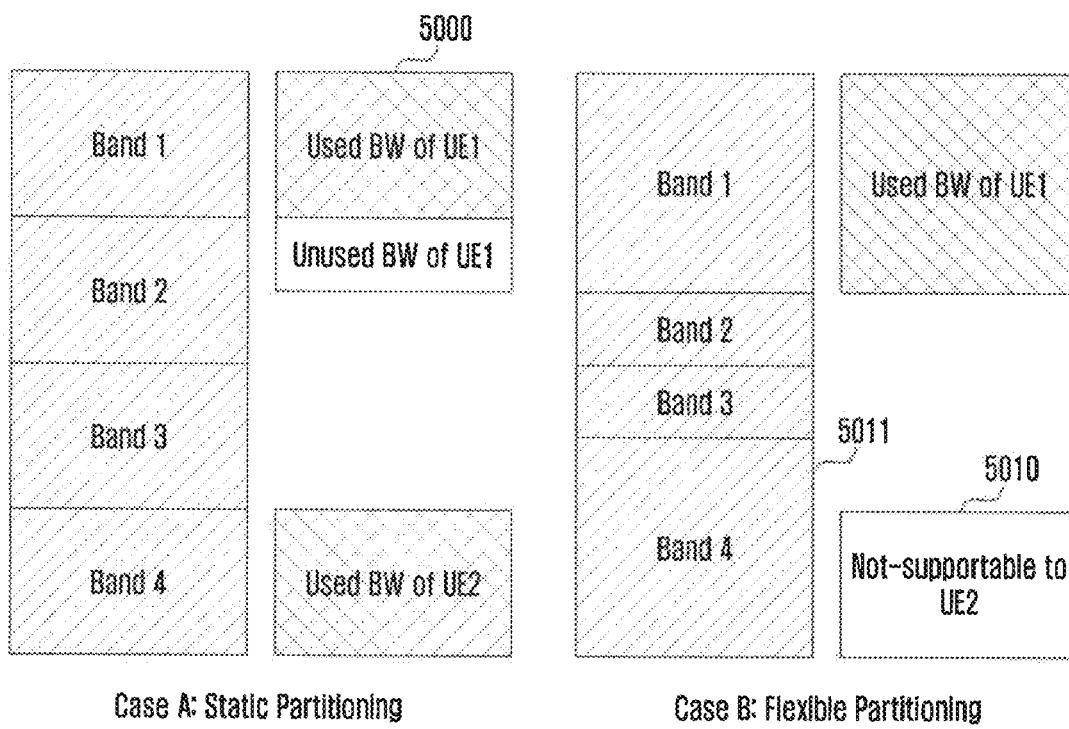
FIG. 50 is a diagram illustrating various band division schemes in a 5G NR flexible BW system according to an embodiment of the disclosure.

FIG. 50 is a diagram illustrating various band division schemes in a 5G NR flexible BW system according to an embodiment of the disclosure.

Referring to FIG. 50, in Case A, the UE1 5000 may operate only in a part, not in the entire, of the available band due to the fixed band configuration.

In Case B, the UE2 5010 may not be supported in Band 4 because the maximum available bandwidth is smaller than the bandwidth 5011 of Band 4 configured by the base station.

If the unit of bands is minimized as shown in Case C, it is possible to support UEs 5020 having various bandwidths because the band to be used by the UE is represented by a bundle of small bands. However, too many bands may cause an increase of overload.

Therefore, as in Case D, a scheme of freely configuring the size of bands is useful.

In order to solve the above problems when the base station divides the entire band into bands for the terminal, the disclosure considers a scheme in which the base station configures bands of different sizes for respective terminals and the system can represent the band as a combination of sub-bands having the same size. Also, rather than performing independent scheduling, link adaptation, MCS, and HARQ procedures in a sub-band divided in view of the system, one scheduling, link adaptation, MCS, and HARQ procedure will be performed in a band configured in view of the terminal.

The structure of a physical layer control channel should be designed to be scalable to one or a plurality of sub-bands in one band. This means that it is possible to support a terminal having a band that can be represented by at least a multiple of sub-bands in the band. The size of a band which is a bundle of sub-bands is determined by at least one of a channel feature between a terminal and a base station, numerology, a control sub-band size, and a minimum packet size. The terminal performs one MAC function set (scheduling, MCS, HARQ, etc.) for one service.

The functions that can be provided by the system structure proposed by the disclosure can be considered as follows.

Configuration of control/RS/CSI report/HARQ feedback per band
Self-/cross-band scheduling
Band-aggregation to transmit single transport block
Cross-band HARQ retransmission
RRM measurement
Power saving with adaptive BW

[Configuration of Control/RS/CSI Report/HARQ Feedback Per Band]

The base station can notify the range (i.e., start, size or center frequency, and bandwidth) of a band to the terminal by representing a multiple of a basic unit (RB or sub-band) when configuring the band. Since the position and range of a band are part of one carrier in which the network system operates, the base station can configure the band to the terminal by means of the frequency offset and bandwidth for the center frequency of the entire carrier band. Alternatively, the base station can configure the band to the terminal by means of the frequency offset and bandwidth for the center frequency at which a synchronization signal detected by the terminal is located. Meanwhile, the center frequency of a carrier band understood by the terminal may be always the center frequency of the synchronization signal detected by the terminal, be the same as the center frequency information of a carrier indicated by the SI connected to the synchronization signal detected by the terminal, or be the same as the center frequency information of a carrier instructed by the base station in the RRC connection setup procedure. The terminal understands the band range as a system band. Therefore, even if bands of different ranges are assigned, the terminal should be designed to receive a signal in accordance with the same reception rule.

For example, the position of a reference signal (RS) or a control channel transmitted by the base station should be determined on the basis of the start and size of a band configured for the terminal. Also, the position of a CSI report or HARQ feedback transmitted by the terminal should be determined on the basis of the start and size of a band configured for the terminal. Meanwhile, when a plurality of bands are configured, the base station may further configure for the terminal whether the HARQ process is to be shared for a plurality of bands or separated for each band.

A band configured for the terminal to monitor is referred to as a primary band (p-band). The terminal may not perform monitoring in a resource area other than the p-band unless there is any separate control/configuration from the p-band.

A secondary band (s-band) may be selectively operated according to the configuration through the p-band, and the p-band and the s-band may be referred to as a first radio frequency (RF) band and a second RF band, respectively. Also, the p-band may be activated to the active state from among at least one or more configured band candidates through the RRC message or MAC CE or DCI. Also, the s-band may be activated to the active state from among at least one or more configured band candidate through the RRC message or MAC CE or DCI. Similarly, the base station may deactivate one or more bands from the active state to the inactive state by transmitting a deactivation signal or message the terminal through the RRC message or MAC CE or DCI. In the disclosure, the active band and the p-band are used as similar meaning, but the p-band requires a combination of a DL band and a UL band at the time of configuration. Therefore, the p-band is the active band, but all active bands are not always the p-band. Also, the p-band is not deactivated except for a separate band switching procedure. In case of time division duplex (TDD), the frequency positions of the DL band and the UL band in the p-band may be the same.

The p-band configuration includes at least one DL band and one or more UL bands, and the base station can instruct the terminal to configure the p-band. When the terminal reports a UE capability report including RF information to the base station, the base station can configure the p-band for each different RF of the terminal.

Hereinafter, the operation associated with band switch/activation indication in single or multiple active bands will be described.

The terminal may monitor one or more of configured bands at the same time according to RF conditions. Therefore, it is advantageous in terms of scalability that a band indication of the base station is commonly applied to the terminals under different RF conditions. However, the base station needs to know in advance other RF conditions of the terminal through a capability report of the terminal Otherwise, when an activation instruction from Band #1 to Band #2 is issued for a certain terminal, there is a possibility of wrong operation because it is impossible to know whether Band #1 is deactivated due to RF restriction of the terminal.

When the terminal that operates in a single active band receives a band activation indication from the base station, the terminal switches to the indicated band and deactivates the previous band. When the terminal that operates in multiple active bands receives a band activation indication from the base station, the terminal activates the indicated band and maintains the band in use.

However, the band configuration by the capability report of the terminal has a possibility of wrong operation. Therefore, the base station should be able to configure the maximum number of active bands of the terminal and to clearly indicate the deactivation of the band.

An activation/deactivation operation rule for the band may be configured in advance according to one of the following two methods, or may be configured by the base station/network. In addition, this operation may be equally applied to a case where a band switch/activation occurs in conjunction with a cross-band scheduling indication in addition to a separate band activation indication of the base station.

a) Although multiple active bands are configured, each active band can only switch to other deactivated band. Therefore, changing the number of active bands is possible only with RRC.

b) Multiple active band are configured, and activated/deactivated indication is made for each band. Since the number of active bands can be changed, the base station should be operated so that the maximum number of active bands of the terminal is not exceeded and all bands are deactivated. If the base station instructs to exceed the maximum active band, the terminal may operate, in the previous active bands, 1) to deactivate the initially activated band, 2) to deactivate the lastly activated band, 3) to deactivate the lowest band in the order of band index, 4) to deactivate the lowest band according to the priority of bands configured by the base station, or 5) to deactivate a certain band arbitrarily determined by the terminal. Also, the deactivated band may be configured to exclude the p-band.

Hereinafter, a procedure for determining a moving point including retuning latency when activating a band through DCI or MAC CE will be described.

The RF retuning time may be varied according to a relation between switching bands and an active band switching condition of the terminal. The base station may configure a time required for switching one band (e.g., the p-band) to other band to the terminal through the RRC, based on the capability report of the terminal. If the terminal fails to comply with this configuration, the terminal may reject the band switching for each band.

In case where the base station instructs the band switching through the DCI, 1) the terminal may consider a switching delay time from the DCI reception time (subframe/slot/mini-slot), already configured through the RRC, to the completion of switching. Therefore, the terminal may monitor a control channel from the fastest valid control channel in the band activated after the switching delay time from the DCI reception time, based on a band identification (ID) included in the DCI. Alternatively, 2) the switching delay time k from the DCI reception time (subframe/slot/mini-slot) to the completion of the switching may be included, together with the band ID, in the DCI. Accordingly, the terminal may monitor a control channel from the fastest valid control channel after a time determined according to the value of k.

In case where the base station instructs the band switching through the MAC CE, 1) the terminal may monitor a control channel from the fastest valid control channel in the band activated after the switching delay time from the HARQ ACK success time (subframe/slot/mini-slot) for the MAC CE reception to the completion of switching, by considering the switching time already configured through the RRC, based on the band ID included in the MAC CE. Alternatively, 2) the terminal may consider the switching delay time already configured through the RRC. The terminal may monitor a control channel from the fastest valid control channel in the band activated after the switching delay time from the time (subframe/slot/mini-slot), when the MAC determines the band switching and transmits an indication to the PHY, to the completion of switching, based on the band ID included in the MAC CE. Alternatively, 3) the switching delay time k from the MAC CE reception success time (subframe/slot/mini-slot) to the completion of the switching may be included, together with the band ID, in the MAC CE. Accordingly, the terminal may monitor a control channel from the fastest valid control channel in the band activated after the switching delay time from the MAC CE reception success time (subframe/slot/mini-slot) to completion of switching. Alternatively, 4) the switching delay time k from the transmission time (subframe/slot/mini-slot) of HARQ ACK for the MAC CE reception success to the completion of the switching may be included, together with the band ID, in the MAC CE. Therefore, the terminal may monitor a control channel from the fastest valid control channel in the band activated after the switching delay time from the transmission time (subframe/slot/mini-slot) of HARQ ACK for the MAC CE reception success to the completion of the switching. The terminal follows at least one of the operations described above.

[Self-/Cross-Band Scheduling]

Figure 51:
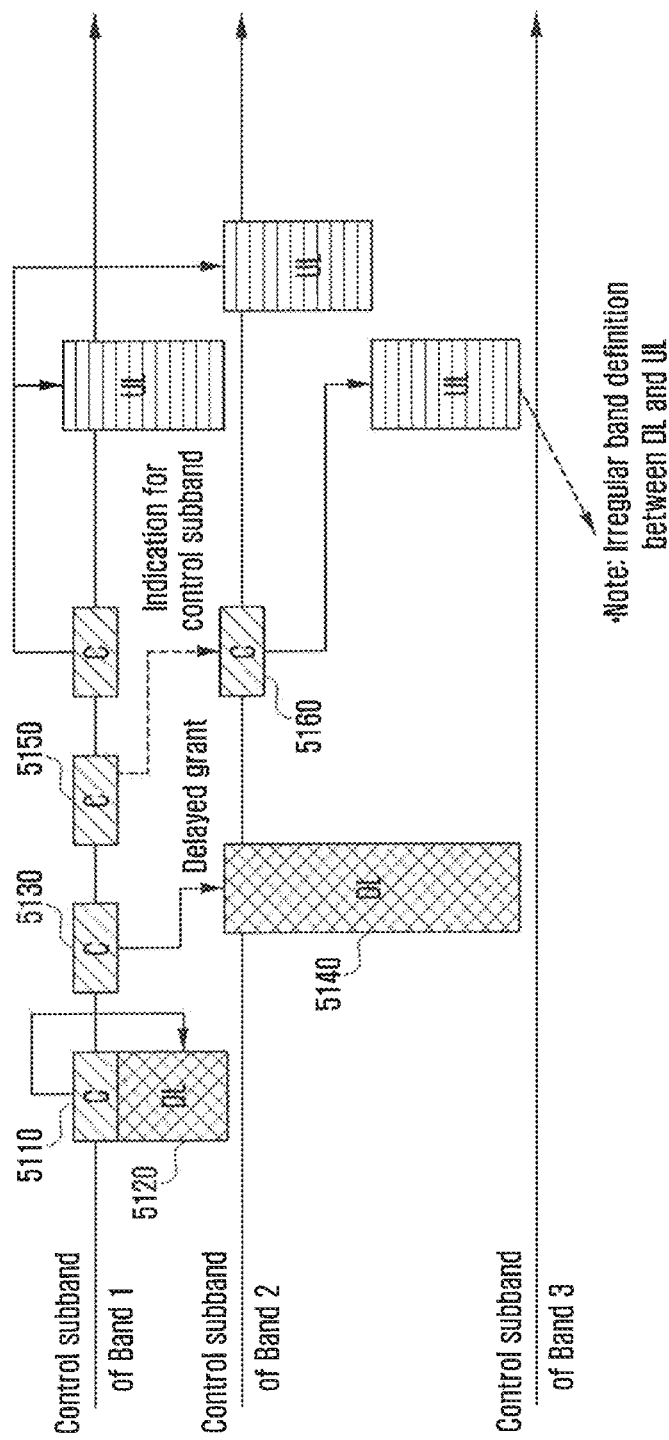
FIG. 51 is a diagram illustrating a self/cross-band scheduling operation according to an embodiment of the disclosure.

FIG. 51 is a diagram illustrating a self/cross-band scheduling operation according to an embodiment of the disclosure.

Referring to FIG. 51, through control sub-bands 5110, 5130, and 5150 in a p-band, the base station may schedule a data channel 5120 in the same sub-band, a data channel 5140 in other sub-band, or a control channel 5160 in other sub-band.

The base station may control transmission/reception of signals through a control channel or a data channel of the terminal through a control sub-band within a p-band configured for each terminal. The base station may indicate a downlink (DL) or uplink (UL) data transmission/reception area by means of self-band data scheduling or cross-band data scheduling. Also, the base station may instruct a change in the position or size of a control sub-band in the same band by self-band control scheduling. Also, the base station may indicate the position or size of an additional control sub-band in other band by cross-band control scheduling.

If the position or size of the second control sub-band is indicated through the first control sub-band, the terminal checks whether the first control sub-band and the second control sub-band are simultaneously monitored. If so, the terminal can simultaneously receive signals through two control sub-bands. Otherwise, this means that the terminal monitors only the first control sub-band. Therefore, in order to monitor the second control sub-band, a delay for a certain amount of RF retuning is required.

In general, in case of UL scheduling, the base station can instruct the terminal on a predetermined delay value (e.g., 4 ms) or a separate delay value through a control sub-band.

In the system considered in the disclosure, cross-band scheduling in which a bandwidth change may be required, even in case of DL scheduling, needs to separately indicate a specific subframe that follows in time while physical downlink shared channel (PDSCH) for data transmission/reception is normally indicated in the same subframe as PDCCH.

This is because a processing time for retuning of the RF and baseband (BB) circuit is required as the position of the used band abruptly changes. That is, in consideration of the available band information included in the capability report of the terminal and the degree of change of the used band of the terminal by the control of the base station, the base station should instruct the terminal to transmit and receive a DL signal after a delay time configured after the transmission of a control signal. This delay time may be included in each control signal, or the base station may previously configure at least one delay time value during a capability negotiation and connection setup procedure of the terminal. Since the delay is greater in case where the used band of the terminal completely changes than in case where the used band of the terminal is partially overlapped and the bandwidth alone is changed, the base station transmits the delay time through each control signal or transmit an index for two or more delay values through a control signal so that the terminal can perform a DL reception operation after a suitable delay.

Meanwhile, the base station may perform asymmetric p-band configuration that the terminal has different bands (position, size) in DL and UL. However, since main control functions are smoothly operated in the p-band when both DL and UL are supported, the terminal understands the p-band as one even if different bands are allocated.

[Adaptive BW Method and Procedure for Power Saving]

The LTE system provides a power saving mode (PSM) and a discontinuous reception (DRX) so as to reduce power consumption. The PSM refers to a state in which only a tracking area update (TAU) or a routing area update (RAU) is performed and paging is not received from the base station. This is almost similar to power off, but the terminal needs not to re-attach to the network or re-establish the packet data network (PDN) connection because of being still registered in the network.

The DRX is classified into the idle mode DRX and the connected mode DRX. According to the idle mode DRX (i.e., idle-DRX), the idle mode UE does not receive a signal of the base station except for a period of time (paging frame number and paging occasion) for periodically monitoring a paging signal. In this case, since the terminal does not have the RRC connection with the network, the network does not have context information of the terminal. The terminal is regarded as being registered in the mobility management entity (MME) and residing within a tracking area list (TAL). The purpose of the connected mode DRX is to reduce power consumption caused when the connected mode terminal monitors a control signal of the base station (PDCCH) every DL subframe. If the terminal arbitrarily skips the monitoring of the DL subframe, it is difficult for the base station to control the terminal as desired. Therefore, the base station and the terminal should perform transmission by the base station and reception by the terminal in the DL subframe of a predetermined location.

The LTE connected DRX operation is as follows. The base station may configure DRX-related parameters among RRC parameters through an RRC connection setup request message or an RRC connection reestablishment request message. The DRX-related parameters include, for example, a DRX cycle, an on-duration timer, and an inactivity timer. The DRX cycle indicates the length of a single duration in which the terminal repeats ON and OFF, and the on-duration timer indicates the length of the on-duration. The length of off-duration may be calculated from the DRX cycle and the on-duration timer. These parameters are expressed in subframe units. The terminal monitors a DL signal on PDCCH of the base station during the on-duration indicated by the on-duration timer and does not monitor a DL signal on PDCCH of the base station in the off-duration. If the terminal succeeds in receiving a DL signal in a certain subframe, the inactivity timer starts from that subframe. The terminal should monitor a DL signal on PDCCH of the base station until the inactivity timer expires. After the last successful reception of a DL signal, the terminal does not monitor a DL signal if a subframe corresponding to the expiration time of the inactivity timer is reached and this subframe belongs to the off-duration.

Specifically, the C-DRX may be classified into short DRX and long DRX, depending on the DRX cycle. In accordance with the activity of a DL signal, the terminal always switches to the short DRX in each subframe, then switches to the long DRX, and switches again to a state of no DRX operation when the long DRX cycle ends. To configure this operation, a short DRX cycle timer is used to indicate the number of repetitions of the short DRX cycle. In case of the long DRX, the terminal switches to a sleep state after one long DRX cycle. The base station may instruct the start of the short or long DRX through a MAC command element (CE) so that the terminal switches back to the short DRX or maintains the long DRX state. Exceptionally, at the DL HARQ packet retransmission defined as HARQ round trip time (RTT), the terminal should monitor a DL signal irrespective of the DRX. Also, if the UL HARQ packet retransmission is expected, the terminal should monitor a DL control signal, i.e., a UL grant, for a duration configured as a DRX retransmission timer.

According to LTE, the short DRX is represented as follows:

[($SFN$*10)+subframe number]modulo(shortDRX-Cycle)=(drxStartOffset)modulo(shortDRX-Cycle)

According to LTE, the long DRX is represented as follows:

[($SFN$*10)+subframe number]modulo(longDRX-Cycle)=drxStartOffset

Similar equations may be used when applying the LTE connected mode DRX (C-DRX) to 5G NR.

If the LTE C-DRX is applied to 5G NR, the terminal that receives high-speed data traffic will monitor a wideband DL signal of the base station in the on-duration and will not monitor a DL signal in the off-duration. However, depending on the characteristics of traffic, it is not necessary to receive a wideband DL signal every subframe. For example, in case of a streaming service, an encoding scheme for transmitting only image variation information in periodic large-capacity information is used. Therefore, in the 5G NR communication system, the size of bandwidth (BW) of a resource monitored by the terminal should be adaptively varied.

Figure 52:
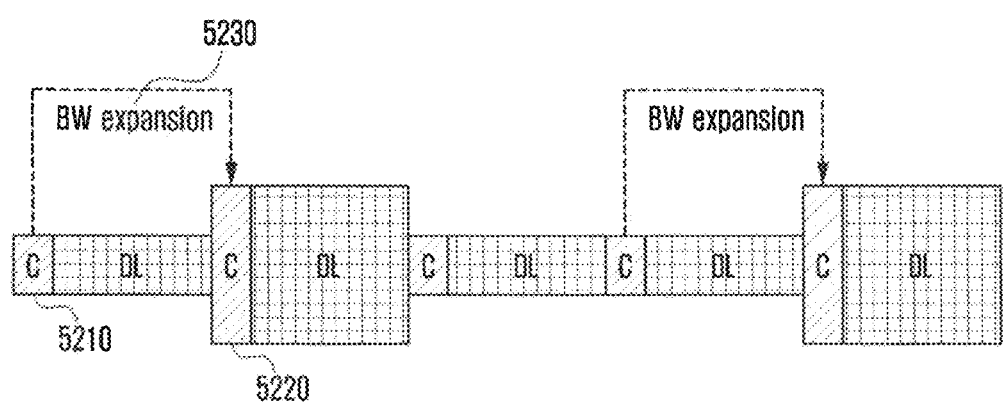
FIGS. 52 to 54 are diagrams illustrating examples of BW expansion and reduction operation by a physical layer control signal according to various embodiments of the disclosure.
Figure 53:
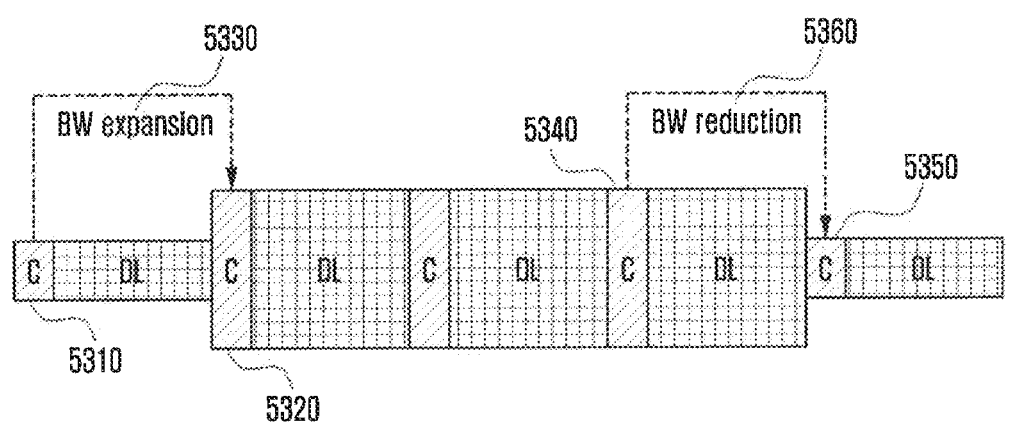
Figure 54:
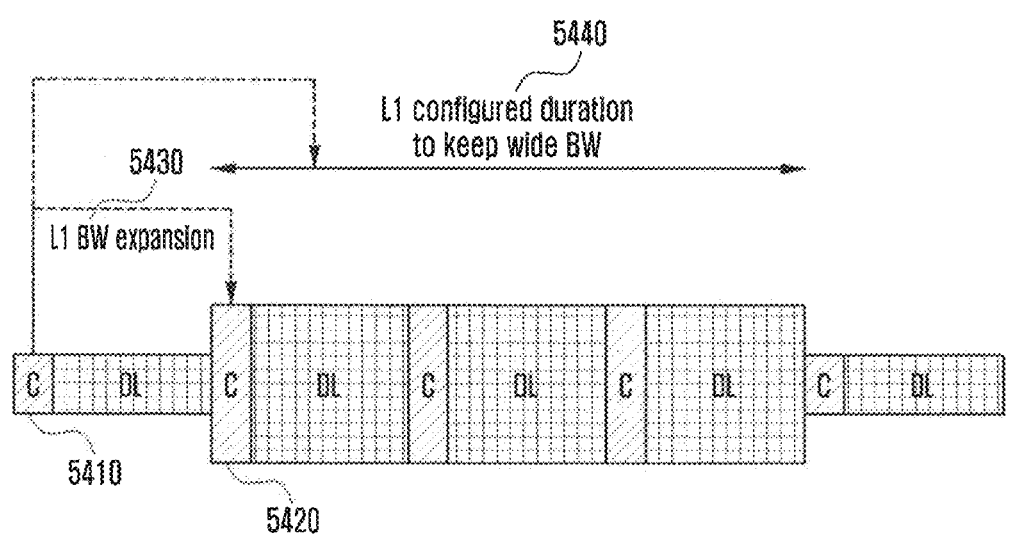

FIGS. 52 to 54 are diagrams illustrating examples of BW expansion and reduction operation by a physical layer control signal according to various embodiments of the disclosure.

If this variable BW control is performed on the L1 layer, i.e., the physical layer, operations as shown in FIGS. 52 to 55 are possible. In order to save power, it is reasonable that the terminal is basically in a narrow BW state and, if necessary, switches to a wide BW.

Referring to FIG. 52, therefore, the terminal monitors a narrowband control sub-band (CSB #1) 5210 provided by the L1 in the RRC connection setup step and, if an L1 signal 5230 instructing a BW expansion is received from the base station, monitors a wideband control sub-band (CSB #2) 5220 in a specific subframe.

An interval between the time point when the BW expansion instruction control signal is received and the subframe where switching to CSB #2 is performed is determined according to at least one of a) a fixed interval, b) an interval configured by the RRC parameter, c) an interval configured by the L1 control signal, d) an interval computable according to the BW capability information reported by the terminal and the current terminal state, and e) whether the center frequency of the BW to be switched is overlapped.

On the other hand, when the terminal continuously requests a large amount of traffic, the BW expansion instruction control signal should be frequently transmitted, and in the worst case, half of a subframe can be served in a narrow band due to restriction of a switching delay. In addition, frequent BW and RF switching may cause a terminal load and additional power consumption.

Referring to FIG. 53, an example is illustrated of further using a BW reduction instruction control signal to solve a problem when using only a BW expansion instruction control signal.

According to this operation, the terminal monitors CBS #1 5310, switches the bandwidth to monitor CSB #2 5320 when the BW expansion instruction control signal 5330 is received, and maintains the mode. Then, when the BW reduction instruction control signal 5360 is received through CSB #2 5340, the terminal switches the bandwidth to monitor CSB #1 5350. However, this method may cause an error in the operation of the terminal if the BW expansion or reduction instruction control signal fails to be received.

For example, although the base station sends the BW expansion instruction control signal 5330 and sends a control signal (DCI) for data transmission/reception through CSB #2 5320 of the instructed subframe, the terminal may not receive the BW expansion instruction control signal 5330. Because of being monitoring CSB #1, the terminal does not receive the DCI transmitted through CSB #2 5320. In this case, the base station does not know whether the terminal fails to receive the DCI transmitted through CSB #2 5320 even though the terminal successfully receives the BW expansion indication control signal 5330, or the terminal fails to receive the BW expansion indication control signal 5330.

Also, if the terminal fails to receive a DL signal for a certain time due to mismatch of a monitoring band, i.e., CSB, the terminal may operate as DRX Off or cause a problem in the HARQ timeline.

Figure 55:
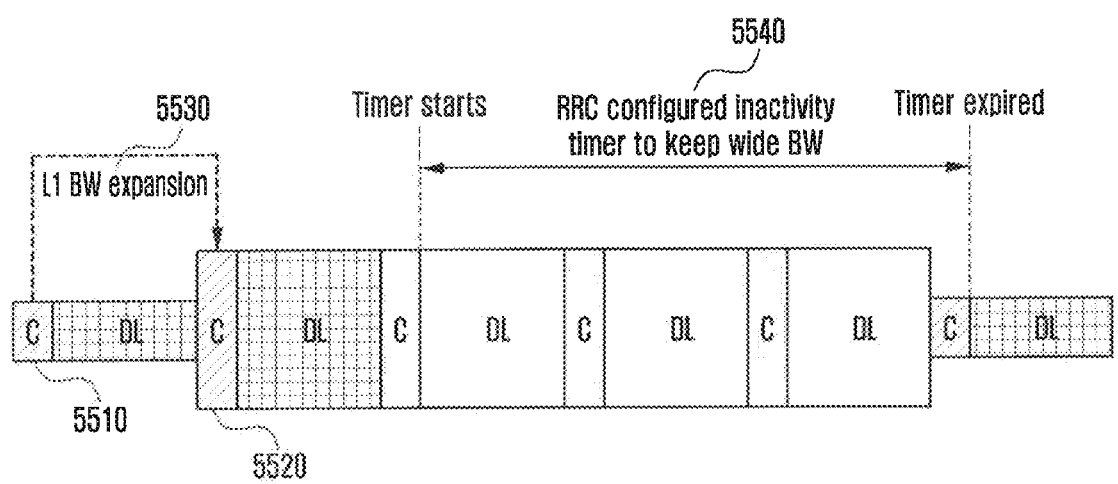
FIGS. 55 to 58 are diagrams illustrating examples of BW expansion and reduction operation by physical layer and radio resource control (RRC) control signals according to various embodiments of the disclosure.

According to the operations shown in FIGS. 54 and 55, it is possible to reduce the problem of L1 signal reception error by not using the BW reduction instruction control signal. That is, the terminal can operate in a wideband, CSB #2, only during a specific duration after the BW expansion, and then return to a narrowband, CSB #1.

Referring to FIG. 54, the base station also notifies, to the terminal, a duration 5440 for monitoring CSB #2 as well as a CSB #2 location 5420 through a BW expansion instruction control signal 5430 in CBS #1 5410.

On the other hand, the base station may configure in advance the duration information for maintaining a wideband by means of the RRC parameter instead of the L1 signal, considering the capacity and performance of the L1 signal. However, compared to case of using the L1 signal, dynamic control may be limited in case of configuring by RRC in advance. Therefore, when using the RRC parameter, a timer may be useful, like the existing DRX inactivity timer, rather than a fixed duration.

FIGS. 55 to 58 are diagrams illustrating examples of BW expansion and reduction operation by physical layer and radio resource control (RRC) control signals according to various embodiments of the disclosure.

Referring to FIG. 55, the terminal monitors CSB #2 indicated by a BW expansion instruction control signal 5530 in CBS #1 5510 and then starts an RRC configured timer 5540 because of failing to receive a DL signal from the next CSB #2 5520 subframe. If the timer expires after 3 subframes without receiving the DL signal, the terminal returns to a narrow band CSB #1 in the next subframe. The start time of the timer may be changed.

If the timer value is set to be small, the terminal may not continuously receive a base station signal due to deterioration of a channel quality even though a control signal of the base station is actually transmitted to the terminal. In this situation, there may occur a band mismatch that the base station transmits a signal in a wide band and the terminal tries to receive a signal in a narrow band. The base station may start a timer from a time when feedback of the terminal or a scheduled UL signal does not arrive or when an event of no UL signal arrival satisfies a given condition. When the timer of the base station expires, the base station transmits a base station signal through a narrow band control channel, i.e., CSB #1. In order to support this operation, the position of the on-duration for the narrow band control channel of the terminal may be predetermined. That is, the start of the operation in a wide band may depend on the L1/MAC signal, and the control channel reception operation in a narrow band may follow the DRX cycle determined based on the system time like the conventional DRX operation. When a wide band inactivity timer expires according to the inactivity of a control channel in a wide band, the terminal retunes to a narrow band and receives the control channel according to the configured DRX on-duration.

On the other hand, the interpretation of inactivity may be applied differently depending on cases.

Figure 56:
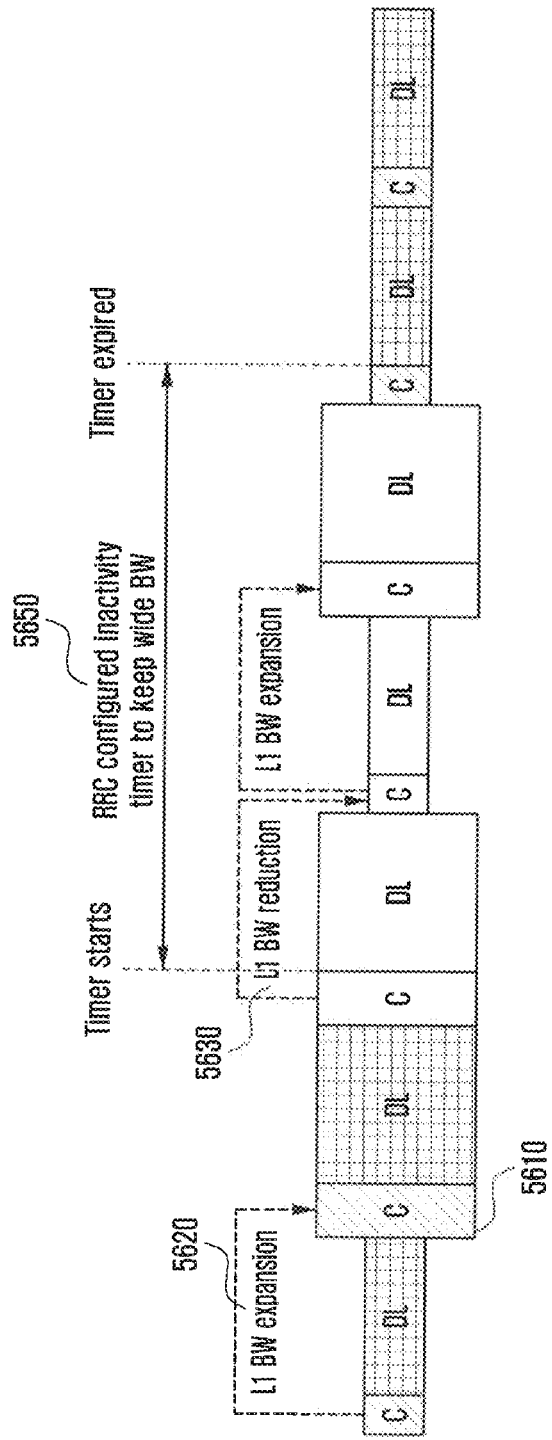

Referring to FIG. 56, the terminal switches to a wide band 5610 in response to a BW expansion indication control signal 5620 and then receives a BW reduction indication control signal 5630 of the base station in the next subframe. This is because the base station has determined that there is no more traffic to be transmitted through a wide band.

Even if the terminal monitors a narrow band CSB #1, an RRC configured inactivity timer 5650 may be maintained without expiration. That is, in a state where the terminal does not receive a DL resource allocation control signal in a wide band, i.e., CSB #2, the terminal operation of switching between a wide band and a narrow band in response to a control signal of the base station or a certain rule may affect the inactivity timer. The terminal may stop the timer only after receiving the DL resource allocation control signal through the CSB #2 in a wide band.

Figure 57:
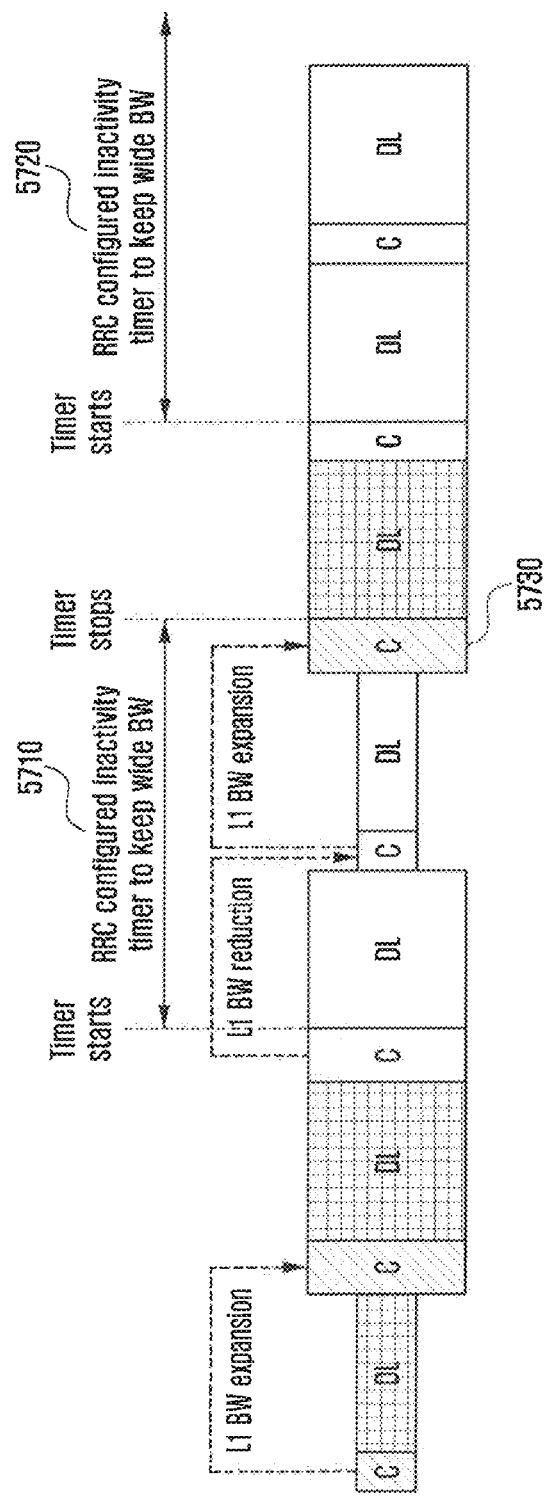

Referring to FIG. 57 illustrated is an operation in which after a timer 5710 starts, the timer expires when a base station signal is successfully received through a wide band CSB #2 5730 during the BW switching of the terminal, and a second timer 5720 starts when a DL signal is not received in the subsequent subframe.

Figure 58:
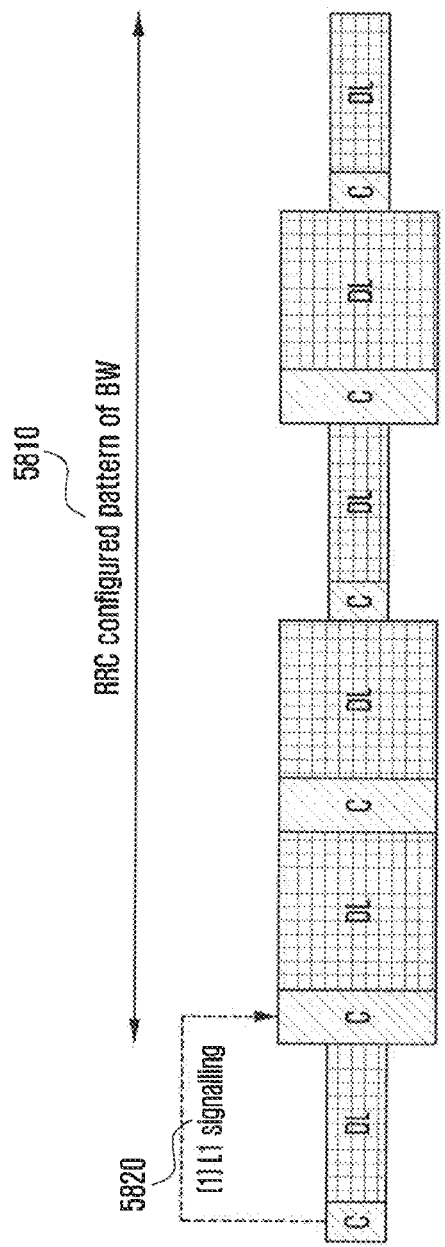

Referring to FIG. 58, in order to avoid complicated operations as shown in FIGS. 56 and 57, according to an embodiment, the base station may configure a pattern 5810 of switching between a wide band and a narrow band through RRC after the wide band switching of the terminal. The base station may instruct the terminal on the first narrow band switching through the L1 control signal 5820 or the RRC signal as in other embodiments. When controlling with RRC, the position should be determined based on SFN and subframe. If the BW switching is not urgent, the L1 control signal may be replaced with MAC command elements (CEs). In this case, the MAC CE should include absolute position information instead of relative interval information.

The pattern of BW switching may be configured as an absolute position with respect to the SFN and the subframe or as a position relative to the position specified with the L1 control signal. Also, a subframe in which a pattern is valid may be limited to a subframe corresponding to DRX on-duration or a subframe before a DRX cycle timer expires. In addition, through the MAC CE, the base station may instruct the terminal to switch to which BW.

When the base station instructs the BW switching operation using a physical layer signal or an RRC control signal, the setup by an L1 control signal may take priority over the setup by an RRC control signal for dynamic setup. However, considering a case where a stable terminal operation is difficult due to a plurality of L1 control signals, the setup by an RRC control signal always precedes the setup by an L1 control signal in a subframe of a predetermined position (period, offset).

Meanwhile, independent of the BW control operation by a physical layer signal, the C-DRX of LTE, i.e., the connected DRX operation, can be modified to be associated with the BW control. A method using C-DRX may operate alone or may be operated together with the operation of controlling the BW through a physical layer signal. Specific details are described in below with reference to FIG. 59.

Figure 59:
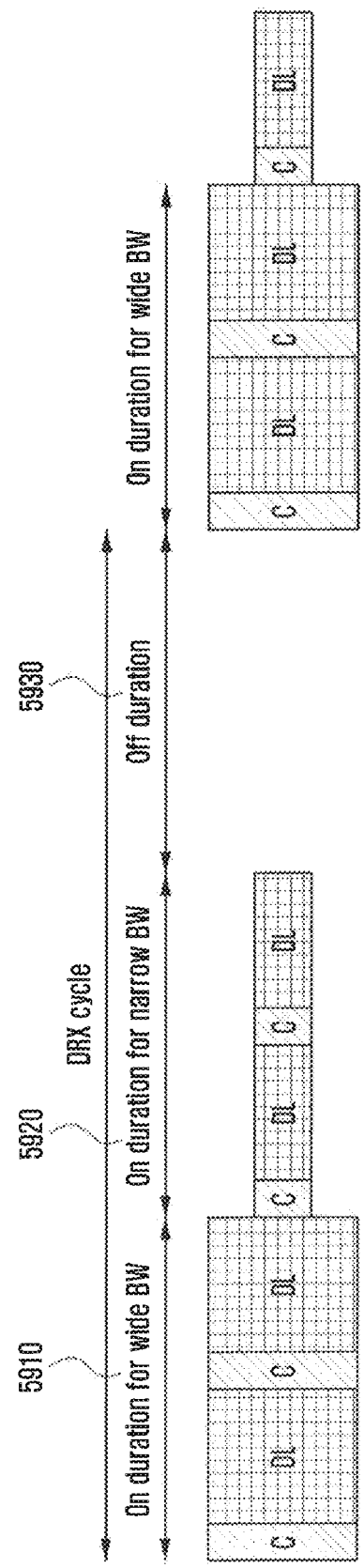
FIGS. 59 and 60 are diagrams illustrating examples of connected mode discontinuous reception (C-DRX) operation for adaptive BW according to various embodiments of the disclosure.
Figure 60:
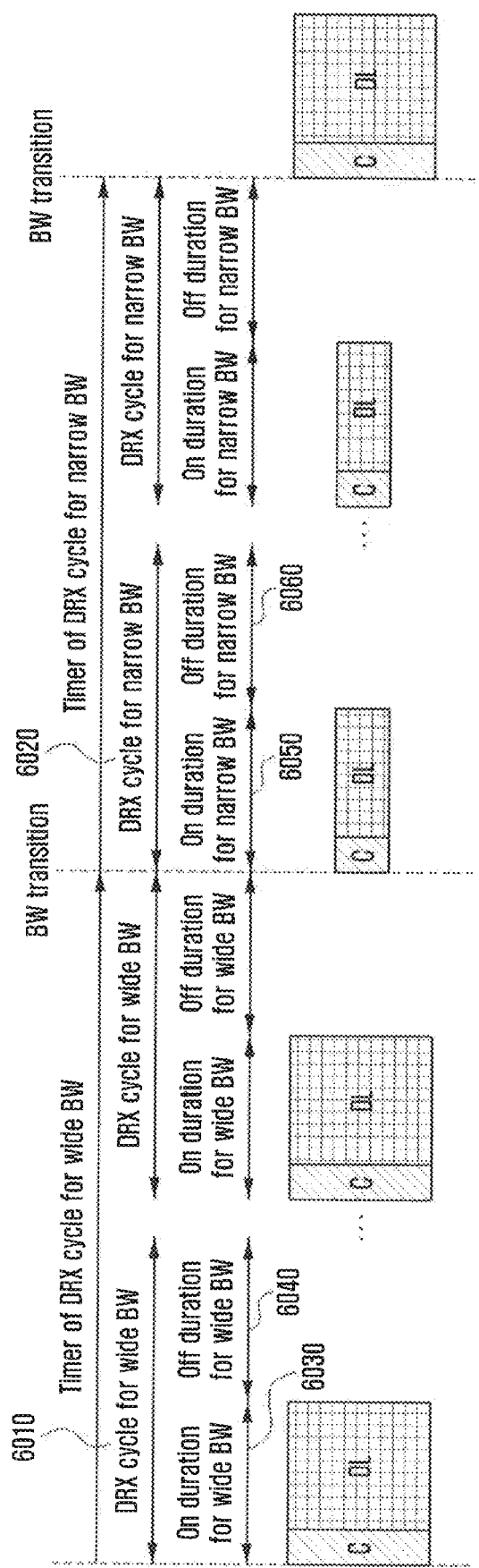

FIGS. 59 and 60 are diagrams illustrating examples of connected mode DRX (C-DRX) operation for adaptive BW according to various embodiments of the disclosure.

According to the LTE DRX configuration, one DRX cycle is divided into an on-duration and an off-duration. Similarly, referring to FIG. 59, the base station may divide one DRX cycle into a wide band on-duration 5910, a narrow band on-duration 5920, and an off-duration 5930. For this scheme, the base station only needs to notify the terminal about additional on-duration information for each band in the DRX configuration information. However, if there are variety of gradually reduced sizes of bands, it may take a considerable time for the terminal to transition to the complete off-state.

Referring to FIG. 60, according to another embodiment, the terminal may operate in a band-specific DRX cycle in which durations for monitoring a wide band and a narrow band may be configured differently in time. This is similar to an operation in LTE C-DRX of switching to the long DRX cycle when a certain number of cycles are required in the short DRX cycle. Therefore, the base station may configure information per DRX cycle (DRX cycle, on-duration, DRX cycle timer, etc.) 6010 to 6060 according to bands to be switched, and a band switching rule may be included in the C-DRX configuration. For example, this may be represented in the order of Band #1, Band #2, Band #3, and the like or the order of CSB #1, CSB #2, CSB #3, and the like.

Alternatively, according to an embodiment, the order of band switching may be entrusted entirely to the physical layer. In this case, the terminal operates with a common DRX cycle and a DRX cycle timer, and BW and CSB are determined according to the L1 control signal. The terminal may inquire about the BW to be changed to L1 before one DRX cycle timer expires.

Alternatively, in the RRC connection setup or RRC connection reestablishment process, the terminal may request the L1 to set a plurality of BWs (CSBs) and their order. The terminal switches the BW (CSB) according to the order as one DRX cycle timer expires or the DRX cycle ends. If the terminal expands the BW again according to a BW reconfiguration control signal of the base station or according to a condition preconfigured in the terminal, the BW (CSB) is switched again from the expanded BW in the order. When the DRX cycle or the DRX cycle timer for the minimum BW (CSB) expires after all BWs (CSBs) have been switched, the terminal a) switches to the long DRX while maintaining the minimum BW (CSB), b) switches to the long DRX by switching to BW (CSB) for separately configured long DRX, or c) switches to the idle DRX.

On the other hand, without introducing a new C-DRX configuration, it is possible to maintain the existing LTE C-DRX configuration and operation and to control the BW change operation with additional L1 setup. According to an embodiment, the C-DRX configuration to be controlled by the RRC is the same, but the base station may configure information (BW, SRB, number of subframes, etc.) for BW switching in the on-duration by using the L1 signal. According to another embodiment, the base station may configure information (BW, SRB, etc.) for BW switching, which is reduced each time a short DRX cycle is encountered, by using the L1 signal. According to still another embodiment, the base station may configure the BW connected to the short DRX cycle and the BW connected to the long DRX cycle by using the L1 signal.

The modified operation of the C-DRX assumes that there are different parameters for BWs in one DRX configuration. On the other hand, different DRX configurations for BWs may be possible for more free DRX configuration. In this case, the terminal should operate while reviewing a plurality of DRX configurations at the same time, and it is necessary to determine which DRX configuration has a priority according to a predetermined rule in order to prevent confusion of operation according to a plurality of DRX configurations.

Figure 61:
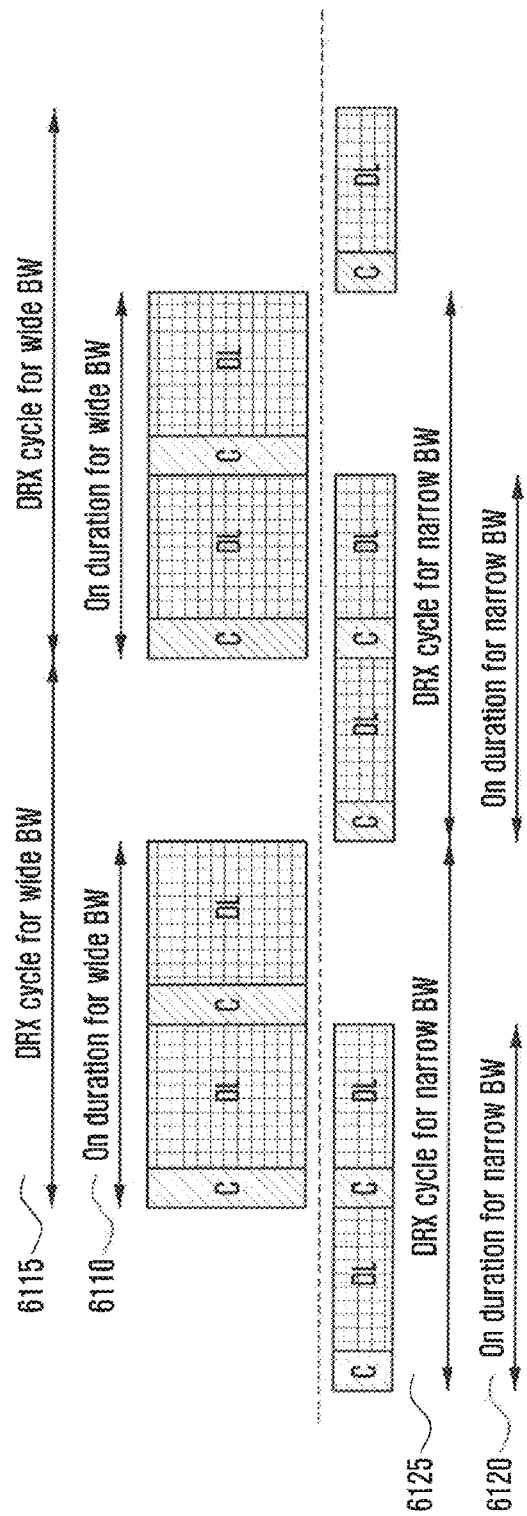
FIG. 61 is a diagram illustrating an example of discontinuous reception (DRX) setup for a wide band and a narrow band according to an embodiment of the disclosure.

FIG. 61 is a diagram illustrating an example of DRX setup for a wide band and a narrow band according to an embodiment of the disclosure.

Referring to FIG. 61, illustrated is a state where wide band DRXs 6110 and 6115 and narrow band DRXs 6120 and 6125 are configured, respectively. The terminal receives the DRX configurations for two bands and has to follow one of two DRX configurations for a subframe in which a conflict operation occurs. If power consumption is emphasized, the terminal may prefer narrow band DRX configuration rather than wide band DRX configuration.

Figure 62:
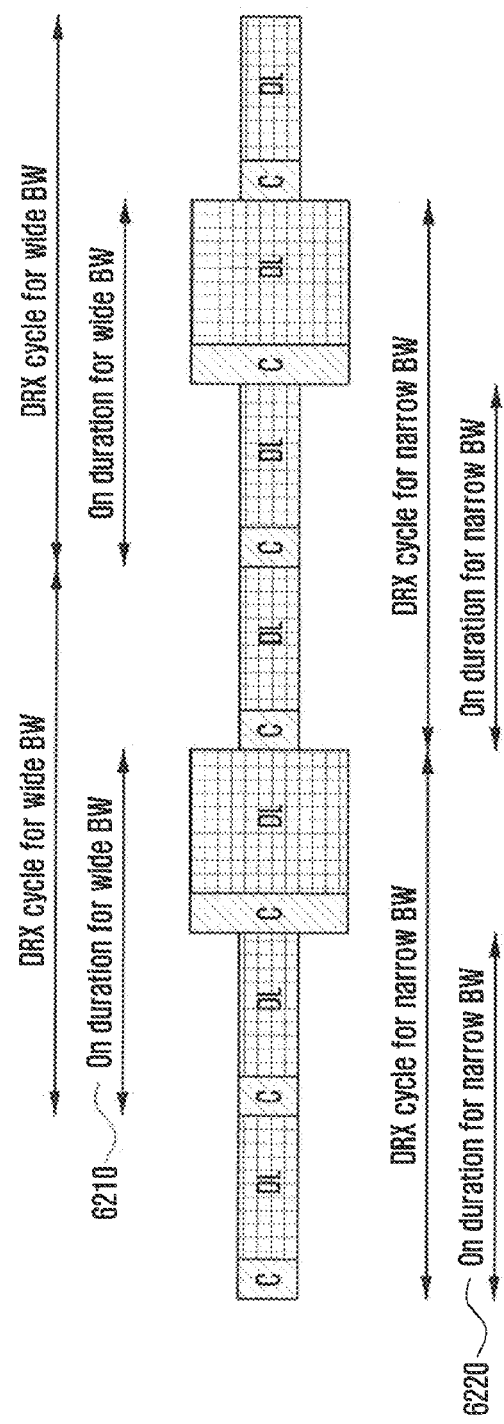
FIGS. 62 and 63 are diagrams illustrating examples of DRX setup and a priority rule for a wide band and a narrow band according to various embodiments of the disclosure.
Figure 63:
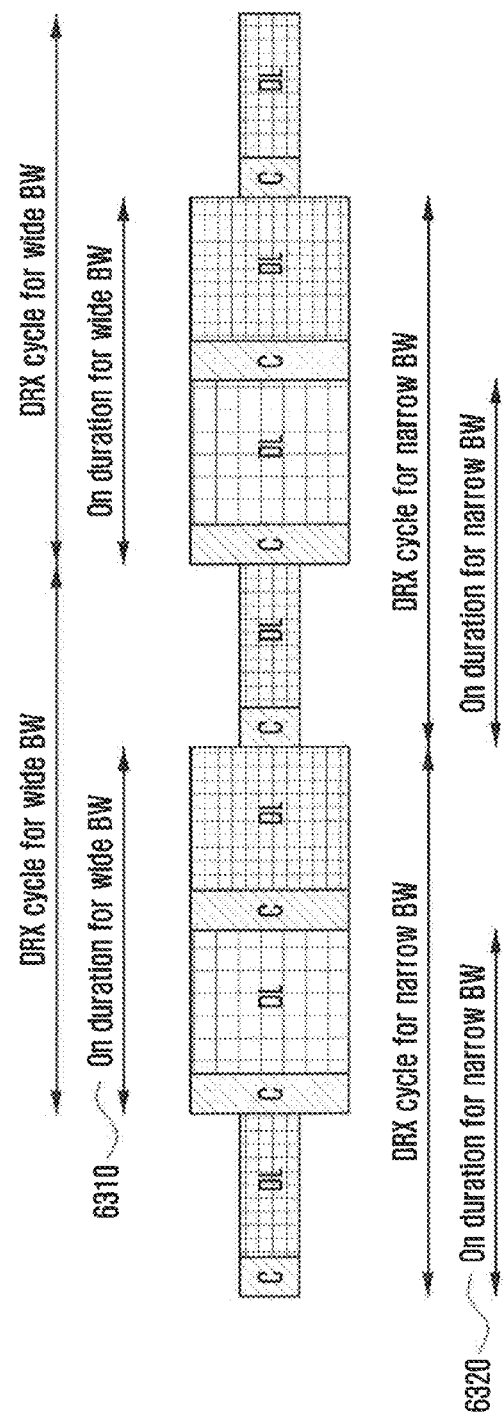

FIGS. 62 and 63 are diagrams illustrating examples of DRX setup and a priority rule for a wide band and a narrow band according to various embodiments of the disclosure.

Referring to FIG. 62, illustrated is an operation in which when a wide band on-duration 6210 and a narrow band on-duration 6220 are both configured in one subframe, the terminal follows the narrow band on-duration configuration 6210 and monitors a DL signal by configuring a narrow band CSB #1.

Referring to FIG. 63, on the other hand, in case where the data transmission amount is more important, FIG. 63 shows an operation in which when a wide band on-duration 6310 and a narrow band on-duration 6320 are both configured in one subframe, the terminal follows the wide band on-duration configuration 6310 and monitors a DL signal by switching to a wide band CSB #2. In order to support different configurations as shown in FIGS. 62 and 63, the base station may further configure priority information between DRXs for bands to the terminal through RRC.

If a DL signal is not received in the DRX configuration for each band and its operation, the terminal starts an inactivity timer. If the inactivity timer for each band is set, the terminal a) may start the inactivity timer for a corresponding band when the DL signal corresponding to the band is not received, or b) may start the inactivity timer for each band when the DL signal corresponding to the band is not received.

If the inactivity timer is set to a single value regardless of band, a condition for determining the DRX inactivity may be determined as at least one of the following: 1) to start the inactivity timer only when no DL signal is received in all bands (all configured CSBs), or 2) to start the inactivity timer only when the DL signal corresponding to the band (CSB) selected by the priority is not received.

In the disclosure, the type of a DL signal to be monitored in relation to the DRX operation is determined in the standard or can be configured by the base station. If a DL signal, to be not monitored in relation to the DRX operation, is received, it may be regarded that the DL signal is not received in the DRX operation.

In the BW adaptation and power saving procedures proposed in the disclosure, configuration of associating one or more bands configured for scheduling with the DRX procedure is further required.

Depending on various embodiments proposed, the configuration scheme associated with the DRX procedure may be varied. Respective embodiments are largely classified as follows, and the DRX procedure association configuration may be varied depending on such classification.

A. In case where the timing when the terminal switches from band 1 to band 2 depends on the L1/MAC signal of the base station, and the timing when switching from band 2 to band 1 also follows the L1/MAC signal of the base station:

Since the band ID is included in the L1/MAC signal, there is no connection with a separate DRX configuration. That is, the DRX operates in common regardless of the band. However, when a reception error of the L1/MAC signal of the base station occurs, the base station may configure a specific band (e.g., band 1) for the fallback operation. At this time, the base station may include the fallback band in the DRX configuration.

B. In case where the timing when the terminal switches from band 1 to band 2 depends on the L1/MAC signal of the base station, and the timing when switching from band 2 to band 1 follows the inactivity timer:

When the terminal switches from band 1 to band 2, there is no need to configure band 2 associated with the DRX. However, when switching from band 2 to band 1, the base station configures the DRX to be operated in band 1 because it follows the timer. The terminal should follow the inactivity timer of band 2 after switching to band 2, and may be configured by the base station to be operated according to one of 1) using the inactivity timer of the DRX in common, 2) using the inactivity timer configured separately for band 2, 3) using the inactivity timer of the DRX with a scale value, or 4) using the inactivity timer configured separately for band 1 with a scale value. The scale value may be indicated by a DRX configuration or a separate configuration.

C. In case where the switching from band 1 to band 2 depends on the L1/MAC signal of the base station (but the control channel reception timing is configured separately), and the switching from band 2 to band 1 also depends on the L1/MAC signal of the base station (but the control channel reception timing is configured separately):

In this case, the DRX cycle and on-duration common to bands or for each band should be configured. In case of being common to bands, no separate band configuration is required for DRX configuration. If the DRX is configured for each band, configuration is performed by at least one of methods for 1) matching the DRX configuration with the number of bands and indicating a band in each DRX configuration, 2) setting one DRX configuration and indicating bands for operations of on-duration and off-duration included in the DRX configuration, 3) setting one DRX configuration and indicating a band for each of the short DRX cycle and the long DRX cycle included in the DRX configuration, or 4) setting one DRX configuration and indicating a band for each of the on-duration, the short DRX cycle, and the long DRX cycle included in the DRX configuration.

In the setup and procedure proposed in the disclosure, the Layer 2 of the terminal may not need to know the actual position and size of a band. That is, the physical information of a band is not visible at the Layer 2, but the logical position and size can be set. The Layer 2 may construct a control channel or transport channel, based on logical band position/size information. Also, the terminal may manage BW information in a list for DRX operation and display it by index.

In examples proposed in the disclosure, it has been assumed that most terminals cannot simultaneously monitor narrow band and wide band BWs. However, depending on the capability of the terminal, narrow band and wide band BWs can be monitored at the same time in some cases.

Meanwhile, the BW provided through the L1 signal and the maximum BW of the terminal according to the terminal capability may be different. Accordingly, when a plurality of BW-specific DRX configurations are received, the terminal may operate simultaneously in the on-duration of one or more BW-specific DRX configurations within the maximum BW of the terminal capability. The on-duration of the DRX configuration exceeding the maximum BW of the terminal capability is excluded from monitoring. For this operation, the priority of the BW-specific DRX configuration may be configured to the terminal by the base station.

Figure 64:
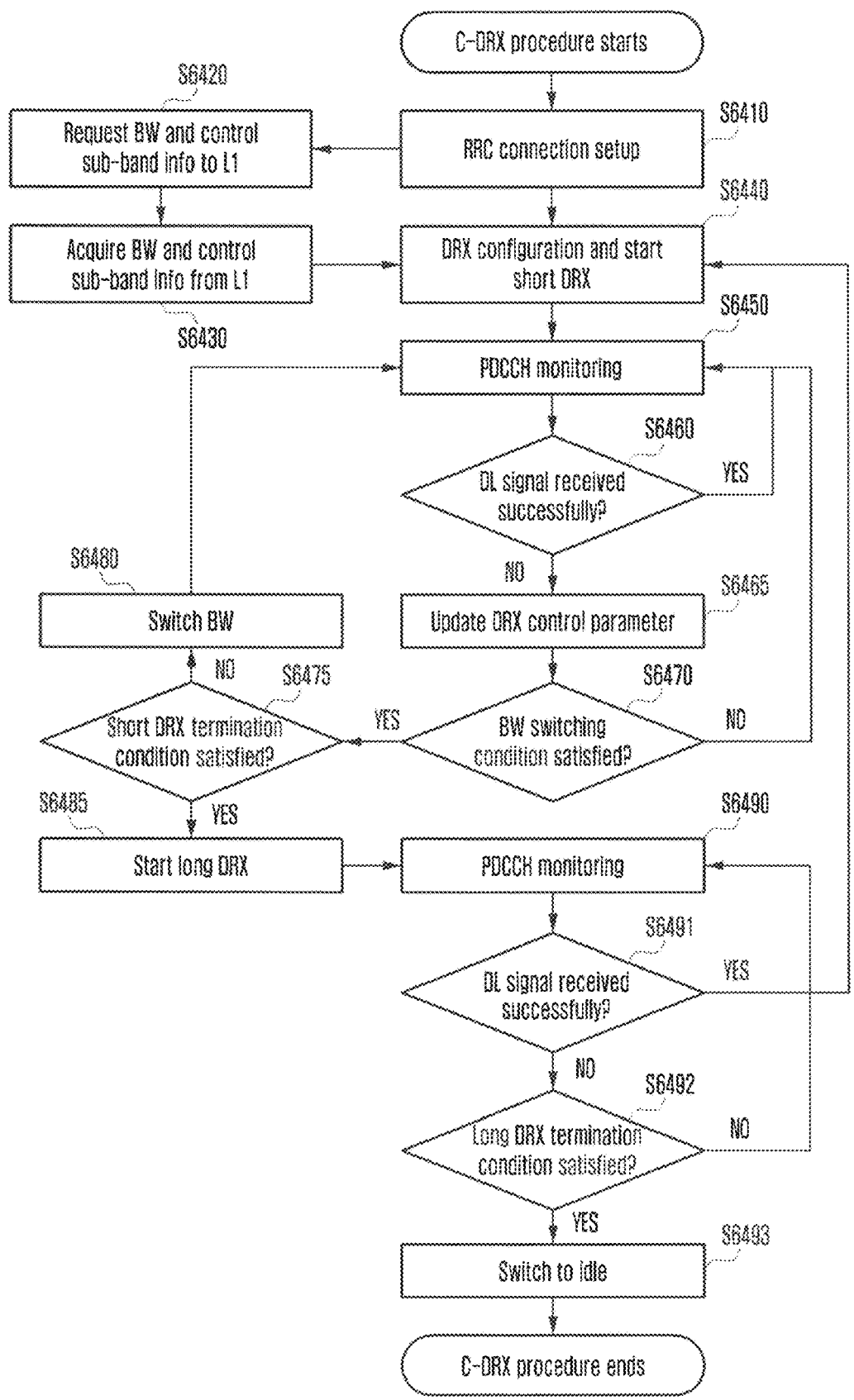
FIG. 64 is a flow diagram illustrating an operation of a terminal according to an embodiment of the disclosure.

FIG. 64 is a flow diagram illustrating an operation of a terminal according to an embodiment of the disclosure.

Referring to FIG. 64, during the RRC connection setup procedure S6410, the terminal requests and acquires information about the position of an operation BW or control sub-band (CSB) from the physical layer at operations S6420 and S6430.

At operation S6440, based on the acquired information, or by reporting the acquired information to the base station, the terminal receives DRX configuration per BW or configuration for parameters per BW in DRX from the base station.

When the connection is completed, the terminal starts an operation for short DRX in C-DRX. The terminal performs PDCCH monitoring for each subframe to receive a control signal of the base station at operation S6450. Then, at operation S6460, the terminal determines whether the reception of a DL signal is successful.

If the reception of a DL signal is successful, the terminal continuously performs PDCCH monitoring. In a certain scenario, there may be cases in which, despite successful PDCCH monitoring, another BW or CSB is monitored under L1 control or RRC control.

If a DL signal is not received as a result of the PDCCH monitoring, the terminal updates the DRX parameters such as the inactivity timer and the DRX cycle timer at operation S6465. If the BW switching is required since a condition of the inactivity timer or the BW switching timer is satisfied at operation 6470, the terminal checks at operation S6475 whether it meets a short DRX termination condition. This condition corresponds, for example, a case where the PDCCH monitoring fails at the minimum BW and thus there is no further BW to be reduced or a case where the short DRX cycle timer expires.

If the short DRX termination condition is not satisfied at operation 6470, the terminal decreases the BW at operation S6480 and resumes the short DRX operation.

If the short DRX termination condition is satisfied, the terminal starts the long DRX at operation S6485. The long DRX operation is performed at the minimum or configured BW, and is similar generally to the LTE long DRX operation. The terminal monitors the PDCCH according to the long DRX at operation S6490. If a DL signal is not successfully received at operation S6491, the terminal determines at operation S6492 whether the long DRX termination condition is satisfied. If the long DRX termination condition is satisfied, the terminal switches to the idle mode at operation S6493.

Method for separately setting a condition for determining inactivity in wideBWP:

The BW adaptation or switching operation of the disclosure is different from the SCell addition/release in the existing CA, as follows. In the CA, the PCell is always activated, and the terminal monitors the PCell. However, in case of BW switching, the terminal should transmit and receive control signals such as an RRC signal and MAC CE to and from the base station, even though moving in any band. Therefore, even if the terminal switches from one band (band 1) to another band (band 2) and there is no data traffic in band 2, the terminal can receive the RRC/MAC control signal of the base station. However, receiving the RRC/MAC control signal of the base station in band 2, which is a narrow band, affects the power consumption of the terminal Therefore, when determining the inactivity in the band 2, the terminal may operate by 1) not reflecting the control channel activity for transmitting only the RRC/MAC control signal of the base station in the inactivity timer operation, 2) reflecting only the scheduling assignment below certain physical resource block (PRB) in the inactivity timer operation, 3) reflecting in the inactivity timer operation when a base station signal of a certain number of times (or a certain amount of transmission) is received within a certain duration, 4) reflecting in the inactivity timer operation only for a specific DCI format, or 5) determining whether to reflect in the inactivity timer operation through a separate instruction of the base station.

Dual timer setup:

Described above is the timer operation for switching from a wide band to a narrow band. Switching from a narrow band to a wide band may be indicated by the DCI/MAC signal of the base station. However, when an error occurs in reception of the DCI/MAC signal, the terminal should switch from a wide band to a narrow band for a fallback. However, the base station may set a timer value differently because the requirements of two cases may be different. That is, when the DCI/MAC signal for switching from a narrow band to a wide band is received during monitoring, the terminal starts timer #1. If the terminal does not receive a base station signal in the wide band until the expiration of the timer #1 while performing the band switching operation, the terminal returns to a narrow band.

On the other hand, the terminal that succeeds in receiving a base station signal in a wide band and then does not receive a base station signal after the end of the on-duration starts timer #2. When the timer #2 expires, the terminal switches to a narrow band. In general, it is advantageous that the value of timer #1 is shorter than the value of timer #2 because of fast fallback in case of error.

Figure 65:
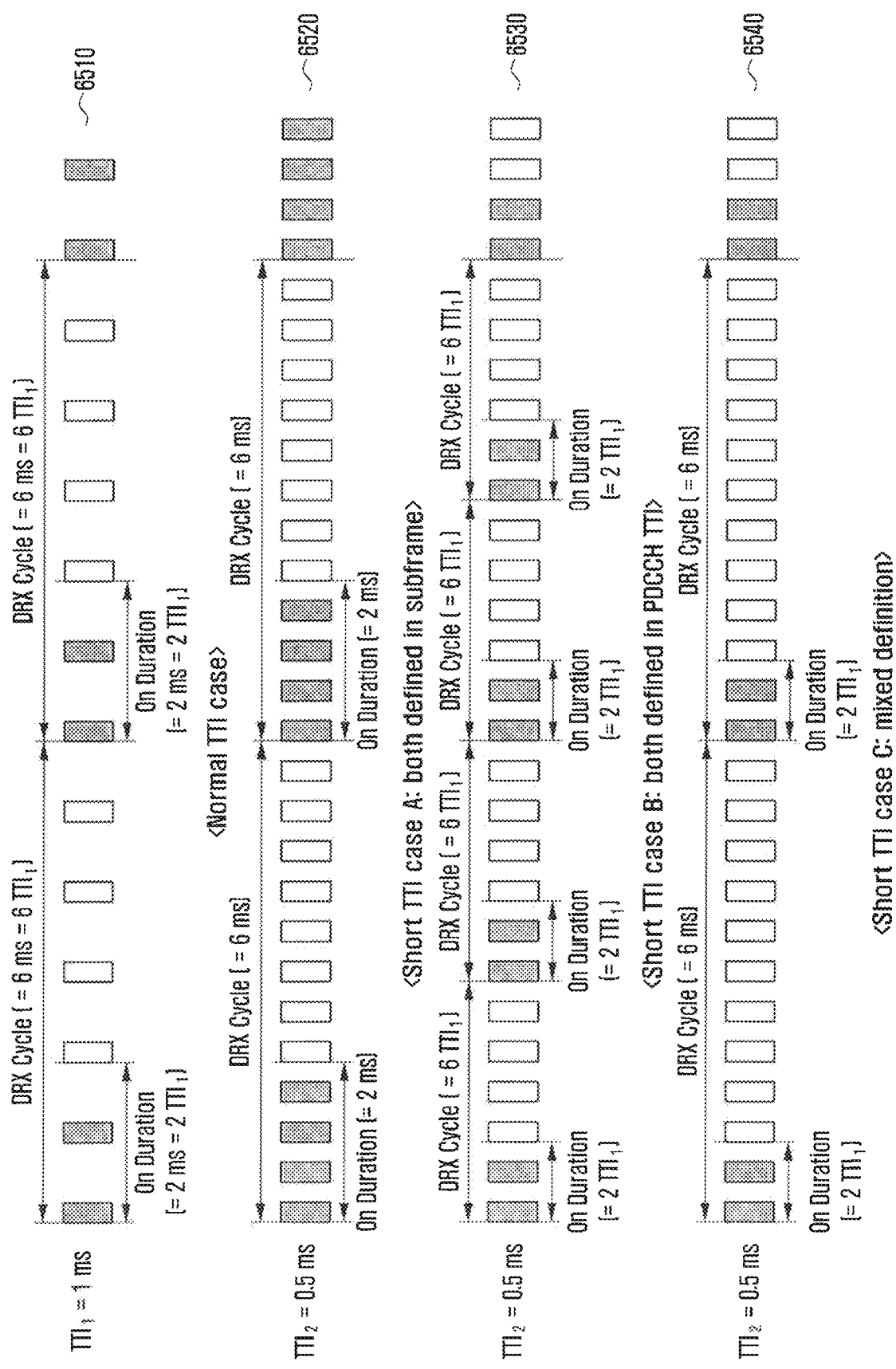
FIG. 65 shows a DRX operation for a transmit time interval (TTI) change according to an embodiment of the disclosure.

FIG. 65 shows a DRX operation for a TTI change according to an embodiment of the disclosure.

Referring to FIG. 65, a transmit time interval (TTI) refers to a time required to transmit one or more transport blocks (TBs) and is often used as a basic time unit for performing scheduling and HARQ operations in the MAC. The terminal receives TTI information in advance in the initial access procedure or receives default TTI and BW information through the SI.

For example, a normal TTI having a length of 1 ms may be set as a basic TTI. Further, during the random access procedure or after the completion of the RRC connection setup, the terminal may receive additional TTI and BW information through the RRC message. For example, the additional TTI may be set to a short TTI of 0.5 ms in length.

Parameters for expressing the DRX operation in LTE are represented in units of subframes. Referring to a normal TTI case 6510 of FIG. 65, it can be seen that the on-duration is represented by 2 ms and the DRX cycle is represented by 6 ms.

When the same DRX parameter expression scheme as LTE is directly imported to 5G, the TTI is set to the short TTI as shown in short TTI case A 6520, and the terminal monitors PDCCH during the on-duration of 2 ms within the same DRX cycle (6 ms). While in the normal TTI case the number of PDCCH monitoring is twice in the same on-duration (2 ms), in the short TTI case A the TTI length is reduced to half and thus the number of PDCCH monitoring increases to four times. However, the power consumption of the terminal may be increased because the same PDCCH monitoring opportunity is not maintained.

In short TTI case B 6530, the on-duration is reduced from 2 ms to 1 ms according to the reduced TTI, and the number of PDCCH monitoring is also reduced to twice within one on-duration. However, because the DRX cycle is also reduced from 6 ms to 3 ms according to the reduced TTI, four PDCCH monitoring times are still set for the same time as the normal TTI case. Therefore, the power consumption of the terminal is unvaried between the short TTI case A 6520 and the short TTI case B 6530.

Therefore, the disclosure proposes the following method. That is, among the DRX parameters, timers (on-duration, inactivity timer, etc.) related to PDCCH monitoring are represented by TTI, and other parameters are represented by subframe.

Referring to short TTI case C 6540, the on-duration is reduced from 2 ms to 1 ms in comparison with the normal TTI, and the number of PDCCH monitoring is also maintained as twice in one on-duration. In addition, the number of PDCCH monitoring is kept twice in comparison with the normal TTI within DRX cycle 6 ms. In detail, on-duration, inactivity timer, ULRetransmissionTimer, StartOffset, and the like can be represented by TTI, whereas DRX cycle, shortCycleTimer, and the like can be represented by a subframe.

The TTI length may be set by means of SI or RRC, but additional TTI or PDCCH resource settings may be performed in the physical layer L1 for convenience of dynamic scheduling. However, if the TTI length dynamically changes according to the additional TTI/PDCCH resource setting, a delay may occur in recalculating the timer on the L2 layer. This delay may cause a problem when a scheduling/HARQ operation occurs in a short TTI. Therefore, the disclosure proposes a method of not including the TTI dynamically changed according to the L1 signal into the MAC timer calculation. According to an embodiment, the variation within the specific time length set through the RRC is not included in the MAC timer calculation, and the variation longer than the specific time length may be included in the MAC timer calculation.

According to an embodiment, the base station may set an RRC message to the terminal to define which length of TTI for a specific timer. For example, the on-duration may be set to a shortest TTI (0.25 ms), the inactivity timer may be set to a shorter TTI (0.5 ms), and the DRX cycle may be set to a normal TTI (1.0 ms). Also, some parameters may be pre-specified in the standard. For example, the on-duration may depend on the length of a mini-slot set in L1, and the DRX cycle may be specified to follow the length of a slot set in L1.

According to an embodiment, some of the parameters required for the DRX procedure may be fixed in time units, while others may be set to change time units according to numerology. The base station may fix the DRX cycle, shortCycleTimer, etc. in units of subframes. The on-duration, inactivity timer, ULRetransmissionTimer, and StartOffset may be expressed in units of [slot, mini-slot], and which unit will be used may be determined depending on any combination of a control channel, band, index in DCI, and TTI which are set by the base station. For example, if the terminal receives a control channel in band 1 for eMBB, the on-duration value 4 is regarded as 4 slots, and if the terminal receives a control channel in band 2 for URLLC, the same on-duration value 4 is understood as 4 mini-slots.

Figure 66:
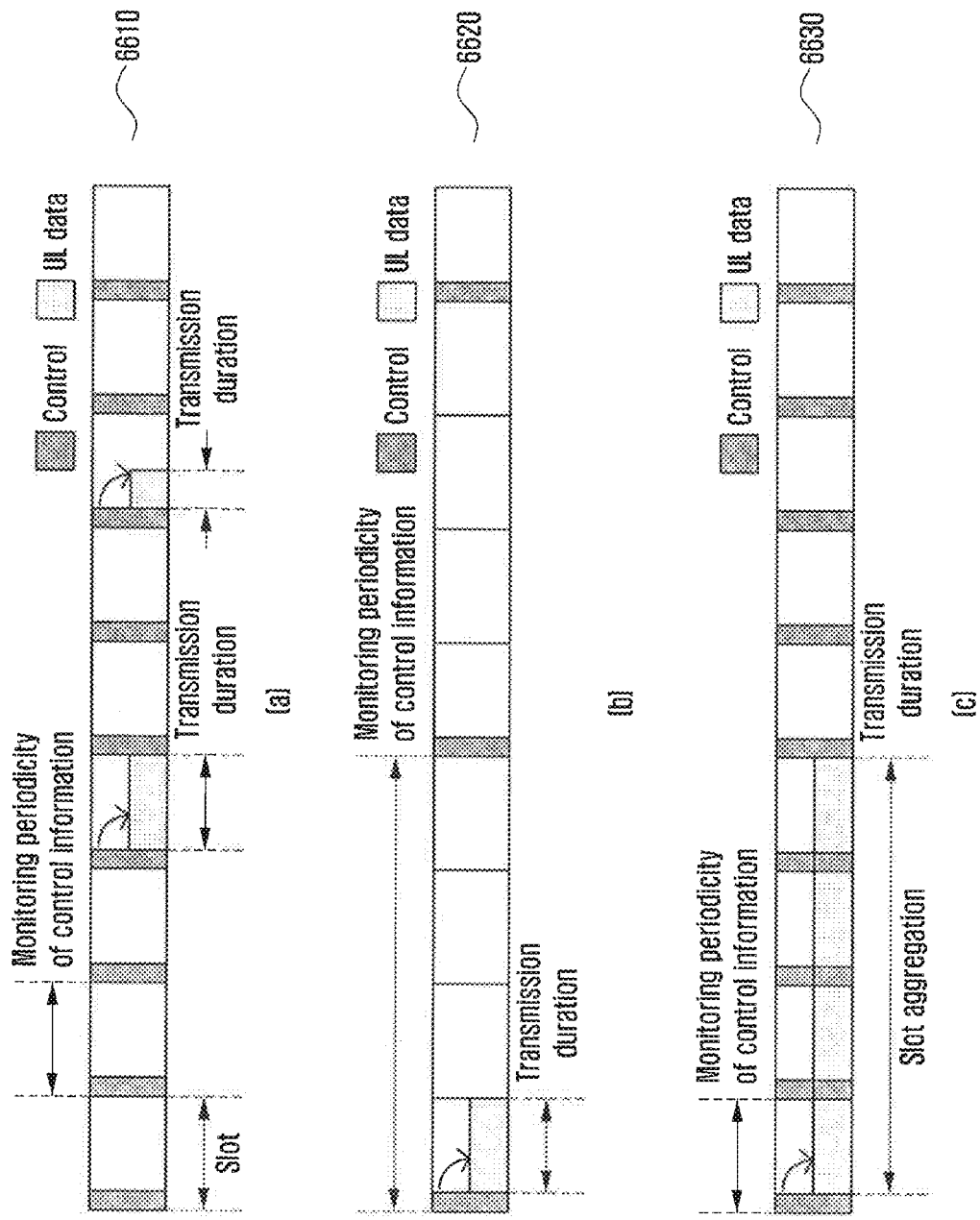
FIG. 66 is a diagram illustrating an example of determining a TTI value based on to a control channel monitoring periodicity and a transmission duration according to an embodiment of the disclosure.

FIG. 66 is a diagram illustrating an example of determining a TTI value based on to a control channel monitoring periodicity and a transmission duration according to an embodiment of the disclosure.

Referring to FIG. 66, according to the control channel monitoring periodicity and the transmission duration, the values of TTI may be determined differently depending on the situation.

In cases (a) and (b) 6610 and 6620 in FIG. 66, a data channel is allocated only within a control channel observation period, so that the transmission period of scheduling is equal to the control channel observation period. Therefore, the TTI is equal to the control channel observation period. However, in case (c) 6630 of FIG. 66, the transmission duration is indicated to be longer than the control channel observation period, so that the transmission period of scheduling is ambiguous.

This may be varied depending on the control of the base station. If the base station instructs the terminal on a transmission block having a transmission duration longer than the control channel observation period so as not to observe overlapped control channels, the TTI is equal to the indicated transmission duration. However, if the base station instructs the terminal to observe the control channel observation period even during the transmission duration, the base station may schedule the terminal every control channel observation period. Therefore, in this case, the TTI is the same as the control channel observation period.

Detailed embodiments regarding an operation of switching bands on the basis of a timer as shown in FIGS. 54, 55, 56 and 60 will be described below. This timer may be a new timer such as a band switching timer or a band validity timer, or may be an existing timer such as a drx inactivity timer or a DRX short cycle timer.

Figure 67:
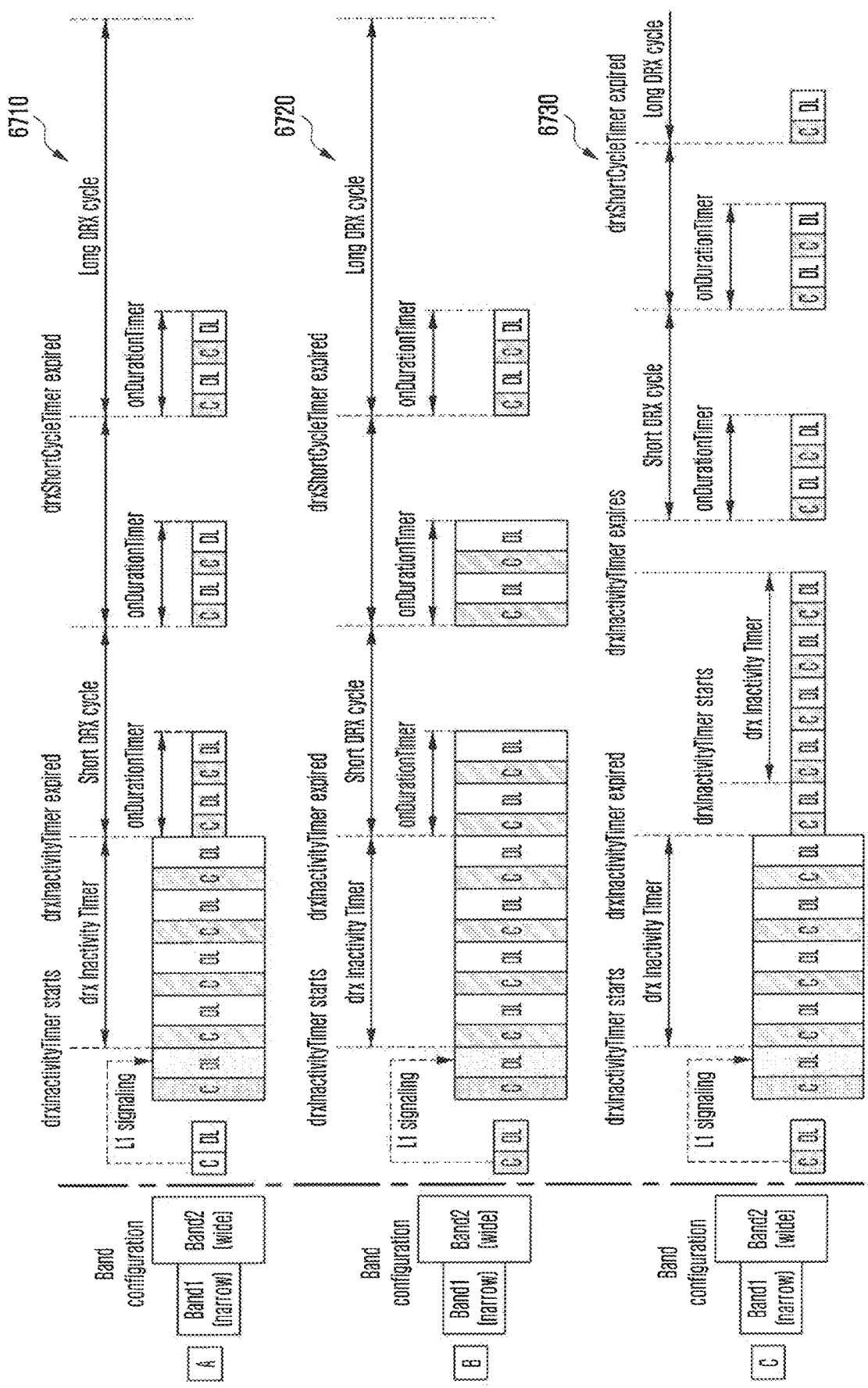
FIGS. 67 to 71 are diagrams illustrating a timer-based band switching operation according to various embodiments of the disclosure.

FIG. 67 is a diagram illustrating a timer-based band switching operation according to various embodiments of the disclosure.

Embodiment 4-1

Referring to FIG. 67, the embodiment 4-1 shows an operation procedure that supports case A 6710.

A MAC entity may be configured to have a DRX function for controlling the PDCCH monitoring of the UE by the RRC. If the DRX is configured when the UE is in the RRC_CONNECTED state, the MAC entity may discontinuously monitor the PDCCH according to the described DRX operation. When using the DRX operation, the MAC entity should monitor the PDCCH by using a specific band at a specific time according to the specific requirements. At least one of the following parameters is configured for the DRX operation: drx_BandIndex, onDurationTimer, drx-InactivityTimer, drx-RetransmissionTimer, drx-ULRetransmissionTimer, longDRX-Cycle, drxStartOffset, drxShortCycleTimer, shortDRX-Cycle.

The drx_BandIndex related to the band may be included in the DRX configuration or may be defined with an index of the band configured as a default band or a primary band in the band configuration included in the RRC Connection (re-)Configuration procedure without being included in the DRX configuration.

For example, it may be indicated as drx_BandIndex=defaultBandIndex, or drx_BandIndex=primaryBandIndex.

If the DRX cycle is configured, the MAC entity of the UE operates in active time in case of the follows:
 when at least one of onDurationTimer, drx-InactivityTimer, drx-RetransmissionTimer, drx-ULRetransmissionTimer, and mac-ContentionResolutionTimer is running,
 when scheduling request (SR) is sent to PUCCH and pending,
 when a UL grant for unsent HARQ retransmission can occur, and
 when a control signal is generated for the first transmission on the PDCCH after receiving the RAR.

If the DRX is configured, the MAC entity of the UE performs the followings in every subframe (or slot, symbol, or time unit set by RRC).
 When DRX Command MAC CE or Long DRX Command MAC CE is received,
  stop onDurationTimer and drx-Inactivity Timer.

When the drx-Inactivity Timer expires or the DRX Command MAC CE is received,
if the short DRX cycle is configured, (re)start the drxShortCycleTimer and use the short DRX cycle.
if the short DRX cycle is not configured, use the long DRX cycle.
When the drxShortCycleTimer expires, use the long DRX cycle.
When the drxShortCycleTimer has not expired and when the Long DRX Command MAC CE is received,
stop the drxShortCycleTimer and use the long DRX cycle.
When the UE is using the short DRX cycle and satisfies the following equation according to current SFN and subframe values, start the onDurationTimer.

[($SFN$*10)+subframe number]modulo(shortDRX-Cycle)=(drxStartOffset)modulo(shortDRX-Cycle).

When the UE is using the long DRX cycle and satisfies the following equation according to current SFN and subframe values, start the onDurationTimer.

[($SFN$*10)+subframe number]modulo(longDRX-Cycle)=drxStartOffset.

The MAC entity of the UE monitors the PDCCH in a subframe (or slot, symbol, or time unit set by RRC) in which the PDCCH is present in Active Time, and in a band indicated by the drx_BandIndex. If the PDCCH indicates DL transmission in this subframe, or if a DL assignment is set in this subframe, the UE starts the HARQ RTT timer for the corresponding HARQ process and stops the drx-RetransmissionTimer for the same HARQ process.

If the PDCCH indicates UL transmission in this subframe, or if an UL grant is set in this subframe, the UE starts the UL HARQ RTT timer for the HARQ process of the subframe including the last retransmission of corresponding PUSCH transmission. Also, the UE stops the DRX_ULRetransmissionTimer for the same HARQ process.

If the PDCCH indicates a new transmission, the UE (re)starts the drx-InactivityTimer.

Embodiment 4-2

The embodiment 4-2 shows an operation procedure that supports case B 6720 in FIG. 67.

A MAC entity may be configured to have a DRX function for controlling the PDCCH monitoring of the UE by the RRC. If the DRX is configured when the UE is in the RRC_CONNECTED state, the MAC entity may discontinuously monitor the PDCCH according to the described DRX operation. When using the DRX operation, the MAC entity should monitor the PDCCH by using a specific band at a specific time according to the specific requirements. At least one of the following parameters is configured for the DRX operation: onDurationTimer, drx-InactivityTimer, drx-RetransmissionTimer, drx-ULRetransmissionTimer, long DRX-Cycle, drxStartOffset, drx_BandIndex_longDRX-Cycle, drxShortCycleTimer, shortDRX-Cycle.

The drx_BandIndex_longDRX-Cycle related to the band may be included in the DRX configuration or may be defined with an index of the band configured as a default band or a primary band in the band configuration included in the RRC Connection(re-)Configuration procedure without being included in the DRX configuration.

For example, it may be indicated as drx_BandIndex_longDRX-Cycle=defaultBandIndex, or drx_BandIndex_longDRX-Cycle=primaryBandIndex.

If the DRX cycle is configured, the MAC entity of the UE operates in active time in case of the follows:
when at least one of onDurationTimer, drx-InactivityTimer, drx-RetransmissionTimer, drx-ULRetransmissionTimer, and mac-ContentionResolutionTimer is running,
when scheduling request (SR) is sent to PUCCH and pending,
when a UL grant for unsent HARQ retransmission can occur, and
when a control signal is generated for the first transmission on the PDCCH after receiving the RAR.
If the DRX is configured, the MAC entity of the UE performs the followings in every subframe (or slot, symbol, or time unit set by RRC).
When DRX Command MAC CE or Long DRX Command MAC CE is received,
stop onDurationTimer and drx-Inactivity Timer.
When the drx-Inactivity Timer expires or the DRX Command MAC CE is received,
if the short DRX cycle is configured, (re)start the drxShortCycleTimer and use the short DRX cycle.
if the short DRX cycle is not configured, use the long DRX cycle.
When the drxShortCycleTimer expires, use the long DRX cycle.
When the drxShortCycleTimer has not expired and when the Long DRX Command MAC CE is received,
stop the drxShortCycleTimer and use the long DRX cycle.
When the UE is using the short DRX cycle and satisfies the following equation according to current SFN and subframe values, start the onDurationTimer.

[($SFN$*10)+subframe number]modulo(shortDRX-Cycle)=(drxStartOffset)modulo(shortDRX-Cycle).

When the UE is using the long DRX cycle and satisfies the following equation according to current SFN and subframe values, start the onDurationTimer.

[($SFN$*10)+subframe number]modulo(longDRX-Cycle)=drxStartOffset.

The MAC entity of the UE monitors the PDCCH in a subframe (or slot, symbol, or time unit set by RRC) in which the PDCCH is present in Active Time, and in a band indicated by the drx_BandIndex_longDRX-Cycle if the long DRX cycle is used. If the PDCCH indicates DL transmission in this subframe, or if a DL assignment is set in this subframe, the UE starts the HARQ RTT timer for the corresponding HARQ process and stops the drx-RetransmissionTimer for the same HARQ process.

If the PDCCH indicates UL transmission in this subframe, or if an UL grant is set in this subframe, the UE starts the UL HARQ RTT timer for the HARQ process of the subframe including the last retransmission of corresponding PUSCH transmission. Also, the UE stops the DRX_ULRetransmissionTimer for the same HARQ process.

If the PDCCH indicates a new transmission, the UE (re)starts the drx-InactivityTimer.

Embodiment 4-3

The embodiment 4-3 shows an operation procedure that supports both case A 6710 and case B 6720 in FIG. 67.

A MAC entity may be configured to have a DRX function for controlling the PDCCH monitoring of the UE by the RRC. If the DRX is configured when the UE is in the RRC_CONNECTED state, the MAC entity may discontinuously monitor the PDCCH according to the described DRX operation. When using the DRX operation, the MAC entity should monitor the PDCCH by using a specific band at a specific time according to the specific requirements. At least one of the following parameters is configured for the DRX operation: onDurationTimer, drx-InactivityTimer, drx-RetransmissionTimer, drx-ULRetransmissionTimer, longDRX-Cycle, drxStartOffset, drx_BandIndex_longDRX-Cycle, drxShortCycleTimer, shortDRX-Cycle, drx_BandIndex_shortDRX-Cycle.

The drx_BandIndex_longDRX-Cycle or the drx_BandIndex_shortDRX-Cycle related to the band may be included in the DRX configuration or may be defined with an index of the band configured as a default band or a primary band in the band configuration included in the RRC Connection(re-)Configuration procedure without being included in the DRX configuration.

For example, it may be indicated as drx_BandIndex_shortDRX-Cycle=defaultBandIndex, or drx_BandIndex_longDRX-Cycle=primaryBandIndex.

If the DRX cycle is configured, the MAC entity of the UE operates in active time in case of the follows:
  when at least one of onDurationTimer, drx-InactivityTimer, drx-RetransmissionTimer, drx-ULRetransmissionTimer, and mac-ContentionResolutionTimer is running,
  when scheduling request (SR) is sent to PUCCH and pending,
  when a UL grant for unsent HARQ retransmission can occur, and
  when a control signal is generated for the first transmission on the PDCCH after receiving the RAR.

If the DRX is configured, the MAC entity of the UE performs the followings in every subframe (or slot, symbol, or time unit set by RRC).
  When DRX Command MAC CE or Long DRX Command MAC CE is received,
  stop onDurationTimer and drx-Inactivity Timer.
  When the drx-Inactivity Timer expires or the DRX Command MAC CE is received,
    if the short DRX cycle is configured, (re)start the drxShortCycleTimer and use the short DRX cycle.
    if the short DRX cycle is not configured, use the long DRX cycle.
  When the drxShortCycleTimer expires, use the long DRX cycle.
  When the drxShortCycleTimer has not expired and when the Long DRX Command MAC CE is received,
  stop the drxShortCycleTimer and use the long DRX cycle.
  When the UE is using the short DRX cycle and satisfies the following equation according to current SFN and subframe values, start the onDurationTimer.

[($SFN$*10)+subframe number]modulo(shortDRX-Cycle)=(drxStartOffset)modulo(shortDRX-Cycle).

When the UE is using the long DRX cycle and satisfies the following equation according to current SFN and subframe values, start the onDurationTimer.

[($SFN$*10)+subframe number]modulo(longDRX-Cycle)=drxStartOffset.

The MAC entity of the UE monitors the PDCCH in a subframe (or slot, symbol, or time unit set by RRC) in which the PDCCH is present in Active Time, and in a band indicated by the drx_BandIndex_shortDRX-Cycle if the short DRX cycle is used, or in a band indicated by the drx_BandIndex_longDRX-Cycle if the long DRX cycle is used. If the PDCCH indicates DL transmission in this subframe, or if a DL assignment is set in this subframe, the UE starts the HARQ RTT timer for the corresponding HARQ process and stops the drx-RetransmissionTimer for the same HARQ process.

If the PDCCH indicates UL transmission in this subframe, or if an UL grant is set in this subframe, the UE starts the UL HARQ RTT timer for the HARQ process of the subframe including the last retransmission of corresponding PUSCH transmission. Also, the UE stops the DRX_ULRetransmissionTimer for the same HARQ process.

If the PDCCH indicates a new transmission, the UE (re)starts the drx-InactivityTimer.

Embodiment 4-4

The embodiment 4-4 shows an operation procedure that supports case B 6720 in FIG. 67.

A MAC entity may be configured to have a DRX function for controlling the PDCCH monitoring of the UE by the RRC. If the DRX is configured when the UE is in the RRC_CONNECTED state, the MAC entity may discontinuously monitor the PDCCH according to the described DRX operation. When using the DRX operation, the MAC entity should monitor the PDCCH by using a specific band at a specific time according to the specific requirements. At least one of the following parameters is configured for the DRX operation: onDurationTimer, drx-InactivityTimer, drx-RetransmissionTimer, drx-ULRetransmissionTimer, long DRX-Cycle, drxStartOffset, drx_BandIndex_longDRX-Cycle, drxShortCycleTimer, shortDRX-Cycle.

The drx_BandIndex_longDRX-Cycle related to the band may be included in the DRX configuration or may be defined with an index of the band configured as a default band or a primary band in the band configuration included in the RRC Connection(re-)Configuration procedure without being included in the DRX configuration.

For example, it may be indicated as drx_BandIndex_longDRX-Cycle=defaultBandIndex, or drx_BandIndex_longDRX-Cycle=primaryBandIndex.

If the DRX cycle is configured, the MAC entity of the UE operates in active time in case of the follows:
  when at least one of onDurationTimer, drx-InactivityTimer, drx-RetransmissionTimer, drx-ULRetransmissionTimer, and mac-ContentionResolutionTimer is running,
  when scheduling request (SR) is sent to PUCCH and pending,
  when a UL grant for unsent HARQ retransmission can occur, and
  when a control signal is generated for the first transmission on the PDCCH after receiving the RAR.

If the DRX is configured, the MAC entity of the UE performs the followings in every subframe (or slot, symbol, or time unit set by RRC).
  When DRX Command MAC CE or Long DRX Command MAC CE is received,
  stop onDurationTimer and drx-Inactivity Timer.
  When the drx-Inactivity Timer expires or the DRX Command MAC CE is received,
    if the short DRX cycle is configured, (re)start the drxShortCycleTimer and use the short DRX cycle.
    if the short DRX cycle is not configured, use the long DRX cycle and use a band indicated by the drx_BandIndex_longDRX-Cycle.

When the drxShortCycleTimer expires, use the long DRX cycle and use a band indicated by the drx_BandIndex_longDRX-Cycle.

When the drxShortCycleTimer has not expired and when the Long DRX Command MAC CE is received, stop the drxShortCycleTimer, use the long DRX cycle, and use a band indicated by the drx_BandIndex_longDRX-Cycle.

When the UE is using the short DRX cycle and satisfies the following equation according to current SFN and subframe values, start the onDurationTimer.

[($SFN*10$)+subframe number]modulo(shortDRX-Cycle)=(drxStartOffset)modulo(shortDRX-Cycle).

When the UE is using the long DRX cycle and satisfies the following equation according to current SFN and subframe values, start the onDurationTimer.

[($SFN*10$)+subframe number]modulo(longDRX-Cycle)=drxStartOffset.

The MAC entity of the UE monitors the PDCCH in a subframe (or slot, symbol, or time unit set by RRC) in which the PDCCH is present in Active Time. If the PDCCH indicates DL transmission in this subframe, or if a DL assignment is set in this subframe, the UE starts the HARQ RTT timer for the corresponding HARQ process and stops the drx-RetransmissionTimer for the same HARQ process.

If the PDCCH indicates UL transmission in this subframe, or if an UL grant is set in this subframe, the UE starts the UL HARQ RTT timer for the HARQ process of the subframe including the last retransmission of corresponding PUSCH transmission. Also, the UE stops the DRX_ULRetransmissionTimer for the same HARQ process.

If the PDCCH indicates a new transmission, the UE (re)starts the drx-InactivityTimer.

Embodiment 4-5

The embodiment 4-5 shows an operation procedure that supports both case A 6710 and case B 6720 in FIG. 67.

A MAC entity may be configured to have a DRX function for controlling the PDCCH monitoring of the UE by the RRC. If the DRX is configured when the UE is in the RRC_CONNECTED state, the MAC entity may discontinuously monitor the PDCCH according to the described DRX operation. When using the DRX operation, the MAC entity should monitor the PDCCH by using a specific band at a specific time according to the specific requirements. At least one of the following parameters is configured for the DRX operation: onDurationTimer, drx-InactivityTimer, drx-RetransmissionTimer, drx-ULRetransmissionTimer, longDRX-Cycle, drxStartOffset, drx_BandIndex_longDRX-Cycle, drxShortCycleTimer, shortDRX-Cycle, drx_BandIndex_shortDRX-Cycle.

The drx_BandIndex_longDRX-Cycle or the drx_BandIndex_shortDRX-Cycle related to the band may be included in the DRX configuration or may be defined with an index of the band configured as a default band or a primary band in the band configuration included in the RRC Connection(re-)Configuration procedure without being included in the DRX configuration. For example, it may be indicated as drx_BandIndex_shortDRX-Cycle=defaultBandIndex, or drx_BandIndex_longDRX-Cycle=primaryBandIndex.

If the DRX cycle is configured, the MAC entity of the UE operates in active time in case of the follows:

when at least one of onDurationTimer, drx-InactivityTimer, drx-RetransmissionTimer, drx-ULRetransmissionTimer, and mac-ContentionResolutionTimer is running, when scheduling request (SR) is sent to PUCCH and pending, when a UL grant for unsent HARQ retransmission can occur, and when a control signal is generated for the first transmission on the PDCCH after receiving the RAR.

If the DRX is configured, the MAC entity of the UE performs the followings in every subframe (or slot, symbol, or time unit set by RRC).

When DRX Command MAC CE or Long DRX Command MAC CE is received, stop onDurationTimer and drx-Inactivity Timer.

When the drx-Inactivity Timer expires or the DRX Command MAC CE is received, if the short DRX cycle is configured, (re)start the drxShortCycleTimer, use the short DRX cycle, and use a band indicated by the drx_BandIndex_shortDRX-Cycle.

if the short DRX cycle is not configured, use the long DRX cycle, and use a band indicated by the drx_BandIndex_longDRX-Cycle.

When the drxShortCycleTimer expires, use the long DRX cycle, and use a band indicated by the drx_BandIndex_longDRX-Cycle.

When the drxShortCycleTimer has not expired and when the Long DRX Command MAC CE is received, stop the drxShortCycleTimer, use the long DRX cycle, and use a band indicated by the drx_BandIndex_longDRX-Cycle.

When the UE is using the short DRX cycle and satisfies the following equation according to current SFN and subframe values, start the onDurationTimer.

[($SFN*10$)+subframe number]modulo(shortDRX-Cycle)=(drxStartOffset)modulo(shortDRX-Cycle).

When the UE is using the long DRX cycle and satisfies the following equation according to current SFN and subframe values, start the onDurationTimer.

[($SFN*10$)+subframe number]modulo(longDRX-Cycle)=drxStartOffset.

The MAC entity of the UE monitors the PDCCH in a subframe (or slot, symbol, or time unit set by RRC) in which the PDCCH is present in Active Time. If the PDCCH indicates DL transmission in this subframe, or if a DL assignment is set in this subframe, the UE starts the HARQ RTT timer for the corresponding HARQ process and stops the drx-RetransmissionTimer for the same HARQ process.

If the PDCCH indicates UL transmission in this subframe, or if an UL grant is set in this subframe, the UE starts the UL HARQ RTT timer for the HARQ process of the subframe including the last retransmission of corresponding PUSCH transmission. Also, the UE stops the DRX_ULRetransmissionTimer for the same HARQ process.

If the PDCCH indicates a new transmission, the UE (re)starts the drx-InactivityTimer.

Embodiment 4-6

The embodiment 4-6 shows an operation procedure that supports case C 6730 in FIG. 67.

A MAC entity may be configured to have a DRX function for controlling the PDCCH monitoring of the UE by the RRC. If the DRX is configured when the UE is in the RRC_CONNECTED state, the MAC entity may discontinuously monitor the PDCCH according to the described DRX operation. When using the DRX operation, the MAC entity should monitor the PDCCH by using a specific band at a specific time according to the specific requirements. At least one of the following parameters is configured for the DRX operation: drx_BandIndex, onDurationTimer, drx-InactivityTimer, drx-RetransmissionTimer, drx-ULRetransmissionTimer, longDRX-Cycle, drxStartOffset, drxShortCycleTimer, shortDRX-Cycle.

The drx_BandIndex related to the band may be included in the DRX configuration or may be defined with an index of the band configured as a default band or a primary band in the band configuration included in the RRC Connection (re-)Configuration procedure without being included in the DRX configuration.

For example, it may be indicated as drx_BandIndex=defaultBandIndex, or drx_BandIndex=primaryBandIndex.

If the DRX cycle is configured, the MAC entity of the UE operates in active time in case of the follows:
- when at least one of onDurationTimer, drx-InactivityTimer, drx-RetransmissionTimer, drx-ULRetransmissionTimer, and mac-ContentionResolutionTimer is running,
- when scheduling request (SR) is sent to PUCCH and pending,
- when a UL grant for unsent HARQ retransmission can occur, and
- when a control signal is generated for the first transmission on the PDCCH after receiving the RAR.

If the DRX is configured, the MAC entity of the UE performs the followings in every subframe (or slot, symbol, or time unit set by RRC).
- When DRX Command MAC CE or Long DRX Command MAC CE is received,
- stop onDurationTimer and drx-Inactivity Timer.
- When the current Active Band is not equal to a band indicated by the drx_BandIndex;
  - if the drx-Inactivity Timer expires,
    - use a band indicated by the drx_BandIndex, and (re)start the drx-InactivityTimer.
- When the current Active Band is equal to a band indicated by the drx_BandIndex;
  - if the drx-Inactivity Timer expires or if the DRX Command MAC CE is received,
    - if the short DRX cycle is configured, (re)start the drxShortCycleTimer and use the short DRX cycle.
    - if the short DRX cycle is not configured, use the long DRX cycle.
  - if the drxShortCycleTimer expires, use the long DRX cycle.
  - if the drxShortCycleTimer has not expired, and if the Long DRX Command MAC CE is received,
- stop the drxShortCycleTimer and use the long DRX cycle.
- When the UE is using the short DRX cycle and satisfies the following equation according to current SFN and subframe values, start the onDurationTimer.

[(*SFN*\*10)+subframe number]modulo(shortDRX-Cycle)=(drxStartOffset)modulo(shortDRX-Cycle).

- When the UE is using the long DRX cycle and satisfies the following equation according to current SFN and subframe values, start the onDurationTimer.

[(*SFN*\*10)+subframe number]modulo(longDRX-Cycle)=drxStartOffset.

The MAC entity of the UE monitors the PDCCH in a subframe (or slot, symbol, or time unit set by RRC) in which the PDCCH is present in Active Time. If the PDCCH indicates DL transmission in this subframe, or if a DL assignment is set in this subframe, the UE starts the HARQ RTT timer for the corresponding HARQ process and stops the drx-RetransmissionTimer for the same HARQ process.

If the PDCCH indicates UL transmission in this subframe, or if an UL grant is set in this subframe, the UE starts the UL HARQ RTT timer for the HARQ process of the subframe including the last retransmission of corresponding PUSCH transmission. Also, the UE stops the DRX_ULRetransmissionTimer for the same HARQ process.

If the PDCCH indicates a new transmission, the UE (re)starts the drx-InactivityTimer.

In the inter-band timer-based switching operation of the disclosure, the band to which the UE moves due to the timer expiration may be determined according to one of the following methods.

1) In case of switching from band 1 to band 2, return to band 1 due to the timer expiration.

2) Set a band for switching per timer

3) Return to the previous band due to the timer expiration

4) Return to a band of given priority due to the timer expiration

The inter-band timer-based switching operation of the disclosure is as follows.

Figure 68:
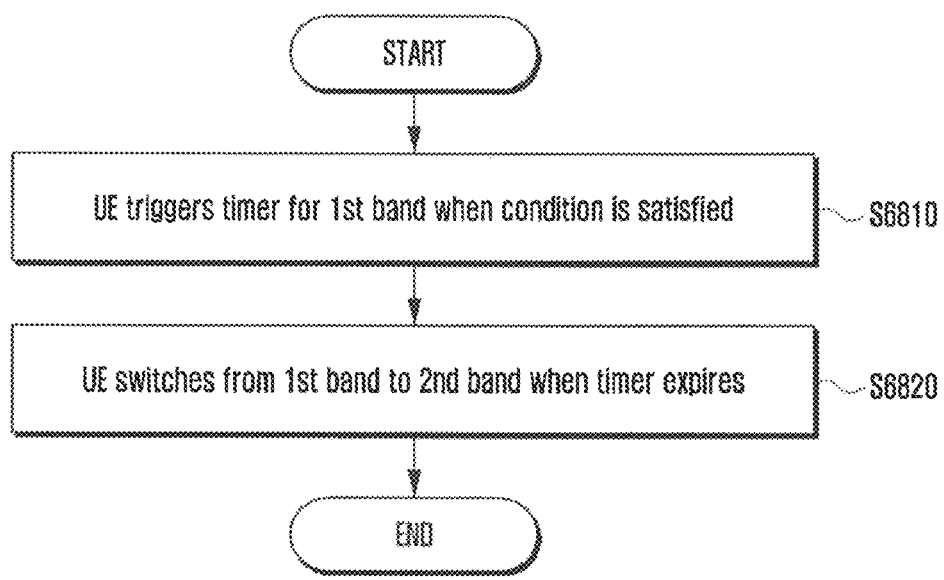

FIG. 68 is a diagram illustrating a timer-based band switching operation according to an embodiment of the disclosure n.

Referring to FIG. 68, when a given condition or a condition configured by the base station is satisfied, the terminal triggers a timer for one band at operation S6810. Some of operation characteristics of the timer, for example, a timer increase/decrease time, a timer increase/decrease value, and a timer expiration value may be given in advance or configured by the base station.

Depending on whether the condition is satisfied, the terminal may start the timer or increase or decrease a timer value. When the current value of the timer reaches the timer expiration value, the terminal switches from a current band (the first band) to another band (the second band) at operation S6820. Also, the terminal stops the timer operation for the first band.

The second band to which the terminal will switch may be given in advance or configured by the base station.

Figure 69:
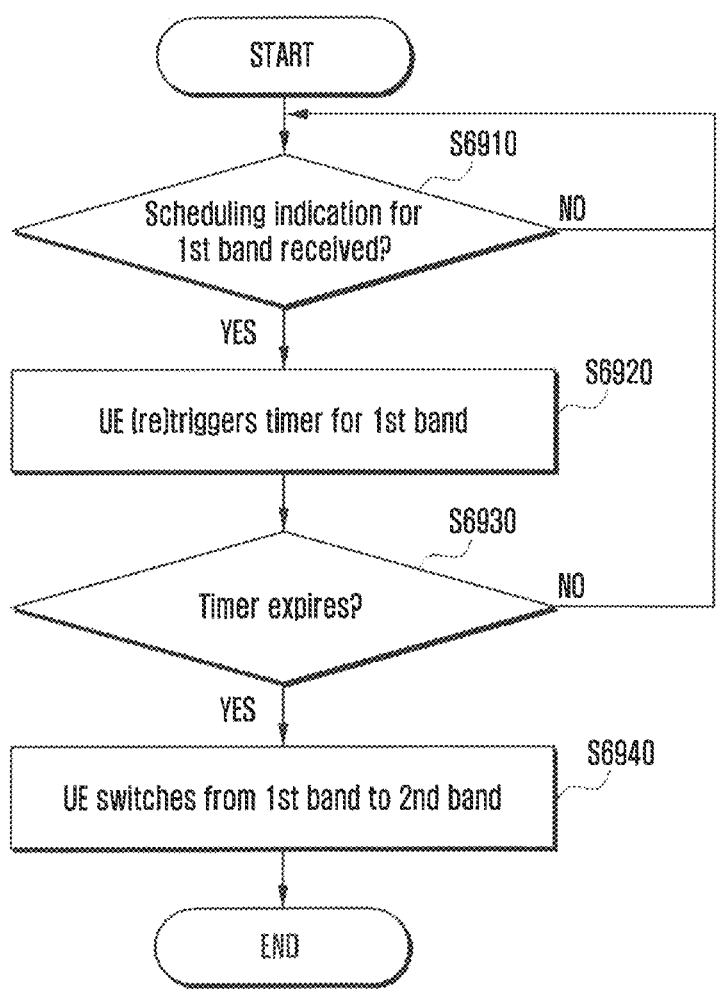

FIG. 69 is a diagram illustrating another timer-based band switching operation according to an embodiment of the disclosure.

Referring to FIG. 69, when the terminal receives a scheduling indication for the first band from the base station at operation S6910, the terminal triggers a timer for the first band at operation S6920. According to a predetermined rule, the timer increases or decreases by a certain amount in time.

Then, at operation S6930, the terminal determines whether the timer expires. If the scheduling indication for the first band is received again even though the timer does not expire, the terminal restarts the timer for the first band.

When the timer value reaches a given timer expiration value, the terminal switches from the first band to the second band at operation S6940. Also, the terminal stops the timer operation for the first band.

Figure 70:
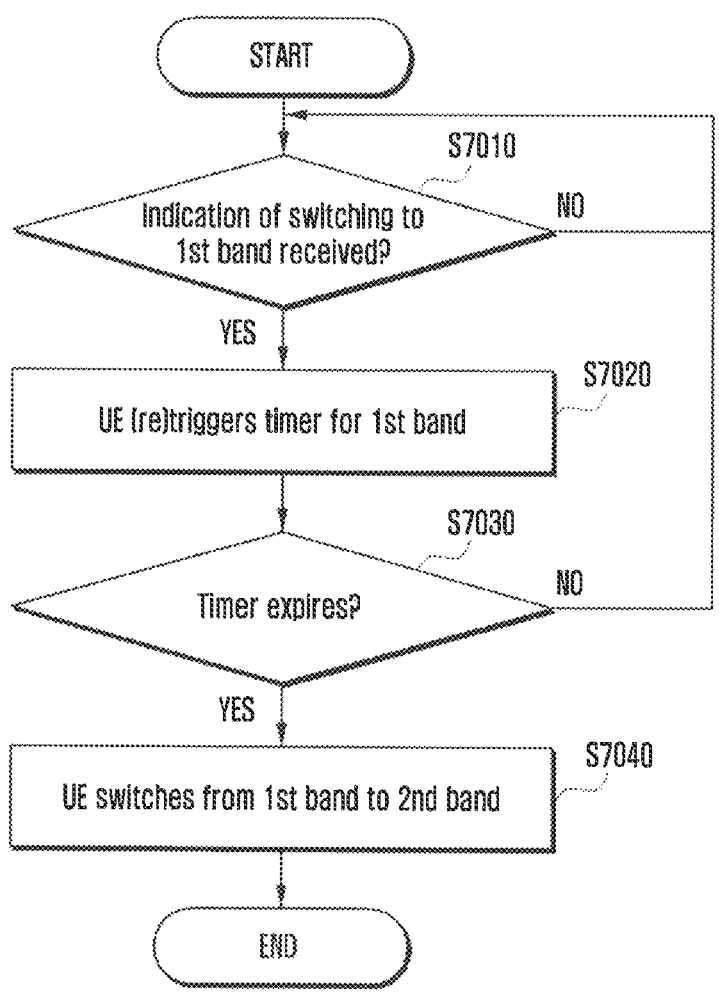

FIG. 70 is a diagram illustrating still another timer-based band switching operation according to an embodiment of the disclosure.

Referring to FIG. 70, when an indication of switching from the currently operating band to the first band is received from the base station at operation S7010, the terminal triggers a timer for the first band at operation S7020. According to a predetermined rule, the timer increases or decreases by a certain amount in time.

Then, at operation S7030, the terminal determines whether the timer expires. If the scheduling indication for the first band is received again even though the timer does not expire, the terminal restarts the timer for the first band.

When the timer value reaches a given timer expiration value, the terminal switches from the first band to the second band at operation S7040. Also, the terminal stops the timer operation for the first band.

Figure 71:
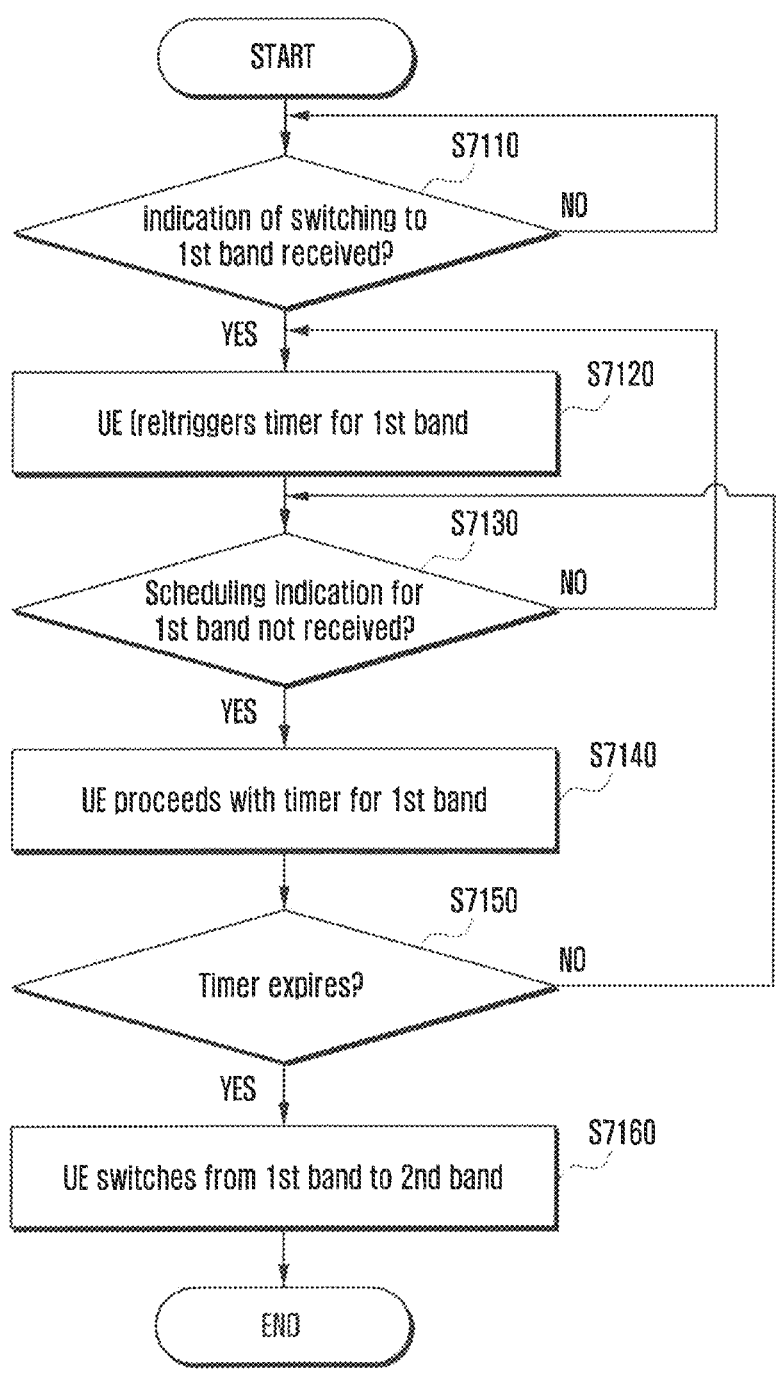

FIG. 71 is a diagram illustrating yet another timer-based band switching operation according to an embodiment of the disclosure.

Referring to FIG. 71, when an indication of switching to the first band is received from the base station at operation S7110, the terminal triggers a timer for the first band at operation S7120.

If the terminal that operates in the first band does not receive a scheduling indication for the first band at a given time at operation S7130, the terminal proceeds with the timer for the first band at operation S7140 so that the timer value is increased or decreased by a given amount according to a predetermined rule.

If the scheduling indication for the first band is received even though the timer for the first band does not expire, the terminal restarts the timer for the first band. When the timer value reaches a given timer expiration value at operation S7150, the terminal switches from the first band to the second band at operation S7160. Also, the terminal stops the timer operation for the first band.

Figure 72:
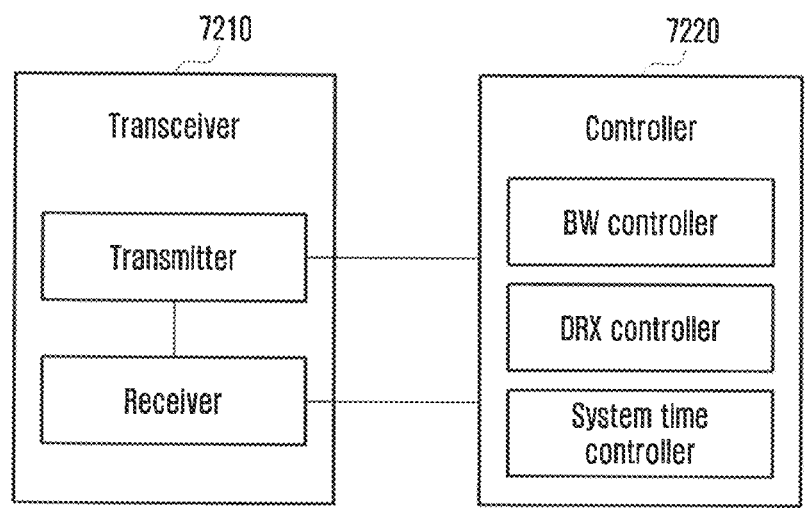
FIG. 72 is a diagram illustrating a configuration of a terminal according to an embodiment of the disclosure.

FIG. 72 is a diagram illustrating a configuration of a terminal according to an embodiment of the disclosure.

Referring to FIG. 72, the terminal may include a transceiver 7210 for transmitting/receiving a signal to/from any other device, and a controller 7220 for controlling all operations of the terminal. In the disclosure, the controller 7220 may be defined as a circuit, an application specific integrated circuit, or at least one processor.

The controller 7220 may perform the above-described operations according to various embodiments of the disclosure, including a BW controller 7221, a DRX controller 7222, and a system time controller 7223. For example, the controller 7220 may control a signal flow between respective blocks to perform operations according to the first to fourth embodiments described above. However, the controller 7220 and the transceiver 7110 are not necessarily implemented as separate apparatuses, and may be implemented as a single unit in the form of a single chip.

Figure 73:
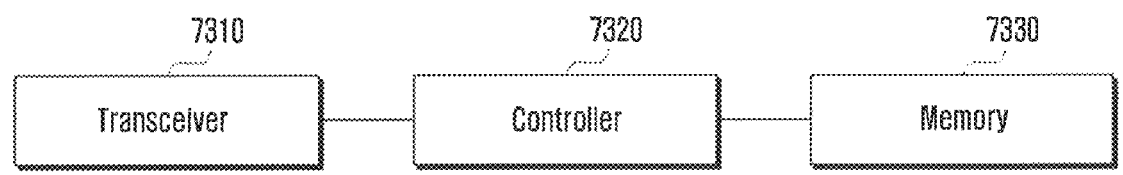
FIG. 73 is a diagram illustrating a configuration of a base station according to an embodiment of the disclosure.

FIG. 73 is a diagram illustrating a configuration of a base station according to an embodiment of the disclosure.

Referring to FIG. 73, the base station may include a transceiver 7310, a controller 7320, and a memory 7330 (i.e., a storage device). In the disclosure, the controller may be defined as a circuit, an application specific integrated circuit, or at least one processor.

The transceiver 7310 may transmit and receive signals. The controller 7320 may control the overall operation of the base station according to the first to fourth embodiments of the disclosure. For example, the controller 7320 may control a signal flow between respective blocks to perform operations according to the first to fourth embodiments described above.

It is to be noted that structures, procedures, operations, functions, and the like described above and illustrated in the drawings are not intended to limit the scope of the disclosure. That is, it should not be construed that all of the described or illustrated elements are essential for the implementation of the disclosure.

The above-described operations of the base station and the terminal can be realized by providing a memory device storing program codes to an arbitrary component equipped in the base station or the terminal. That is, the controller of the base station or terminal may execute the above-described operations by reading and executing the program codes stored in the memory device by a processor or a central processing unit (CPU).

Various components, modules, etc. of the entity, base station, or terminal described herein may be implemented in a hardware circuit, e.g., a complementary metal oxide semiconductor (CMOS) based logic circuit, a firmware, a software, or a combination thereof. In one example, various electrical structures and methods may be implemented using electrical circuits such as transistors, logic gates, and custom semiconductors.

Meanwhile, in the drawings illustrating the method of the disclosure, the order of description does not necessarily correspond to the order of execution, and the relationship of order may be changed or executed in parallel.

In addition, the drawings illustrating the method of the disclosure may omit some of elements and include only some of elements within the scope of the disclosure.

Further, the above-discussed embodiments of the disclosure may be combined and executed or only some components thereof may be combined and executed within the scope of the disclosure.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a terminal in a wireless communication system, the method comprising the following ordered steps:
   transmitting, to a base station, a capability message including information associated with a switching delay time;
   receiving, from the base station, a radio resource control (RRC) message including information on a first band;
   receiving, from the base station, downlink control information (DCI) associated with band switching; and
   performing, based on the DCI, the band switching to a second band within a duration determined based on the information associated with the switching delay time.

2. The method of claim 1, further comprising:
   starting a timer associated with the second band for falling back from the second band to the first band; and
   performing band switching to the first band in response to the timer expiring,
   wherein the RRC message includes a duration of the timer.

3. The method of claim 1, further comprising:
   after performing the band switching to the second band, receiving, from the base station, data on the second band.

4. The method of claim 2, further comprising:
restarting the timer in case that second DCI is received before the timer expires,
wherein the DCI is first DCI.

5. A method performed by a base station in a wireless communication system, the method comprising the following ordered steps:
receiving, from a terminal, a capability message including information associated with a switching delay time;
transmitting, to the terminal, a radio resource control (RRC) message including information on a first band;
transmitting, to the terminal, downlink control information (DCI) associated with band switching; and
transmitting, to the terminal, data on a second band based on the DCI,
wherein the band switching to the second band is performed based on the DCI within a duration, and
wherein the duration is determined based on the information associated with the switching delay time.

6. The method of claim 5,
wherein a timer associated with the second band is started for the terminal to fall back from the second band to the first band, and
wherein data is transmitted on the first band based on the timer expiring.

7. The method of claim 6, wherein the RRC message includes a duration of the timer.

8. The method of claim 6,
wherein the timer is restarted in case that second DCI is transmitted before the timer expires, and
wherein the DCI is first DCI.

9. A terminal in a wireless communication system, the terminal comprising:
a transceiver; and
a controller coupled with the transceiver and configured to perform the following ordered steps to:
transmit, to a base station, a capability message including information associated with a switching delay time,
receive, from the base station, a radio resource control (RRC) message including information on a first band,
receive, from the base station, downlink control information (DCI) associated with band switching, and
perform, based on the DCI, the band switching to a second band within a duration determined based on the information associated with the switching delay time.

10. The terminal of claim 9,
wherein the controller is further configured to:
start a timer associated with the second band for falling back from the second band to the first band, and
perform band switching to the first band in response to the timer expiring, and
wherein the RRC message includes a duration of the timer.

11. The terminal of claim 9, wherein the controller is further configured to receive, from the base station, data on the second band after performing the band switching to the second band.

12. The terminal of claim 10,
wherein the controller is further configured to restart the timer in case that second DCI is received before the timer expires, and
wherein the DCI is first DCI.

13. A base station in a wireless communication system, the base station comprising:
a transceiver; and
a controller coupled with the transceiver and configured to perform the following ordered steps to:
receive, from a terminal, a capability message including information associated with a switching delay time,
transmit, to the terminal, a radio resource control (RRC) message including information on a first band,
transmit, to the terminal, downlink control information (DCI) associated with band switching, and
transmit, to the terminal, data on a second band based on the DCI,
wherein the band switching to the second band is performed based on the DCI within a duration, and
wherein the duration is determined based on the information associated with the switching delay time.

14. The base station of claim 13,
wherein a timer associated with the second band is started for the terminal to fall back from the second band to the first band, and
wherein data is transmitted on the first band based on the timer expiring.

15. The base station of claim 14, wherein the RRC message includes a duration of the timer.

16. The base station of claim 14,
wherein the timer is restarted in case that second DCI is transmitted before the timer expires, and
wherein the DCI is first DCI.

\* \* \* \* \*